US012646741B2

(12) United States Patent
Kushida et al.

(10) Patent No.: US 12,646,741 B2
(45) Date of Patent: Jun. 2, 2026

(54) # INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Yo Kushida, Kanagawa (JP); Yuzo Nagata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 543 days.

(21) Appl. No.: 18/302,794

(22) Filed: Apr. 19, 2023

(65) Prior Publication Data

US 2023/0275259 A1 Aug. 31, 2023

Related U.S. Application Data

(63) Continuation of application No. PCT/JP2021/038465, filed on Oct. 18, 2021.

(30) Foreign Application Priority Data

Oct. 23, 2020 (JP) ................................. 2020-177999
Mar. 1, 2021 (JP) ................................. 2021-031967

(51) Int. Cl.
*H01M 10/056* (2010.01)
*H01M 10/05* (2010.01)

(52) U.S. Cl.
CPC .. *H01M 10/056* (2013.01); *H01M 2300/0091* (2013.01)

(58) Field of Classification Search
CPC ........... H01M 10/056; H01M 10/0525; H01M 10/04; H01M 4/60
See application file for complete search history.

(56) References Cited

U.S. PATENT DOCUMENTS

| | | | |
|---|---|---|---|
| 10,566,651 | B2 | 2/2020 | Makino et al. |
| 11,563,235 | B2 | 1/2023 | Mochizuki et al. |

(Continued)

FOREIGN PATENT DOCUMENTS

| | | |
|---|---|---|
| CN | 109526241 | 3/2019 |
| CN | 111213275 | 5/2020 |

(Continued)

OTHER PUBLICATIONS

Office Action of China Counterpart Application, with English translation thereof, issued on Jun. 22, 2024, pp. 1-16.

(Continued)

*Primary Examiner* — Kenneth J Douyette
(74) *Attorney, Agent, or Firm* — JCIPRNET

(57) ABSTRACT

There is provided an inorganic solid electrolyte-containing composition containing an inorganic solid electrolyte, a polymer binder, and a dispersion medium, where the polymer binder has a constitutional component (X) derived from a polycondensable compound having a polycondensable group and a polymerized chain and has a constitutional component (A) derived from a polycondensable compound having a specific functional group, and the inorganic solid electrolyte-containing composition contains a polymer having a constitutional component (N) containing a nitrogen atom, the polymer having a content of less than 10% by mole in all constitutional components and is dissolved in a dispersion medium. There are also provided a sheet for an all-solid state secondary battery and an all-solid state secondary battery, in which this inorganic solid electrolyte-containing composition is used, and manufacturing methods (Continued)

for a sheet for an all-solid state secondary battery, and an all-solid state secondary battery.

10 Claims, 1 Drawing Sheet

(56) References Cited

U.S. PATENT DOCUMENTS

| | | | | |
|---|---|---|---|---|
| 2014/0038049 | A1* | 2/2014 | Chung ................ | H01M 4/1393<br>252/182.1 |
| 2018/0342765 | A1* | 11/2018 | Mimura ............ | H01M 10/0585 |
| 2019/0157710 | A1 | 5/2019 | Makino et al. | |
| 2020/0223704 | A1* | 7/2020 | Neale ................ | H01M 10/0525 |
| 2021/0143472 | A1 | 5/2021 | Mimura et al. | |

FOREIGN PATENT DOCUMENTS

| | | |
|---|---|---|
| JP | 2011014387 | 1/2011 |
| JP | 2015191865 | 11/2015 |
| JP | 2018088306 | 6/2018 |
| WO | 2020022205 | 1/2020 |
| WO | 2020138122 | 7/2020 |

OTHER PUBLICATIONS

"Notice of Reasons for Refusal of Japan Counterpart Application", issued on Jul. 1, 2025, with English translation thereof, p. 1-p. 6.
"International Search Report (Form PCT/ISA/210) of PCT/JP2021/038465", mailed on Dec. 21, 2021, with English translation thereof, pp. 1-5.
"Written Opinion of the International Searching Authority (Form PCT/ISA/237) of PCT/JP2021/038465", mailed on Dec. 21, 2021, with English translation thereof, pp. 1-8.

* cited by examiner

INORGANIC SOLID ELECTROLYTE-CONTAINING COMPOSITION, SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2021/038465 filed on Oct. 18, 2021, which claims priority under 35 U.S.C. § 119 (a) to Japanese Patent Application No. 2020-177999 filed in Japan on Oct. 23, 2020, and Japanese Patent Application No. 2021-031967 filed in Japan on Mar. 1, 2021. Each of the above applications is hereby expressly incorporated by reference, in its entirety, into the present application.

BACKGROUND OF THE INVENTION

1. Field of the Invention

The present invention relates to an inorganic solid electrolyte-containing composition, a sheet for an all-solid state secondary battery, and an all-solid state secondary battery, and manufacturing methods for a sheet for an all-solid state secondary battery and an all-solid state secondary battery.

2. Description of the Related Art

In an all-solid state secondary battery, all of a negative electrode, an electrolyte, and a positive electrode consist of solid, and the all-solid state secondary battery can greatly improve safety and reliability, which are said to be problems to be solved in a battery in which an organic electrolytic solution is used. It is also said to be capable of extending the battery life. Furthermore, all-solid state secondary batteries can be provided with a structure in which the electrodes and the electrolyte are directly disposed in series. As a result, it is possible to increase the energy density to be high as compared with a secondary battery in which an organic electrolytic solution is used, and thus the application to electric vehicles, large-sized storage batteries, and the like is anticipated.

In such an all-solid state secondary battery, as substances that form constitutional layers (a solid electrolyte layer, a negative electrode active material layer, a positive electrode active material layer, and the like), an inorganic solid electrolyte, an active material, and the like are used. In recent years, this inorganic solid electrolyte, particularly an oxide-based inorganic solid electrolyte or a sulfide-based inorganic solid electrolyte is expected as an electrolyte material having a high ion conductivity comparable to that of the organic electrolytic solution. In consideration of the improvement in productivity, a constitutional layer using such an inorganic solid electrolyte is generally formed of a material (a constitutional layer forming material) containing an inorganic solid electrolyte and a binder. As such a constitutional layer forming material, for example, JP2011-014387A discloses a solid electrolyte layer slurry containing a solid electrolyte material and a graft polymer. It is said that the graft polymer described in JP2011-014387A is a branched polymer consisting of two or more segments, one of which constitutes a main chain and the other of which constitutes a graft portion (side chain), where the branched polymer is a polymer not having a polar functional group such as a carboxy group. In addition, JP2015-191865A discloses a solid electrolyte composition that contains a nitrogen-containing polymer having a repeating unit having a specific substituent such as a substituent X having a pKa of 14 or less or a substituent Y having a polymer chain containing a heteroatom and contains an inorganic solid electrolyte having an ion conductivity of a metal belonging to Group 1 or Group 2 of the periodic table.

SUMMARY OF THE INVENTION

In a constitutional layer that is formed of solid particles such as an inorganic solid electrolyte, an active material, and a conductive auxiliary agent, the interfacial contact state between the solid particles is restricted, and thus the interface resistance easily increases (conductivity easily decreases). Moreover, in a case of repeatedly charging and discharging an all-solid state secondary battery including such a constitutional layer, the battery performance gradually deteriorates (the deterioration of the cycle characteristics occurs).

In addition, from the viewpoint of the improvement of the battery performance (for example, resistance and cycle characteristics) and the like, a constitutional layer forming material that is used for manufacture of an all-solid state secondary battery is required to have solid particles which are highly dispersed in a dispersion medium.

Moreover, in recent years, the development for practical use of an all-solid state secondary battery has been rapidly progressing, and a countermeasure corresponding to this progress has also been required. For example, from the viewpoint of improving productivity and reducing production cost, it is desired to achieve practical use of an inorganic solid electrolyte-containing composition (practical use of slurry enrichment), in which the concentration of solid contents of solid particles or the like is increased. However, in a case where the concentration of solid contents of the solid particles or the like is increased, it is inevitable that the solid particles aggregate or precipitate to some extent due to the elapse of time even in a case of the inorganic solid electrolyte-containing composition that exhibits excellent dispersibility. Therefore, characteristics (redispersion characteristics) are required in the constitutional layer forming material for practical use, where the characteristics are such that the solid particles aggregated or precipitated due to the elapse of time can be dispersed again in an excellent dispersion state at the timing (initial stage) immediately after the preparation even in a case where the concentration of solid contents is increased.

However, JP2011-014387A and JP2015-191865A do not describe this viewpoint.

An object of the present invention is to provide an inorganic solid electrolyte-containing composition that exhibits excellent dispersion characteristics (initial dispersibility and redispersion characteristics) even in a case where the concentration of solid contents of solid particles is increased, where the inorganic solid electrolyte-containing composition enables the realization of an all-solid state secondary battery having low resistance and excellent cycle characteristics. In addition, another object of the present invention is to provide a sheet for an all-solid state secondary battery and an all-solid state secondary battery, and manufacturing methods for a sheet for an all-solid state secondary battery and an all-solid state secondary battery, in which the above inorganic solid electrolyte-containing composition is used.

From the above-described viewpoints, the inventors of the present invention repeatedly carried out studies on a polymer binder in which an inorganic solid electrolyte and a dispersion medium were used in combination and as a result found that in a case of forming the polymer binder from a polymer that has a constitutional component (X) having a polymerized chain and a constitutional component (A) having a specific functional group and has a small content of a constitutional component (N) containing a nitrogen atom, and then imparting, to the polymer binder, not a characteristic of being dispersed in a particle shape but a characteristic of being dissolved in a dispersion medium, it is possible to reproduce excellent dispersibility (initial dispersibility) after preparation even in a case where the concentration of solid contents of the solid particles is increased and the aggregation or the like of solid particles occurs. In addition, it was found that in a case where the inorganic solid electrolyte-containing composition containing this specific polymer binder, inorganic solid electrolyte, and dispersion medium, is used as a constitutional layer forming material, it is possible to realize a sheet for an all-solid state secondary battery, which has a constitutional layer having low resistance, as well as an all-solid state secondary battery which has low resistance and excellent cycle characteristics as well. The present invention has been completed through further studies based on these findings.

That is, the above problems have been solved by the following means.

<1> An inorganic solid electrolyte-containing composition comprising:

an inorganic solid electrolyte having an ion conductivity of a metal belonging to Group 1 or Group 2 in the periodic table;

a polymer binder; and a dispersion medium, in which the polymer binder has a constitutional component (X) having a polymerized chain and a constitutional component (A) having at least one functional group of the following group (a) of functional groups, contains a polymer having a constitutional component (N) containing a nitrogen atom, the polymer having a content of less than 10% by mole in all constitutional components, and is dissolved in the dispersion medium.

<Group (a) of Functional Groups>

A sulfonate group, a phosphate group, a phosphonate group, a carboxy group, a hydroxy group, an oxetane group, an epoxy group, a dicarboxylic acid anhydride group, a thiol group, an ether group, a thioether group, a thioester group, a fluoroalkyl group, and salts of these groups <2> The inorganic solid electrolyte-containing composition according to <1>, in which the constitutional component (X) is represented by Formula (X1) or (X2), Formula (X1)

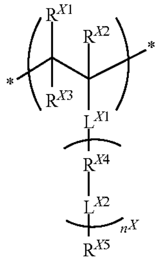

-continued (Formula X2)

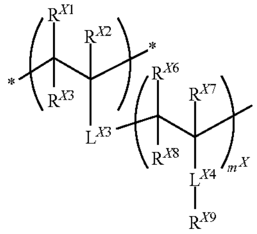

in Formula (X1) and Formula (X2), $R^{X1}$ to $R^{X3}$ and $R^{X6}$ to $R^{X8}$ represent a hydrogen atom or a substituent, $R^{X4}$ represents a hydrocarbon group or an alkylsilyl group, $R^{X5}$ represents a substituent, $R^{X9}$ represents a hydrogen atom or a substituent, $L^{X1}$ to $L^{X3}$ represent a linking group, $L^{X4}$ represents a single bond or a linking group, and $n^{X}$ and $m^{X}$ indicate an average degree of polymerization and are a number of 2 or more.

<3> The inorganic solid electrolyte-containing composition according to <1> or <2>, in which the constitutional component (N) is a constitutional component containing a nitrogen atom that forms an amino group in a partial structure that is incorporated into a main chain of the polymer or in a partial structure that serves as a side chain other than a polymerized chain.

<4> The inorganic solid electrolyte-containing composition according to any one of <1> to <3>, in which the polymer is a multibranched polymer having a core part and three or more arm parts that are bonded to this core part, where the arm part contains the constitutional component (X).

<5> The inorganic solid electrolyte-containing composition according to any one of <1> to <4>, in which a glass transition temperature of the polymer is −30° C. or lower.

<6> The inorganic solid electrolyte-containing composition according to any one of <1> to <5>, further comprising an active material.

<7> The inorganic solid electrolyte-containing composition according to any one of <1> to <6>, further comprising a conductive auxiliary agent.

<8> A sheet for an all-solid state secondary battery, comprising a layer formed of the inorganic solid electrolyte-containing composition according to any one of <1> to <7>.

<9> An all-solid state secondary battery comprising, in the following order:

a positive electrode active material layer;

a solid electrolyte layer; and a negative electrode active material layer, in which at least one layer of the positive electrode active material layer, the solid electrolyte layer, or the negative electrode active material layer is a layer formed of the inorganic solid electrolyte-containing composition according to any one of <1> to <7>.

<10> A manufacturing method for a sheet for an all-solid state secondary battery, the manufacturing method comprising forming a film of the inorganic solid electrolyte-containing composition according to any one of <1> to <7>.

<11> A manufacturing method for an all-solid state secondary battery, the manufacturing method comprising manufacturing an all-solid state secondary battery through the manufacturing method according to <10>.

According to the present invention, it is possible to provide an inorganic solid electrolyte-containing composition that exhibits excellent dispersion characteristics even in a case where the concentration of solid contents of solid particles is increased and enables the realization of an all-solid state secondary battery having low resistance and excellent cycle characteristics. In addition, according to the present invention, it is possible to provide a sheet for an all-solid state secondary battery and an all-solid state secondary battery, which have a layer formed of this excellent inorganic solid electrolyte-containing composition. Further, according to the present invention, it is possible to provide manufacturing methods for a sheet for an all-solid state secondary battery and an all-solid state secondary battery, in which the above inorganic solid electrolyte-containing composition is used.

The above-described and other characteristics and advantages of the present invention will be further clarified by the following description with appropriate reference to the accompanying drawing.

DESCRIPTION OF THE PREFERRED EMBODIMENTS

Figure 1:
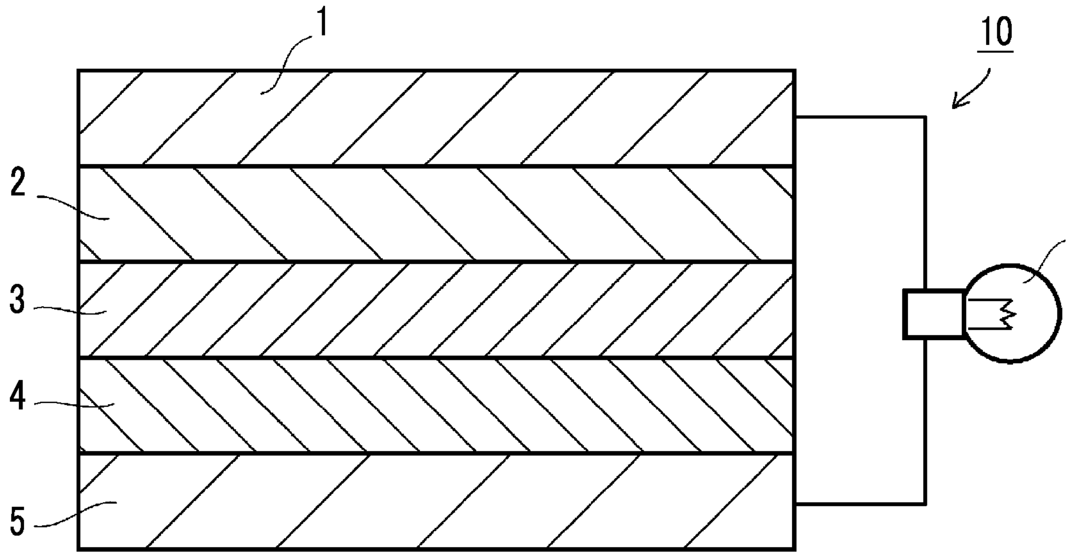
FIG. 1 is a vertical cross-sectional view schematically illustrating an all-solid state secondary battery according to a preferred embodiment of the present invention.

In the present invention, a numerical value range indicated using "to" means a range including numerical values before and after the "to" as the lower limit value and the upper limit value. In a case where a plurality of numerical range values are set and described for the content, physical properties, and the like of a component in the present invention, the upper limit value and the lower limit value, which form the numerical value range are not limited to a specific combination of the upper limit value and the lower limit value and can be set to a numerical value range obtained by appropriately combining the upper limit value and the lower limit value of each numerical value range.

In the present invention, the expression of a compound (for example, in a case where a compound is represented by an expression in which "compound" is attached to the end) refers to not only the compound itself but also a salt or an ion thereof. In addition, this expression also refers to a derivative obtained by modifying a part of the compound, for example, by introducing a substituent into the compound within a range where the effect of the present invention is not impaired.

In the present invention, (meth)acryl means one or both of acryl and methacryl. The same applies to (meth)acrylate.

In the present invention, a substituent, a linking group, or the like (hereinafter, referred to as a substituent or the like), which is not specified regarding whether to be substituted or unsubstituted, may have an appropriate substituent. Accordingly, even in a case where a YYY group is simply described in the present invention, this YYY group includes not only an aspect not having a substituent but also an aspect having a substituent. The same shall be applied to a compound that is not specified regarding whether to be substituted or unsubstituted. Examples of the preferred substituent include a substituent Z described later.

In the present invention, in a case where a plurality of substituents or the like represented by a specific reference numeral are present or a plurality of substituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

In the present invention, the polymer means a polymer; however, it has the same meaning as the so-called polymeric compound. Further, a polymer binder (also simply referred to as a binder) means a binder formed of a polymer and includes a polymer itself and a binder formed by containing a polymer.

[Inorganic Solid Electrolyte-Containing Composition]

The inorganic solid electrolyte-containing composition according to the embodiment of the present invention contains an inorganic solid electrolyte having an ion conductivity of a metal belonging to Group 1 or Group 2 in the periodic table; a polymer binder containing a polymer having a constitutional component; and a dispersion medium.

This polymer binder has a characteristic (solubility) of being soluble in a dispersion medium contained in the inorganic solid electrolyte-containing composition. The polymer binder in the inorganic solid electrolyte-containing composition generally is present in a state of being dissolved in a dispersion medium in the inorganic solid electrolyte-containing composition, which depends on the content thereof. This makes it possible for the polymer binder to stably exhibit a function of dispersing solid particles in the dispersion medium and maintain the excellent (initial) dispersibility of the solid particles in the inorganic solid electrolyte-containing composition. In addition, even in a case where solid particles aggregate or precipitate due to the elapse of time or the like, the excellent initial dispersibility can be reproduced by carrying out a dispersion treatment (a mixing treatment) again. Further, it is possible to reinforce the adhesiveness between the solid particles or to the collector to enhance the effect of improving the cycle characteristics of the all-solid state secondary battery.

In the present invention, the description that a polymer binder is dissolved in a dispersion medium in an inorganic solid electrolyte-containing composition is not limited to an aspect in which the entire polymer binder is dissolved in the dispersion medium, and for example, a part of the polymer binder may be present in an insoluble form in the inorganic solid electrolyte-containing composition as long as the following solubility in a dispersion medium is 80% or more.

The measuring method for solubility is as follows. That is, a specified amount of a polymer binder as a measurement target is weighed in a glass bottle, 100 g of a dispersion medium that is the same kind as the dispersion medium contained in the inorganic solid electrolyte-containing composition is added thereto, and stirring is carried out at a temperature of 25° C. on a mix rotor at a rotation speed of 80 rpm for 24 hours. After stirring for 24 hours, the obtained mixed solution is subjected to the transmittance measurement under the following conditions. This test (the transmittance measurement) is carried out by changing the amount of the binder dissolved (the above-described specified amount), and the upper limit concentration X (% by mass) at which the transmittance is 99.8% is defined as the solubility of the polymer binder in the above dispersion medium.

<Transmittance Measurement Conditions>

Dynamic light scattering (DLS) measurement

Device: DLS measuring device DLS-8000 manufactured by Otsuka Electronics Co., Ltd.

Laser wavelength, output: 488 nm/100 mW

Sample cell: NMR tube

In the inorganic solid electrolyte-containing composition according to the embodiment of the present invention, the inorganic solid electrolyte is dispersed in a dispersion medium, and the inorganic solid electrolyte-containing composition is preferably a slurry. In the inorganic solid electrolyte-containing composition, the polymer binder is dissolved in a dispersion medium and interacts with, preferably adsorbs to, solid particles such as an inorganic solid electrolyte, thereby functioning to enhance the dispersion characteristics of the solid particles. In the present invention, the adsorption of the polymer binder to the solid particles includes not only physical adsorption but also chemical adsorption (adsorption by chemical bond formation, adsorption by transfer of electrons, or the like). The dispersion characteristics exhibited by the polymer binder can be maintained even in a case where the concentration of solid contents of the solid particles is increased. The concentration of solid contents at this time is determined by the content of the dispersion medium described later. Since the inorganic solid electrolyte-containing composition according to the embodiment of the present invention contains the above-described polymer binder in combination with the inorganic solid electrolyte and the dispersion medium, the concentration of solid contents can also be increased. The concentration of solid contents is not unambiguously determined by changing the composition temperature, the kind of the solid particles, and the like; however, it can be set to, for example, 40% by mass or more at 25° C. and also can be set to 50% by mass or more.

The polymer binder functions, in a constitutional layer formed of an inorganic solid electrolyte-containing composition, as a binding agent that causes solid particles of an inorganic solid electrolyte (as well as a co-existable active material, conductive auxiliary agent, and the like) or the like to mutually binds therebetween (for example, between solid particles of an inorganic solid electrolyte, between solid particles of an inorganic solid electrolyte and an active material, or between solid particles of an active material). Further, it also functions as a binding agent that binds the base material such as a collector and the solid particles. It is noted that in the inorganic solid electrolyte-containing composition, the polymer binder may have or may not have a function of causing solid particles to mutually bind therebetween.

The inorganic solid electrolyte-containing composition according to the embodiment of the present invention exhibits excellent dispersion characteristics even in a case where the concentration of solid contents is increased and can bind solid particles to other solid particles and furthermore to a base material in a case where a constitutional layer is formed therefrom. Therefore, in a case where this inorganic solid electrolyte-containing composition is used as a constitutional layer forming material, it is possible to realize a sheet for an all-solid state secondary battery, which has a constitutional layer having low resistance, and furthermore, an all-solid state secondary battery which has a high conductivity (low resistance) and excellent cycle characteristics as well.

Although the details of the reason for the above are not yet clear, they are conceived to be as follows. That is, a polymer binder having each of the constitutional components (X), (A), and (N), which will be described later, is present in the inorganic solid electrolyte-containing composition in a state where the molecular chain of the polymer is extended by being dissolved in a dispersion medium. Moreover, it is conceived that the effect of excluding volumes between the binders due to the constitutional component (X) present in the polymer is increased, whereas the repulsive force between the binders due to the effect of the osmotic pressure is increased. As a result, the binders are less likely to aggregate and adhere to each other, and the dispersibility is improved, whereby the solid particles adsorbed to the binder can also be highly dispersed by suppressing aggregation and precipitation. Therefore, excellent (initial) dispersibility can be maintained even in a case where the concentration of solid contents is increased, and the excellent (initial) dispersibility immediately after preparation due to the above-described action of the polymer binder can be reproduced even in a case of solid particles that have once aggregated or precipitated. Further, it is conceived that it is difficult to coat the surface of the solid particles as a whole due to the repulsive force, and the direct contact between the solid particles (the contact without interposing a binder therebetween) can be maintained without significantly impairing the adhesion between the solid particles. Therefore, in the inorganic solid electrolyte-containing composition according to the embodiment of the present invention, it is possible to form a constitutional layer in which the interface resistance between the solid particles is reduced to suppress the inhibition of conduction of ions or electrons, while the solid particles are adhered to or bound to each other.

In the present invention, as described above, the interaction (the relationship) among the inorganic solid electrolyte, the dispersion medium, and the polymer binder in the inorganic solid electrolyte-containing composition and the constitutional layer is improved, and it is possible to realize excellent dispersion characteristics of the inorganic solid electrolyte-containing composition and resistance reduction in a case where a constitutional layer is formed therefrom. Therefore, it is possible to realize an all-solid state secondary battery having both low resistance (high conductivity) and excellent cycle characteristics. In addition, it is possible to apply industrial manufacturing, for example, a roll-to-roll method having high productivity as manufacturing methods for a sheet for an all-solid state secondary battery and an all-solid state secondary battery using the inorganic solid electrolyte-containing composition according to the embodiment of the present invention.

The polymer binder contained in the constitutional layer is liable to deteriorate (be oxidized) by oxygen (in terms of atom or molecule) or the like, and as the deterioration progresses, the binding property and the interfacial contact state of the solid particles gradually deteriorate, whereby the cycle characteristics further deteriorate. In addition, in industrial manufacturing, for example, in a roll-to-roll method having high productivity, it is difficult to completely remove oxygen in a manufacture environment, a storage environment, and the like, and thus oxidative deterioration cannot be avoided. However, the binder containing the above-described polymer can preferably exhibit oxidative deterioration resistance against oxygen and the like and thus suppresses the oxidative deterioration of the inorganic solid electrolyte-containing composition and the constitutional layer, whereby it is possible to realize a constitutional layer capable of suppressing further deterioration of the cycle characteristics due to the oxidative deterioration even in an industrial manufacturing method.

The inorganic solid electrolyte-containing composition according to the embodiment of the present invention is preferably used as a material (a constitutional layer forming material) for forming a solid electrolyte layer or an active material layer, where the material is for a sheet for an all-solid state secondary battery (including an electrode sheet for an all-solid state secondary battery) or an all-solid state secondary battery. In particular, it can be preferably used as an electrode sheet for an all-solid state secondary battery or a material for forming an active material layer, and high cycle characteristics and a high conductivity can be achieved in this aspect as well.

The inorganic solid electrolyte-containing composition according to the embodiment of the present invention is preferably a non-aqueous composition. In the present invention, the non-aqueous composition includes not only an aspect including no watery moisture but also an aspect where the moisture content (also referred to as the "watery moisture content") is preferably 500 ppm or less. In the non-aqueous composition, the moisture content is more preferably 200 ppm or less, still more preferably 100 ppm or less, and particularly preferably 50 ppm or less. In a case where the inorganic solid electrolyte-containing composition is a non-aqueous composition, it is possible to suppress the deterioration of the inorganic solid electrolyte.

The water content refers to the water amount (the mass proportion to the inorganic solid electrolyte-containing composition) in the inorganic solid electrolyte-containing composition, and specifically, it is a value measured by carrying out filtration through a 0.02 μm membrane filter and then Karl Fischer titration.

The inorganic solid electrolyte-containing composition according to the embodiment of the present invention includes an aspect containing not only an inorganic solid electrolyte but also an active material, as well as a conductive auxiliary agent or the like (the composition in this aspect is referred to as the "electrode composition").

Hereinafter, components that are contained and components that can be contained in the inorganic solid electrolyte-containing composition according to the embodiment of the present invention will be described.

<Inorganic Solid Electrolyte>

The inorganic solid electrolyte-containing composition according to the embodiment of the present invention contains an inorganic solid electrolyte.

In the present invention, the inorganic solid electrolyte is an inorganic solid electrolyte, where the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl)imide (LiTFSI)) since it does not include any organic substance as a principal ion-conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has a lithium ion conductivity.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based inorganic solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which contain, as elements, at least Li, S, and P and have a lithium ion conductivity; however, the sulfide-based inorganic solid electrolytes may appropriately include elements other than Li, S, and P.

Examples of the sulfide-based inorganic solid electrolyte include a lithium ion-conductive inorganic solid electrolyte satisfying the composition represented by Formula (S1).

$$L_{a1}M_{b1}P_{c1}S_{d1}A_{e1} \quad (S1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S$:$P_2S_5$. In a case where the ratio between $Li_2S$ and $P_2S_5$ is set in the above-described range, it is possible to increase a lithium ion conductivity. Specifically, the lithium ion conductivity can be preferably set to $1\times10^{-4}$ S/cm or more and more preferably set to $1\times10^{-3}$ S/cm or more. The upper limit is not particularly limited but practically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This is because treatments at a normal temperature is possible, and it is possible to simplify manufacturing steps.

(ii) Oxide-Based Inorganic Solid Electrolyte

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3\leq xa\leq0.7$, and ya satisfies $0.3\leq ya\leq0.7$]; $Li_{xb}La_{yb}Zr_{zb}M^{bb}_{mb}O_{nb}$ ($M^{bb}$ is one or more elements selected from Al, Mg, Ca, Sr, V, Nb, Ta, Ti, Ge, In, and Sn, xb satisfies $5\leq xb\leq10$, yb satisfies $1\leq yb\leq4$, zb satisfies $1\leq zb\leq4$, mb satisfies $0\leq mb\leq2$, and nb satisfies $5\leq nb\leq20$); $Li_{xc}B_{yc}M^{cc}_{zc}O_{nc}$ ($M^{cc}$ is one or more elements selected from C, S, Al, Si, Ga, Ge, In, and Sn, xc satisfies $0\leq xc\leq5$, yc satisfies $0\leq yc\leq1$, zc satisfies $0\leq zc\leq1$, and nc satisfies $0\leq nc\leq6$); $Li_{xd}(Al, Ga)_{ya}(Ti, Ge)_{zd}Si_{ad}P_{md}O_{nd}$ (xd satisfies $1\leq xd\leq3$, yd satisfies $0\leq yd\leq1$, zd satisfies $0\leq zd\leq2$, ad satisfies $0\leq ad\leq1$, md satisfies $1\leq md\leq7$, and nd satisfies $3\leq nd\leq13$); $Li_{(3-2xe)}M^{ee}_{xe}D^{ee}O$ (xe represents a number of 0 or more and 0.1 or less, and $M^{ee}$ represents a divalent metal atom, $D^{ee}$ represents a halogen atom or a combination of two or more halogen atoms); $Li_{xf}Si_{yf}O_{zf}$ (xf satisfies $1\leq xf\leq5$, yf satisfies $0<yf\leq3$, zf satisfies $1\leq zf\leq10$); $Li_{xg}S_{yg}O_{zg}$ (xg satisfies $1\leq xg\leq3$, yg satisfies $0<yg\leq2$, zg satisfies $1\leq zg\leq10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0\leq xh\leq1$, and yh satisfies $0\leq yh\leq1$); and $Li_7La_3Zr_2O_{12}$ (LLZ) having a garnet-type crystal structure.

In addition, a phosphorus compound containing Li, P, or O is also desirable. Examples thereof include lithium phosphate ($Li_3PO_4$); LiPON in which a part of oxygen atoms in lithium phosphate are substituted with a nitrogen element; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, it is also possible to preferably use $LiA^1ON$ ($A^1$ is one or more elements selected from Si, B, Ge, Al, C, and Ga).

(iii) Halide-Based Inorganic Solid Electrolyte

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited; however, examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited; however, examples thereof include $LiBH_4$, $Li_4(BH_4)_3I$, and $3LiBH_4$—LiCl.

The inorganic solid electrolyte is preferably particulate. In this case, the particle diameter (the volume average particle diameter) of the inorganic solid electrolyte is not particularly limited; however, it is preferably 0.01 μm or more and more preferably 0.1 μm or more. The upper limit is preferably 100 μm or less and more preferably 50 μm or less.

The particle diameter of the inorganic solid electrolyte is measured according to the following procedure. Using water (heptane in a case where the inorganic solid electrolyte is unstable in water), the inorganic solid electrolyte particles are diluted in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle size distribution analyzer LA-920 (product name, manufactured by Horiba Ltd.), and a quartz cell for measurement at a temperature of 25° C. to obtain the volume average particle diameter. Other detailed conditions and the like can be found in Japanese Industrial Standards (JIS) Z8828: 2013 "particle diameter Analysis-Dynamic Light Scattering" as necessary. Five samples per level are produced and measured, and the average values thereof are employed.

One kind of inorganic solid electrolyte may be contained, or two or more kinds thereof may be contained.

The content of the inorganic solid electrolyte in the inorganic solid electrolyte-containing composition is not particularly limited. However, in terms of the binding property as well as in terms of dispersibility, it is preferably 50% by mass or more, more preferably 70% by mass or more, and still more preferably 90% by mass or more, in 100% by mass of the solid content. From the same viewpoint, the upper limit thereof is preferably 99.9% by mass or less, more preferably 99.5% by mass or less, and particularly preferably 99% by mass or less.

However, in a case where the inorganic solid electrolyte-containing composition contains an active material described later, regarding the content of the inorganic solid electrolyte in the inorganic solid electrolyte-containing composition, the total content of the active material and the inorganic solid electrolyte is preferably in the above-described range.

In the present invention, the solid content (solid component) refers to components that neither volatilize nor evaporate and disappear in a case where the inorganic solid electrolyte-containing composition is subjected to drying treatment at 150° C. for 6 hours in a nitrogen atmosphere at a pressure of 1 mmHg. Typically, the solid content refers to a component other than a dispersion medium described below.

<Polymer Binder>

The polymer binder contained in the inorganic solid electrolyte-containing composition according to the embodiment of the present invention is formed by containing a polymer having each constitutional component described later, and it contains one or two or more polymer binders that are dissolved in a dispersion medium contained in the inorganic solid electrolyte-containing composition. In a case of using this polymer binder in combination with the inorganic solid electrolyte and the dispersion medium, excellent dispersion characteristics can be exhibited in the inorganic solid electrolyte-containing composition even in a case where the concentration of solid contents is increased, and an increase in interface resistance can be reduced while maintaining the binding force of the solid particles in a case where a constitutional layer is formed therefrom.

In the present invention, a polymer (also referred to as a binder forming polymer) that is contained in a polymer binder and forms this polymer binder dissolves the polymer binder in a dispersion medium and has each of the constitutional components (X), (A), and (N), which will be described later. The dissolution of the polymer binder in the dispersion medium is as described above.

—Constitutional Component (X)—

The constitutional component (X) contained in the binder forming polymer is a constitutional component having a polymerized chain. Since the binder forming polymer has the constitutional component (X), it is possible to enhance the effect of excluding volumes between the polymer binders, and it is possible to improve the dispersion characteristics.

This constitutional component (X) may have a polymerized chain, and examples thereof include a constitutional component derived from a polycondensable compound having a polycondensable group and a polymerized chain. The polycondensable group is appropriately determined according to the main chain structure of the binder forming polymer. For example, in a case of a sequential polymerization polymer described later, a condensable functional group is selected, and in a case of a chain polymerization polymer, a polymerizable group (an ethylenic unsaturated group) is selected.

This constitutional component (X) may contain a nitrogen atom. For example, a constitutional component that forms a polymerized chain may contain a nitrogen atom, and more specifically, it may be a constitutional component derived from acrylamide. In one preferred form according to the present invention, a case where a nitrogen atom that forms an amino group is contained in a partial structure in which the constitutional component (X) is incorporated into the main chain of the polymer or in a partial structure which serves as a side chain other than the polymerized chain (a case of also corresponding to the constitutional component (N)) belongs not to the constitutional component (X) but to the constitutional component (N). On the other hand, in the present invention, the constitutional component (X) may not contain a nitrogen atom.

Although a functional group selected from the group (a) of functional groups described later may be contained in the constitutional component (X), it is preferably not contained therein. That is, it is preferable that the constitutional component (X) does not correspond to the constitutional component (A). However, even in a case where the polymerized chain of the constitutional component (X) contains the following functional group as a linking group described later, this functional group is a group that functions as a linking group, and thus it shall not be regarded as a functional group selected from the following group (a) of functional groups. In addition, regarding a case where the constitutional component (X) is derived from a compound having a polycondensable group and a polymerized chain, which will be described later, even in a case where the above-described linking group that links these polycondensable group and polymerized chain has a functional group, since this functional group does not sufficiently exhibit the function of adsorbing or adhering to solid particles, such a case shall be included in an aspect (a constitutional component that does not correspond to the constitutional component (A)) in which the constitutional component (X) does not have a functional group.

The polymerized chain is a molecular chain that constitutes a side chain of the binder forming polymer, where it is a molecular chain in which two or more repeating units of one or more kinds are bonded. For example, a chain consisting of a general polymer, specifically, a sequential polymerization polymer or a chain polymerization polymer described later can be applied thereto without particular limitation. It is preferable that this polymerized chain does not have a nitrogen atom, which forms an amino group in the main chain thereof, for example, that the main chain is a molecular chain that is formed of a polymer other than a polyalkyleneimine and other than a polyalkylamine. In the present invention, it is preferably a polymerized chain having a repeating unit represented by Formula ($L_P$) (for example, a polymerized chain consisting of a polyether or a polymerized chain consisting of a polysiloxane), and more preferably a polymerized chain consisting of a (meth)acrylic polymer.

Formula ($L_P$)

$$*-\!(X-L)_n\!-*$$

In Formula ($L_P$), X represents a divalent substituent, L represents a single bond or a linking group, and n indicates an (average) degree of polymerization.

The substituent that can be adopted as X is not particularly limited. Examples thereof include a group obtained by further removing one hydrogen atom from a group appropriately selected from the substituent Z described later, and in terms of dispersion characteristics, preferred examples thereof include each group that can be adopted as $R^{X4}$ described later. X may have a substituent, and it preferably has a group represented by $-L^{X4}-R^{X9}$ in Formula (X2) described later, in particular, in a case where the polymerized chain having a repeating unit represented by Formula ($L_P$) is a chain consisting of a chain polymerization polymer.

L is selected depending on the kind of polymerized chain. For example, in a case of a chain consisting of a chain polymerization polymer, a single bond is adopted, and in a case of a chain consisting of a sequential polymerization polymer, a linking group is adopted. The linking group that can be adopted as L is not particularly limited as long as it is a group that can be bonded to another repeating unit, and it is appropriately selected depending on the kind of polymerized chain. This linking group is generally a linking group having a heteroatom, and examples thereof include an ester bond (—CO—O—), an ether bond (—O—), a carbonate bond (—O—CO—), an amide bond (—CO—N($R^N$)—), a urethane bond (—N($R^N$)—CO—), a urea bond (—N($R^N$)—CO—N($R^N$)—), and an imide bond (—CO—N($R^N$)—CO—). In each of the above bonds, $R^N$ represents a hydrogen atom, an alkyl group having 1 to 6 carbon atoms, or an aryl group having 6 to 10 carbon atoms. It is noted that any bonding portion of the linking group may be bonded to X described above. The linking group is preferably a group containing no nitrogen atom, and it is more preferably an ester bond, an ether bond, a carbonate bond, or the like.

n indicates an (average) degree of polymerization and may be 2 or more, and it is appropriately determined in consideration of the number average molecular weight of the polymerized chain described later. For example, the degree of polymerization n is preferably 3 to 500, more preferably 4 to 300, and still more preferably 4 to 100. It is noted that the upper limit in each numerical value range can be set to 50, 40, or 15.

Two or more repeating units contained in the polymerized chain may be the same or different from each other. In a case where two or more repeating units are different from each other, the bonding mode thereof is not particularly limited and may be a random type, an alternating type, or a block type.

Examples of the polymerized chain having a repeating unit represented by Formula ($L_P$) include a chain consisting of a chain polymerization polymer and a polymerized chain consisting of a sequential polymerization polymer, and more specific examples thereof preferably include a polymerized chain consisting of a (meth)acrylic polymer, a polymerized chain consisting of polystyrene, a polymerized chain consisting of polyether, a polymerized chain consisting of polyester, a polymerized chain consisting of polycarbonate, and a polymerized chain consisting of polysiloxane.

Examples of the polymerized chain consisting of polyether include a polyalkyleneoxy chain and a polyaryleneoxy chain. Examples of the alkylene group and the arylene group include a group obtained by removing one hydrogen atom from an alkyl group or aryl group appropriately selected from the substituent Z described below, and preferred examples thereof include an alkylene group and an arylene group, which can be adopted as $R^{X4}$ described later.

The polymerized chain consisting of polysiloxane is preferably a polymerized chain having a structure represented by $-(SiR_2-O)_n-$. R represents a hydrogen atom or a substituent, and it is preferably a substituent. The substituent is not particularly limited. Examples thereof include those selected from the substituent Z described later, where an alkyl group or an aryl group is preferable, and an alkyl group having 1 to 6 carbon atoms is preferable. The (average) repetition number n is as described above. Examples of the constitutional component (X) having a polymerized chain consisting of polysiloxane include a constitutional component derived from a terminal (meth)acrylic-modified silicone compound (for example, product number X-22-174ASX, manufactured by Shin-Etsu Silicone Co., Ltd.).

Examples of the polymerized chain consisting of polyester include a known chain consisting of polyester. Examples thereof include a polyester polymerized chain obtained by a reaction of a polyol such as an alkylene glycol with a polybasic acid such as an aromatic dicarboxylic acid or an aliphatic dicarboxylic acid; and a polyester polymerized chain obtained by ring-opening polymerization of a cyclic ester compound such as a caprolactone monomer.

Preferred examples of the chain consisting of a chain polymerization polymer include a polymerized chain consisting of a (meth)acrylic polymer and a polymerized chain consisting of polystyrene.

The polymerized chain consisting of a (meth)acrylic polymer preferably has a constitutional component derived from the (meth)acrylic compound (M1) described later or a constitutional component derived from the vinyl compound (M2) described later. Among the above, it is more preferably a polymerized chain having a constitutional component derived from one or two or more (meth)acrylic acid ester compounds, and it is still more preferably a polymerized chain having a constitutional component derived from a (meth)acrylic acid alkyl ester compound. The (meth)acrylic acid alkyl ester compound preferably includes an ester compound of a long-chain alkyl group having 4 or more carbon atoms (preferably 6 or more carbon atoms) and can further include an ester compound of a short-chain alkyl group having 3 or less carbon atoms. The content of each constitutional component in the polymerized chain is not particularly limited and is appropriately set. For example, the content of the constitutional component derived from the (meth)acrylic compound (M1) in the polymerized chain is, for example, preferably 30% to 100% by mass, and it can also be set to 50% to 80% by mass. The content of the constitutional component derived from the (meth)acrylic acid alkyl ester compound is preferably 50% to 100% by mass, and it can also be set to 60% to 80% by mass. In addition, in a case where a constitutional component derived from a (meth)acrylic acid long-chain alkyl ester compound and a constitutional component derived from a (meth)acrylic acid short-chain alkyl ester compound are contained, and the content of the constitutional component derived from a (meth)acrylic acid long-chain alkyl ester compound is preferably 20% to 100% by mass and more preferably 50% to 100% by mass. The content of the constitutional component derived from a (meth)acrylic acid short-chain alkyl ester compound is preferably 5% to 80% by mass and more preferably 5% to 40% by mass.

The group bonded to the terminal of the polymerized chain is not particularly limited, and an appropriate group can be adopted according to a polymerization method or the like. Examples thereof include a hydrogen atom, an alkyl group, an aryl group, and a hydroxy group, and in terms of dispersion characteristics, preferred examples thereof include an alkyl group (the number of carbon atoms is preferably 1 to 20, more preferably 4 to 20, and still more preferably 4 to 12). This group may further have a substituent; however, it is preferably unsubstituted.

It is preferable that the polymerized chain is bonded to the polycondensable group directly or through a linking group.

Such a linking group is not particularly limited; however, examples thereof include an alkylene group (preferably having 1 to 12 carbon atoms, more preferably 1 to 6 carbon atoms, and still more preferably having 1 to 3 carbon atoms), an alkenylene group (preferably having 2 to 6 carbon atoms and more preferably having 2 or 3 carbon atoms), an arylene group (preferably having 6 to 24 carbon atoms and more preferably having 6 to 10 carbon atoms), an oxygen atom, a sulfur atom, an imino group (—$NR^N$—: $R^N$ represents a hydrogen atom, an alkyl group having 1 to 6 carbon atoms or an aryl group having 6 to 10 carbon atoms), a carbonyl group, a phosphate linking group (—O—P(OH)(O)—O—), a phosphonate linking group (—P(OH)(O)—O—), and a group involved in the combination thereof. The linking group is preferably a group obtained by combining an alkylene group, an arylene group, a carbonyl group, an oxygen atom, a sulfur atom, and an imino group, more preferably a group obtained by combining an alkylene group, an arylene group, a carbonyl group, an oxygen atom, a sulfur atom, and an imino group. Preferred examples of the linking group include a linking group including a structural part derived from a chain transfer agent (for example, 3-mercaptopropionic acid) to be used in the synthesis of the above-described polymerized chain, a polymerization initiator, or the like; and a linking group obtained by bonding this structural part to a structural part derived from the (meth)acrylic compound (M1) that reacts with the chain transfer agent. Specific examples of the linking group include a linking group of the constitutional component (X) contained in each of the polymers synthesized in Examples. The number of atoms that constitute the linking group and the number of linking atoms are as described below.

In the present invention, the number of atoms constituting the linking group is preferably 1 to 36, more preferably 1 to 24, and still more preferably 1 to 12. The number of linking atoms of the linking group is preferably 12 or less, more preferably 10 or less, and particularly preferably 8 or less. The lower limit thereof is 1 or more. The number of linking atoms refers to the minimum number of atoms linking predetermined structural parts. For example, in a case of $—O—C(═O)—CH_2—CH_2—S—$, the number of atoms that constitute the linking group is 10; however, the number of linking atoms is 5.

The constitutional component (X) is preferably a constitutional component represented by Formula (X1) or (X2).

Formula (X1)

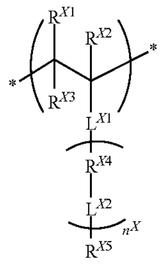

(Formula X2)

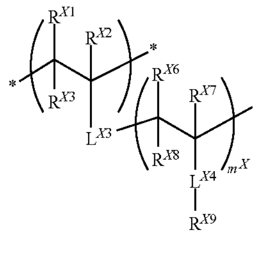

In Formula (X1), $R^{X1}$ to $R^{X3}$ represent a hydrogen atom or a substituent. The substituent which can be adopted as $R^{X1}$ to $R^{X3}$ is not particularly limited, and examples thereof include a group selected from the substituent Z described later. Among them, an alkyl group or a halogen atom is preferable. $R^{X1}$ to $R^{X3}$ are each preferably a hydrogen atom, and $R^{X2}$ is preferably a hydrogen atom or methyl.

$L^{X1}$ represents a linking group. As the linking group that can be adopted as $L^{X1}$, the above-described linking group that links the above-described polycondensable group to the above-described polymerized chain can be applied without particular limitation. However, $L^{X1}$ is more preferably a group containing a —CO—O— group or an oxygen atom, and particularly preferably a —CO—O— group. In addition, the number of atoms constituting the linking group and the number of linking atoms are as described above; however, the number of atoms constituting $L^{X1}$ is particularly preferably 1 to 6, and the number of linking atoms is still more preferably 1 to 3.

$R^{X4}$ represents a hydrocarbon group or an alkylsilylene group.

The hydrocarbon group that can be adopted as $R^{X4}$ is not particularly limited, and examples thereof include an alkylene group, an alkenyl group, and an arylene group, where an alkylene group is preferable. Examples of the alkylene group that can be adopted as $R^{X4}$ include a group obtained by further removing one hydrogen atom from each of the corresponding groups of the substituent Z described later. However, the number of carbon atoms of the alkylene group is more preferably 1 to 8. In a case where $—(R^{X4}\text{-}L^{X2})\text{-}$ is an alkyleneoxy group, the number of carbon atoms of the alkylene group is more preferably 1 to 6.

The alkylsilylene group that can be adopted as $R^{X4}$ is not particularly limited, and preferred examples thereof include an $—SiR_2—$ group in the above-described polymerized chain having a structure represented by $—(SiR_2—O)_n—$.

$L^{X2}$ represents a linking group and has the same meaning as the linking group that can be adopted as L.

$R^{X5}$ represents a substituent and has the same meaning as the group bonded to the terminal of the polymerized chain having a repeating unit represented by Formula ($L_P$). The substituent that can be adopted as $R^{X5}$ may further have a substituent; however, it is preferably unsubstituted.

$n^X$ represents an average degree of polymerization, is a number of 2 or more, and has the same meaning as the average degree of polymerization n of the polymerized chain having a repeating unit represented by Formula ($L_P$).

It is preferable that each of the substituents and linking groups in Formula (X1) does not contain a nitrogen atom.

The constitutional component represented by Formula (X1) may have one kind of repeating unit $—(R^{X4}\text{-}L^{X2})\text{-}$ in one component or may have two or more kinds thereof.

In a case where the binder forming polymer has a plurality of constitutional components represented by Formula (X1), the constitutional components represented by Formula (X1) may be the same or different from each other.

Preferred examples of the polymerized chain $—(R^{X4}\text{-}L^{X2})n^X—$ bonded to $L^{X1}$, in the constitutional component represented by Formula (X1), include the above-described chain consisting of a sequential polymerization polymer, and particularly preferred examples thereof include a polymerized chain consisting of polyether, a polymerized chain consisting of polysiloxane, a polymerized chain consisting of polyester, and a polymerized chain consisting of polycarbonate.

In Formula (X2), $R^{X1}$ to $R^{X3}$ represent a hydrogen atom or a substituent and have the same meaning as $R^{X1}$ to $R^{X3}$ in Formula (X1).

$L^{X3}$ represents a linking group. As the linking group that can be adopted as $L^{X3}$, the above-described linking group that links the above-described polycondensable group to the above-described polymerized chain can be applied without particular limitation. However, it is still more preferably a linking group including a structural part derived from a chain transfer agent or the like, which is used in the synthesis of the above-described polymerized chain, and it is particularly preferably a linking group obtained by bonding this structural part to a structural part derived from the (meth) acrylic compound (M1) that reacts with the chain transfer agent.

Examples thereof include a —COO-alkylene group-OCO-alkylene group-S— group (here, the alkylene group has the same meaning as the alkylene group that can be adopted as $R^{X4}$), and specific examples thereof include a linking group contained in a reaction product between 3-mercaptopropionic acid and glycidyl (meth)acrylate.

In Formula (X2), $R^{X6}$ to $R^{X8}$ represent a hydrogen atom or a substituent and have the same meaning as $R^{X1}$ to $R^{X3}$ in Formula (X1).

$L^{X4}$ represents a single bond or a linking group, and As the linking group that can be adopted as $L^{X4}$, the above-described linking group that links the above-described polycondensable group to the above-described polymerized chain can be applied without particular limitation. However, the linking group that can be adopted as $L^{X4}$ is still more preferably a group containing a —CO—O— group or a group containing a —CO—$NR^N$— group ($R^N$ is as described above), and it is particularly preferably a —CO—O— group or a —CO—$NR^N$— group. In addition, the number of atoms constituting the linking group and the number of linking atoms are as described above; however, the number of atoms constituting $L^{X4}$ is particularly preferably 1 to 6, and the number of linking atoms is still more preferably 1 to 3.

$R^{X9}$ represents a hydrogen atom or a substituent, and it is preferably a substituent. The substituent that can be adopted as $R^{X9}$ is not particularly limited, and examples thereof include groups selected from the substituent Z described later. Among them, an alkyl group or an aryl group is preferable, and a long-chain alkyl group having 4 or more carbon atoms is more preferable. The substituent that can be adopted as $R^{X9}$ may further have a substituent (for example, a halogen atom); however, it is preferably unsubstituted.

$m^X$ represents an average degree of polymerization, is a number of 2 or more, and has the same meaning as the average degree of polymerization n of the polymerized chain having a repeating unit represented by Formula ($L_P$).

It is preferable that each of the substituents and linking groups in Formula (X2) does not contain a nitrogen atom.

The constitutional component represented by Formula (X2) may have one kind of repeating unit in one component or may have two or more kinds thereof.

In a case where the binder forming polymer has a plurality of constitutional components represented by Formula (X2), the constitutional components represented by Formula (X2) may be the same or different from each other.

Preferred examples of the polymerized chain bonded to $L^{X3}$ in the constitutional component represented by Formula (X2) include the above-described chain consisting of a chain polymerization polymer, and particularly preferred examples thereof include a polymerized chain consisting of a (meth)acrylic polymer and a polymerized chain consisting of polystyrene.

The constitutional component (X) is preferably a constitutional component derived from a (meth)acrylic acid polymerized chain ester compound which has an ethylenic unsaturated group as a polycondensable group and contains —C(=O)—O— as a linking group.

From the viewpoint that the effect of excluding volumes between the polymer binders can be further enhanced and thus excellent dispersion characteristics can be realized, the constitutional component (X) has, for example, an SP value of preferably 16.0 to 22.5 $MPa^{1/2}$ and more preferably an SP value of 16.0 to 21.5 $MPa^{1/2}$. The SP value of the constitutional component (X) is a value calculated according to a method described later. The difference (in terms of absolute value) between the SP values of the constitutional component (X) and a dispersion medium described below is not particularly limited; however, in terms of the improvement of the solubility of the polymer binder in the dispersion medium and the dispersion characteristics, it is preferably 0.0 to 6.0 $MPa^{1/2}$, more preferably 0.0 to 3.0 $MPa^{1/2}$, still more preferably 0.0 to 2.0 $MPa^{1/2}$, and particularly preferably 0.0 to 1.0 $MPa^{1/2}$.

In the constitutional component (X), it suffices that the degree of polymerization in the repeating unit is 2 or more; however, the constitutional component (X) is preferably a constitutional component derived from a macromonomer having a number average molecular weight of 200 or more according to the measuring method described later. In terms of dispersion characteristics, the number average molecular weight of the macromonomer is preferably 1,000 to 100,000, more preferably 1,000 to 50,000, still more preferably 2,000 to 20,000, and it can also be set to 2,000 to 10,000.

The constitutional component (X) is not particularly limited; however, it is preferably a constitutional component that is derived from a constitutional component derived from a (meth)acrylic compound (M1) described later or a constitutional component derived from a vinyl compound (M2) described later, or derived from a compound obtained by introducing a polymerized chain (carrying out a substitution with a polymerized chain) into this compound (M1) or (M2).

Specific examples of the constitutional component (X) include those contained in polymers synthesized in Examples and those shown below; however, the present invention is not limited thereto. In the specific examples, $R^Y$ and $R^Z$ represent a linking group or a substituent. It is noted that in the following specific examples, although the degree of polymerization of the repeating unit is specifically indicated, it can be appropriately changed in the present invention.

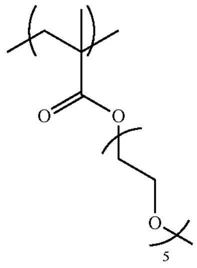

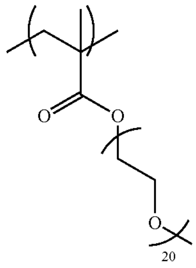

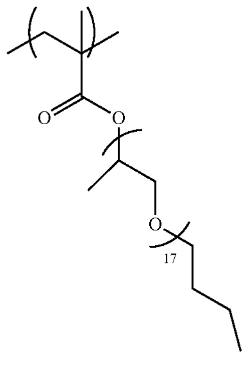

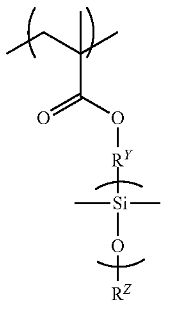

-continued
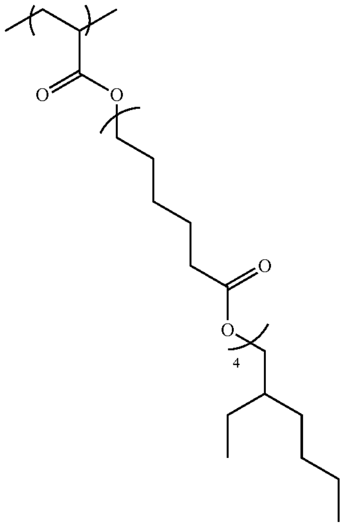
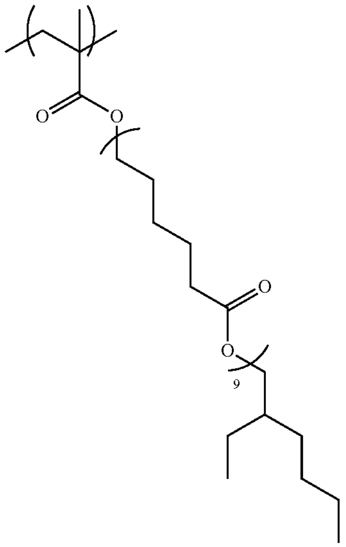
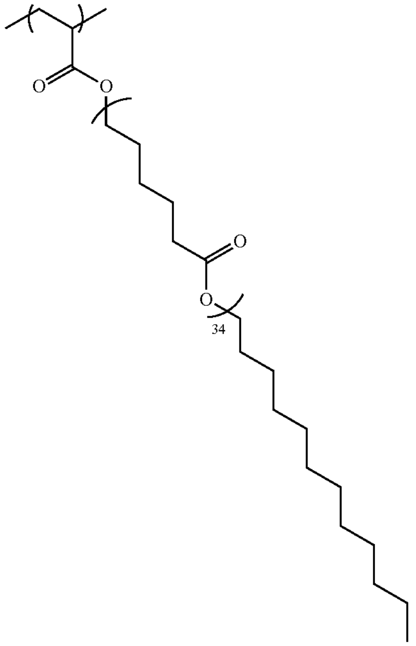
-continued
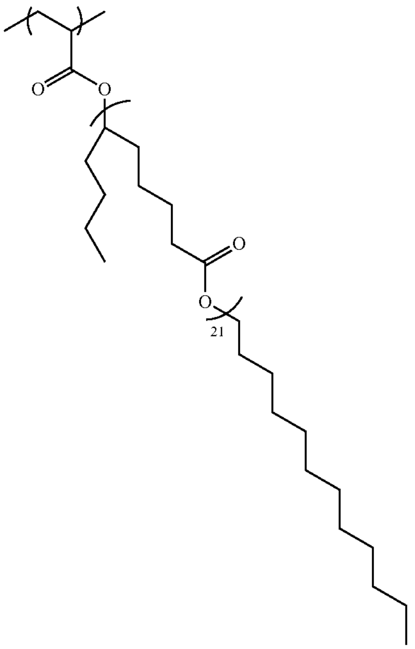
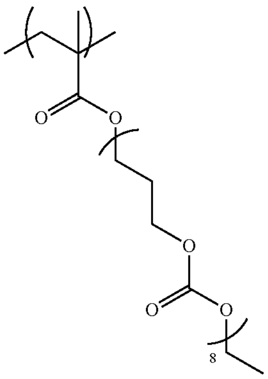
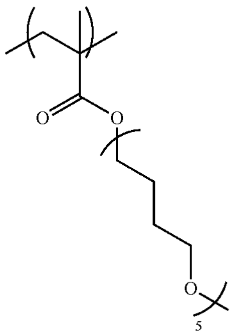
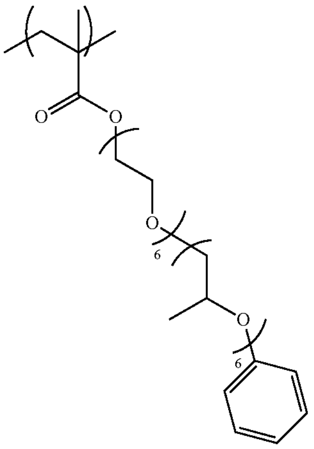

-continued

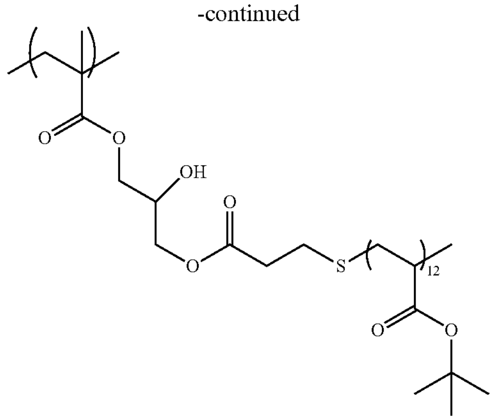

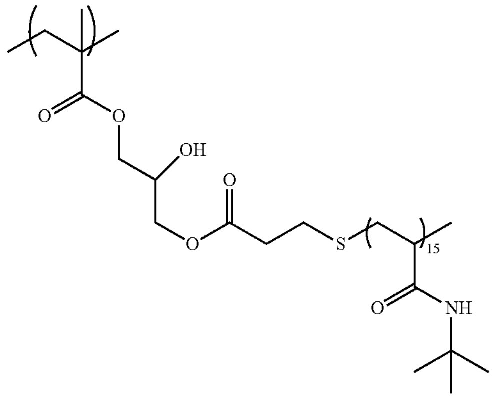

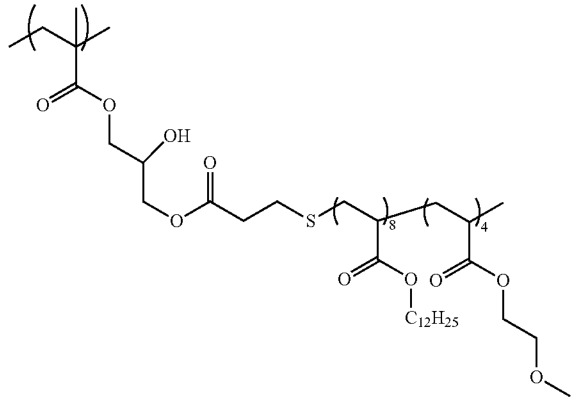

—Constitutional Component (A)—

The constitutional component (A) contained in the binder forming polymer is a constitutional component having at least one (one kind of) functional group of the following group (a) of functional groups. Since the binder forming polymer has the constitutional component (A), the adsorptivity or the adhesiveness to the solid particles can be reinforced.

It suffices that the constitutional component (A) has at least one (one kind of) functional group, and, in general, it preferably has 1 to 3 kinds of functional groups.

It suffices that the constitutional component (A) has the above-described functional group, and examples thereof include a constitutional component derived from a polycondensable compound having at least one functional group of the following group (a) of functional groups. The polycondensable compound is not particularly limited as long as it has the above-described functional group; however, it is preferably a compound that has a polycondensable group, a substituent having a polar functional group or the above-described functional group, and a linking group that appropriately links a polycondensable group and a substituent. The polycondensable group has the same meaning as the polycondensable group in the constitutional component (X). The substituent is not particularly limited; however, examples thereof include a group selected from the following substituent Z described later, and an alkyl group is preferred. As the linking group, the above-described linking group that links the above-described polycondensable group to the above-described polymerized chain can be applied without particular limitation. However, it is particularly preferably a —CO—O— group or a —CO—$NR^N$— group.

It is preferable that the constitutional component (A) does not have a polymerized chain. For example, it is preferable that the following substituent having the above-described functional group is a non-polymerizable substituent, where it has a polymerized chain that does not have the above-described functional group. In one form according to the present invention, in a case of having a polymerized chain, the constitutional component (A) belongs to an appropriate constitutional component depending on the strength of the actions of the polymerized chain and the functional group; however, it preferably belongs to, for example, the constitutional component (A). In addition, the constitutional component (A) may contain a nitrogen atom; however, it preferably does not contain a nitrogen atom (that is, the constitutional component (A) preferably does not correspond to the constitutional component (N)). In one preferred form of the present invention, in a case where the constitutional component (A) contains a nitrogen atom that forms an amino group (in a case of corresponding to the constitutional component (N) as well), it belongs not to the constitutional component (A) but to the constitutional component (N).

<Group (a) of Functional Groups>

A sulfonate group (a sulfo group), a phosphate group, a phosphonate group, a carboxy group, a hydroxy group, an oxetane group, an epoxy group, a dicarboxylic acid anhydride group, a thiol group (a sulfanyl group), an ether group, a thioether group, a thioester group, a fluoroalkyl group, and salts of these groups Each of the sulfonate group, the phosphate group (the phosphoryl group), the phosphonate group, and the like, which are included in the group (a) of functional groups, is not particularly limited; however, it has the same meaning as the corresponding group of the substituent Z described later.

The dicarboxylic acid anhydride group is not particularly limited; however, it includes a group obtained by removing one or more hydrogen atoms from a dicarboxylic acid anhydride as well as a constitutional component itself obtained by copolymerizing a polymerizable dicarboxylic acid anhydride. The group obtained by removing one or more hydrogen atoms from a dicarboxylic acid anhydride is preferably a group obtained by removing one or more hydrogen atoms from a cyclic dicarboxylic acid anhydride. Examples thereof include acyclic carboxylic acid anhydrides such as acetic acid anhydride, propionic acid anhydride, and benzoic acid anhydride; and cyclic dicarboxylic acid anhydrides such as maleic acid anhydride, phthalic acid anhydride, fumaric acid anhydride, succinic acid anhydride, and itaconic acid anhydride. The polymerizable dicarboxylic acid anhydride is not particularly limited; however, examples thereof include a dicarboxylic acid anhydride having an unsaturated bond in the molecule, and a polymerizable cyclic dicarboxylic acid anhydride is preferable. Specific examples thereof include maleic acid anhydride and itaconic acid anhydride.

The ether group (—O—), the thioether group (—S—), and the thioester group (—CO—S—, —CS—O—, —CS—S—) respectively mean bonds shown in the parentheses. The terminal group bonded to this group is not particularly limited, and examples thereof include a group selected from the substituent Z described later, examples of which include an alkyl group. It is noted that the ether group is included in a carboxy group, a hydroxy group, an oxetane group, an epoxy group, a dicarboxylic acid anhydride group, and the like; however, —O— contained in these groups shall not be regarded as the ether group. The same applies to the thioether group. In one form according to the present invention, the ether group, the thioether group, and the thioester group are groups that do not form the above-described polymerized chain, and it is preferable that they are not, for example, the respective groups corresponding to L in Formula ($L_P$).

The fluoroalkyl group is a group obtained by substituting at least one hydrogen atom of an alkyl group or cycloalkyl group with a fluorine atom, and it preferably has 1 to 20 carbon atoms, more preferably 2 to 15 carbon atoms, and still more preferably 3 to 10 carbon atoms. Regarding the number of fluorine atoms on the carbon atom, a part of the hydrogen atoms may be substituted, or all the hydrogen atoms may be substituted (a perfluoroalkyl group).

A group that can adopt a salt of a sulfonate group (a sulfo group), a phosphate group, a phosphonate group, a carboxy group, or the like may form a salt. Examples of the salt include various metal salts and a salt of ammonium or amine.

In terms of the adsorptivity (adhesiveness) to solid particles as well as in terms of dispersion characteristics, the functional group contained in the constitutional component (A) is preferably a carboxy group or a hydroxy group. In a case where the constitutional component (A) has two or more kinds of functional groups, the combination thereof is not particularly limited and can be appropriately determined. For example, a combination of a carboxy group and a hydroxy group is preferable.

The polycondensable compound from which the constitutional component (A) is derived is not particularly limited as long as it has the above-described functional group, and examples thereof include a compound obtained by introducing the above-described functional group into a raw material compound that constitutes a binder forming polymer. Examples thereof include a (meth)acrylic compound (M1) or a vinyl compound (M2), which will be described later, or a compound obtained by introducing the above-described functional group into this compound (M1) or (M2).

—Constitutional Component (N)—

The constitutional component (N) that forms a binder forming polymer is a constitutional component that contains a nitrogen atom. In a case where the binder forming polymer has an excess of the constitutional component (N), the polymer binder is likely to undergo oxidative deterioration, and thus the cycle characteristics of the all-solid state secondary battery deteriorate. Therefore, in the present invention, in terms of suppressing the deterioration of the cycle characteristics, the constitutional component (N) is contained such that the content thereof is less than 10% by mole in all the constitutional components (here, they constitute the main chain) of the binder forming polymer.

It suffices that this constitutional component (N) contains a nitrogen atom in any one of the components, and this component (N) has a nitrogen atom in a partial structure incorporated in the main chain or in the side chain of the binder forming polymer.

In one preferred form according to the present invention, the constitutional component (N) is a constitutional component containing a nitrogen atom, where the constitutional component (N) may be a constitutional component having a polymerized chain or may be a constitutional component having no polymerized chain (a constitutional component having a low molecular weight). It is preferable that the nitrogen atom is contained in a partial structure of the side chain of the binder forming polymer other than the polymerized chain.

In another preferred form according to the present invention, the constitutional component (N) is a constitutional component containing a nitrogen atom that forms an amino group in a partial structure that is incorporated into a main chain of the polymer or in a partial structure that serves as a side chain other than the polymerized chain. In this form, the amino group contained in the constitutional component (N) includes a monovalent amino group ($—NR^{NN}_2$) a divalent amino group (also referred to as an imino group, $>NR^{NN}$), a trivalent amino group (—N<), and a tetravalent amino group (an ammonium salt). $R^{NN}$ represents a hydrogen atom or a substituent (preferably, a substituent Z described later). However, the amino group present in the partial structure incorporated in the main chain of the polymer refers to a characteristic group that becomes an amino group by itself, where the characteristic group is the one that does not form, in the main chain, a functional group (a bond) such as an amide bond, an imide bond, a urethane bond, or a urea bond, together with a characteristic group or a functional group, such as a carbonyl group or an ester bond.

In both of the above aspects, examples of the polymerized chain include a molecular chain in which two or more repeating units of one or two more kinds are bonded, and specific examples thereof include the polymerized chain described in the constitutional component (X).

The constitutional component (A) may have a functional group selected from the group (a) of functional groups; however, it preferably does not have a functional group.

As described above, the constitutional components (X), (A), and (N) are different from each other in that each of them requires a polymerized chain, a specific functional group, or the above-described nitrogen atom. However, in a case where a certain constitutional component corresponds to all of the constitutional components (X), (A), and (N), an aspect in which the certain constitutional component preferentially belongs to the constitutional component (N) is also one of the preferred aspects.

Examples of such a constitutional component (N) include a constitutional component derived from a polycondensable compound having a polycondensable group, a substituent of a non-polymer, and a linking group that appropriately links a polycondensable group and a substituent. The polycondensable group, the non-polymerizable substituent, and the linking group have the same meanings as the polycondensable group, the substituent, and the linking group, respectively, in the constitutional component (A). Examples of the constitutional component (N) include a constitutional component that constitutes a polymer such as polyalkyleneimine, polyalkylamine, poly(meth)acrylic alkylamine, poly(meth)acrylamide, poly(meth)acrylonitrile, polyamide, polyimide, polyurea, or polyurethane, as well as a constitutional component having an amino group as a substituent. In one form according to the present invention, among the constitutional components that constitute the above-described polymer, preferred examples of the constitutional component include those that constitute polyalkyleneimine, polyalkylamine, poly(meth)acrylicalkylamine, poly(meth) acrylamide, and poly(meth)acrylonitrile.

The binder forming polymer may have one kind or two or more kinds of each of the constitutional components.

In addition to each of the above-described constitutional components, the binder forming polymer may have another constitutional component derived from, for example, the (meth)acrylic compound (M1) or the vinyl compound (M2), which will be described later.

In the present invention, it is preferable that each of the constitutional components, particularly the other constitutional component does not have a crosslinkable group, for example, an ethylenic unsaturated group, for example, a carbon-carbon double bond.

—Binder Forming Polymer—

The binder forming polymer is not particularly limited as long as it is a polymer that has each of the above-described constitutional components and is dissolved in a dispersion medium, and various known polymers can be used.

The primary structure (the bonding mode of the constitutional component) of the binder forming polymer is not particularly limited and any bonding mode such as a random structure, a block structure, an alternating structure, or a graft structure can be adopted. The molecular structure of the binder forming polymer is not particularly limited, and examples thereof include a branched structure and a multibranched structure (a graft structure, a star structure, a dendritic structure, or the like). Among them, a branched structure or a star structure is more preferable.

In the present invention, the (multi)branched structure refers to a branched structure which is contained in a polymerized chain of a polymer, and it refers to, for example, a structure in which one or a plurality of other polymerized chains (side chains) are bonded to the main chain. The polymer having a branched structure refers to a structure in which one polymerized chain is bonded to the main chain in a branched shape (as a side chain), and it refers to, for example, a polymer structure containing the constitutional component (X) having a polymerized chain. In addition, a polymer having a star structure (also referred to as a star polymer) among the multibranched structures has a structure in which a plurality of (generally three or more) arm parts (polymerized chains) are radially bonded to a core part (a branch point) serving as the center, and the polymer has, in general, one core part in one molecule of the polymer. On the other hand, the polymer having a graft structure refers to a polymer in which a large number of polymerized chains (as side chains) are bonded to one main chain in a branched shape, and the polymer having a dendritic structure refers to a polymer having a plurality of core parts.

In the star polymer, the core part is an atom or a linking group having a valence of trivalent or higher valent, where the valence is preferably trivalent to octavalent and more preferably trivalent to hexavalent. As the core part, a known core part can be appropriately selected, and examples thereof include a core part described later. In the star polymer, the number of arm parts bonded to one core part is generally 3 or more, and the valence thereof is preferably the same as that of the core part.

Hereinafter, the binder forming polymer will be described. The contents thereof can be applied to an arm part and a polymerized chain constituting each polymerized chain (a main chain and a side chain) in a binder forming polymer having a linear structure as well as a binder forming polymer having a (multi)branched structure.

Preferred examples of the binder forming polymer (those containing the above-described arm part and each polymerized chain in addition to the polymer having a linear structure) include a polymer having, in the main chain, at least one bond selected from a urethane bond, a urea bond, an amide bond, an imide bond, an ester bond, or a silyloxy bond, or a polymerized chain of carbon-carbon double bonds. In the present invention, the main chain of the binder forming polymer is preferably a molecular chain that is formed of a polymer other than polyalkyleneimine and polyalkylamine.

In the present invention, the main chain of the polymer (containing the above-described arm part and each polymerized chain) refers to a linear molecular chain in which all the molecular chains that constitute the polymer other than the main chain can be conceived as a branched chain or a pendant group with respect to the main chain. Although it depends on the mass average molecular weight of the branched chain regarded as a branched chain or pendant group, the longest chain among the molecular chains that constitute the polymer is typically the main chain. In this case, a terminal group at the polymer terminal is not included in the main chain. On the other hand, side chains of the polymer refer to branched chains other than the main chain and include a short chain and a long chain. The terminal group of the polymer is not particularly limited, and an appropriate group can be adopted according to a polymerization method or the like. Examples thereof include a hydrogen atom, an alkyl group, an aryl group, a hydroxy group, and a residue of a polymerization initiator.

The above bond is not particularly limited as long as it is contained in the main chain of the polymer, and it may have any aspect in which it is contained in the constitutional component (the repeating unit) and/or an aspect in which it is contained as a bond that connects different constitutional components to each other). Further, the above-described bond contained in the main chain is not limited to one kind, it may be 2 or more kinds, and it is preferably 1 to 6 kinds and more preferably 1 to 4 kinds. In this case, the bonding mode of the main chain is not particularly limited. The main chain may randomly have two or more kinds of bonds and may be a main chain that is segmented to a segment having a specific bond and a segment having another bond.

Examples of the polymer having, among the above bonds, a urethane bond, a urea bond, an amide bond, an imide bond, or an ester bond in the main chain include sequential polymerization (polycondensation, polyaddition, or addition condensation) polymers such as polyurethane, polyurea, polyamide, polyimide, and polyester, polysiloxane, and copolymers thereof. The copolymer may be a block copolymer having each of the above polymers as a segment, or a random copolymer in which each constitutional component that constitutes two or more polymers among the above polymers is randomly bonded.

Examples of the polymer having a polymerized chain of carbon-carbon double bonds in the main chain include chain polymerization polymers such as a fluorine-based polymer (a fluorine-containing polymer), a hydrocarbon-based polymer, a vinyl polymer, and a (meth)acrylic polymer. The polymerization mode of these chain polymerization polymers is not particularly limited. The chain polymerization polymer may be any one of a block copolymer, an alternating copolymer, or a random copolymer; however, it is preferably a random copolymer.

As the binder forming polymer, each of the above-described polymers can be appropriately selected; however, a vinyl polymer or a (meth)acrylic polymer is preferable.

Examples of the (meth)acrylic polymer suitable as the binder forming polymer include a copolymer of each of the above-described constitutional components as well as a copolymer with an appropriate (meth)acrylic compound (M1), where the polymer consists of a copolymer containing 50% by mass or more of a constitutional component derived from the (meth)acrylic compound. Here, in a case where each of the constitutional components (X), (A), and (N) is a constitutional component derived from the (meth)acrylic compound, the content of each of the constitutional components is included for calculation in the content of the constitutional component derived from the (meth)acrylic compound. The content of the constitutional component derived from the (meth)acrylic compound is still more preferably 60% by mass or more and particularly preferably 70% by mass or more. The upper limit content can be set to 100% by mass; however, it can also be set to 97% by mass or less. Further, the (meth)acrylic polymer is also preferably a copolymer with the vinyl compound (M2) other than the (meth)acrylic compound (M1). In this case, the content of the constitutional component derived from the vinyl compound (M2) is 50% by mass or less, and it is preferably 3% to 40% by mass and preferably 3% to 30% by mass. The (meth)acrylic polymer may have a constitutional component derived from the (meth)acrylamide compound as a constitutional component thereof (excluding the constitutional component that forms the above-described polymerized chain); however, the content with respect to all the constitutional components constituting the polymer is preferably less than 50% by mole and more preferably 40% by mole or less.

Examples of the vinyl polymer suitable as the binder forming polymer include a copolymer of each of the above-described constitutional components as well as a copolymer with an appropriate vinyl compound (M2), where the polymer consists of a copolymer containing 50% by mass or more of a constitutional component derived from the vinyl compound. Here, in a case where each of the constitutional components (X), (A), and (N) is a constitutional component derived from the vinyl compound, the content of each of the constitutional components is included for calculation in the content of the constitutional component derived from the vinyl compound. The content of the constitutional component derived from the vinyl compound is more preferably 60% by mass or more and still more preferably 65% by mass or more. The upper limit content can be set to 100% by mass; however, it is preferably 95% by mass or less and more preferably 90% by mass or less. The vinyl polymer is also preferably a copolymer with the (meth)acrylic compound (M1). In this case, it suffices that the content of the constitutional component derived from the (meth)acrylic compound (M1) is less than 50% by mass, where the content of the constitutional component is, for example, preferably 0% to 40% by mass and more preferably 0% to 30% by mass.

Examples of the (meth)acrylic compound (M1) include a compound other than the compound from which the constitutional components (X), (A), and (N) are derived, among the (meth)acrylic acid ester compound, the (meth)acrylamide compound, the (meth)acrylonitrile compound, and the like. Among them, a (meth)acrylic acid ester compound is preferable. Examples of the (meth)acrylic acid ester compound include a (meth)acrylic acid alkyl ester compound and a (meth)acrylic acid aryl ester compound, where a (meth)acrylic acid alkyl ester compound is preferable. The number of carbon atoms of the alkyl group that constitutes the (meth)acrylic acid alkyl ester compound is not particularly limited; however, it can be set to, for example, 1 to 24, and it is preferably 3 to 20, more preferably 4 to 16, and still more preferably 6 to 14, in terms of dispersion characteristics and adhesiveness. The number of carbon atoms of the aryl group that constitutes the aryl ester is not particularly limited; however, it can be set to, for example, 6 to 24, and it is preferably 6 to 10 and more preferably 6. In the (meth)acrylamide compound, the nitrogen atom of the amide group may be substituted with an alkyl group or an aryl group.

The vinyl compound (M2) is not particularly limited. However, among the vinyl compounds that are copolymerizable with the (meth)acrylic compound (M1), a vinyl compounds other than the vinyl compound, from which the constitutional components (X), (A), and (N) are derived, are preferable, and examples thereof include aromatic vinyl compounds such as a styrene compound, a vinylnaphthalene compound, a vinylcarbazole compound, a vinylimidazole compound, and a vinylpyridine compound and further include an allyl compound, a vinyl ether compound, a vinyl ester compound (for example, a vinyl acetate compound), a dialkyl itaconate compound. Examples of the vinyl compound include the "vinyl monomer" disclosed in JP2015-88486A.

The (meth)acrylic compound (M1) and the vinyl compound (M2) may have a substituent; however, an aspect in which the (meth)acrylic compound (M1) and the vinyl compound (M2) are unsubstituted is one of the preferred aspects. The substituent is not particularly limited, and examples thereof include a group selected from the substituent Z described later. However, a group other than the functional group included in the above-described group (a) of functional groups is preferable.

The (meth)acrylic compound (M1) and the vinyl compound (M2) are preferably a compound represented by Formula (b-1). It is preferable that this compound is different from the above-described compound from which the constitutional component (X) or the constitutional component (A) are derived.

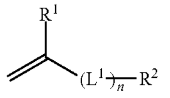

(b-1)

In the formula, $R^1$ represents a hydrogen atom, a hydroxy group, a cyano group, a halogen atom, an alkyl group (preferably having 1 to 24 carbon atoms, more preferably 1 to 12 carbon atoms, and particularly preferably 1 to 6 carbon atoms), an alkenyl group (preferably having 2 to 24 carbon atoms, more preferably 2 to 12 carbon atoms, and particularly preferably 2 to 6 carbon atoms), an alkynyl group (preferably having 2 to 24 carbon atoms, more preferably 2 to 12 carbon atoms, and particularly preferably 2 to 6 carbon atoms), or an aryl group (preferably having 6 to 22 carbon atoms and more preferably 6 to 14 carbon atoms). Among the above, a hydrogen atom or an alkyl group is preferable, and a hydrogen atom or a methyl group is more preferable.

$R^2$ represents a hydrogen atom or a substituent. The substituent that can be adopted as $R^2$ is not particularly limited. However, examples thereof include an alkyl group (preferably a linear chain although it may be a branched chain), an alkenyl group (preferably having 2 to 12 carbon atoms, more preferably 2 to 6 carbon atoms, and particularly preferably 2 or 3 carbon atoms), an aryl group (preferably having 6 to 22 carbon atoms and more preferably 6 to 14 carbon atoms), an aralkyl group (preferably having 7 to 23 carbon atoms and more preferably 7 to 15 carbon atoms), and a cyano group. The number of carbon atoms of the alkyl group has the same meaning as the number of carbon atoms of the alkyl group that constitutes the (meth)acrylic acid alkyl ester compound, and the same applies to the preferred range thereof.

$L^1$ is a linking group and is not particularly limited. However, the above-described linking group that links the above-described polycondensable group to the above-described polymerized chain can be applied without particular limitation. However, $L^1$ is particularly preferably a —CO—O— group.

In a case where $L^1$ adopts a —CO—O— group or a —CO—N($R^N$)— group ($R^N$ is as described above), the compound represented by Formula (b-1) corresponds to the (meth)acrylic compound (M1), the others correspond to the vinyl compound (M2).

n is 0 or 1 and preferably 1. However, in a case where-$(L^1)_n$-$R^2$ represents one kind of substituent (for example, an alkyl group), n is set to 0, and $R^2$ is set to a substituent (an alkyl group).

Specific examples of the (meth)acrylic compound (M1) and the vinyl compound (M2) include, in addition to those described above, compounds from which constitutional components in polymers synthesized in Examples are derived; however, the present invention is not limited thereto.

The binder forming polymer may have one kind of the (meth)acrylic compound (M1) or the vinyl compound (M2) or may have two or more kinds thereof.

The content of each constitutional component in the binder forming polymer is not particularly limited, is determined by appropriately considering the physical properties and the like of the entire polymer, and is set, for example, in the following range.

The content of each constitutional component in the binder forming polymer is set, for example, in the following range such that the total content of all the constitutional components is 100% by mass.

The content of the constitutional component (X) is not particularly limited, and it can be appropriately adjusted with respect to the total content of all the constitutional components in consideration of, for example, dispersion characteristics. The content of the constitutional component (X) is preferably 20% to 100% by mass, more preferably 30% to 100% by mass, and still more preferably 40% to 97% by mass.

The content of the constitutional component (A) is not particularly limited; however, in terms of, for example, the dispersion characteristics as well as the binding property of solid particles, it is preferably 0.1% to 20% by mass and more preferably 0.1% to 10% by mass with respect to the total content of all the constitutional components.

As described above, it suffices that the content of the constitutional component (N) is less than 10% by mole with respect to the total number of moles of all the constitutional components, and in terms of, for example, oxidative deterioration resistance, it is preferably 5% by mole or less and more preferably 3% by mole or less. The lower limit value thereof is preferably 0% by mole in terms of cycle characteristics; however, it can be practically set to 2% by mole. The content of the constitutional component (N) is preferably 5% by mass or less, more preferably 0% to 3% by mass, and still more preferably 0% to 2% by mass, based on the total content of all the constitutional components.

The content of a constitutional component (also referred to as another constitutional component) other than the constitutional component (X), the constitutional component (A), and the constitutional component (N) is not particularly limited; however, it is preferably 10% to 80% by mass and more preferably 20% to 50% by mass with respect to the total content of all the constitutional components.

The binder forming polymer may have a substituent. The substituent is not particularly limited; however, examples thereof preferably include a group selected from the following substituent Z.

As described above, the multibranched polymer has a core part and at least three polymeric arm parts bonded to the core part. This core part is preferably an atomic group having a molecular weight of 200 or more, and it is more preferably an atomic group having a molecular weight of 300 or more. The upper limit thereof is preferably 5,000 or less, more preferably 4,000 or less, and still more preferably 3,000 or less. It is preferable that this core part is not limited to a tetravalent carbon atom. The valence of the core part is not particularly limited as long as it is trivalent or higher valent, and it is, for example, preferably trivalent to octavalent and more preferably trivalent to hexavalent. The core part is preferably a linking group represented by L-(S—)$_n$ of Formula (1), and the arm part is preferably $P^1$ of Formula (1).

The multibranched polymer is preferably a polymer represented by Formula (1).

$$L\left(S-P^1\right)_n \tag{1}$$

In the formula, L represents a trivalent or higher valent linking group. The valence of L is practically 8 or less, and the valence thereof is preferably 3 to 6.

$P^1$ represents a polymer chain. n represents an integer of 3 or more and is the same as the valence of L. The n pieces of $P^1$'s may be the same as or different from each other. $P^1$ constitutes the arm part. At least one, preferably two or more, and more preferably all n pieces of the n pieces of polymer chains are polymer chains derived from the binder forming polymer.

—Core Part—

The core part of the multibranched polymer preferably has a sulfur atom, and it preferably has a sulfur atom at a connecting position to the arm part (a position directly connected to the arm part). It is more preferable that the core part has a linking group of Formula (1a).

$$-(CR^f_2)_n-O(C{=}O)-(CR^f_2)_n-S- \tag{1a}$$

In Formula (1a), n is an integer of 0 to 10, preferably an integer of 1 to 6, and more preferably 1 or 2.

$R^f$ represents a hydrogen atom or a substituent, and it is preferably a hydrogen atom. The substituent that can be adopted as $R^f$ is not particularly limited, and examples thereof include a halogen atom (for example, a fluorine atom, a chlorine atom, an iodine atom, or a bromine atom), an alkyl group (preferably having 1 to 12 carbon atoms, more preferably 1 to 6 carbon atoms, and particularly preferably 1 to 3 carbon atoms), an alkoxy group (preferably having 1 to 12 carbon atoms, more preferably 1 to 6 carbon atoms, and particularly preferably 1 to 3 carbon atoms), an acyl group (preferably having 2 to 12 carbon atoms, more preferably 2 to 6 carbon atoms, and particularly preferably 2 or 3 carbon atoms), an aryl group (preferably having 6 to 22 carbon atoms and more preferably 6 to 10 carbon atoms), an alkenyl group (preferably having 2 to 12 carbon atoms and more preferably 2 to 5 carbon atoms), a hydroxy group, a nitro group, a cyano group, a mercapto group, an amino group, an amide group, and an acidic group (a carboxyl group, a phosphate group, a sulfonate group, or the like) (this group of substituents is referred to as the substituent T). Each acidic group may be a salt thereof. Examples of the counter ion include an alkali metal ion, an alkaline earth metal ion, an ammonium ion, and an alkylammonium ion.

The multibranched polymer is more preferably represented by Formula (2).

(2)

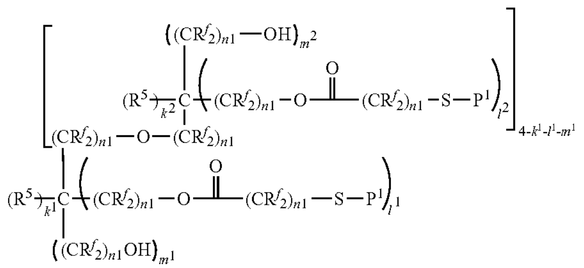

In Formula (2), $R^5$ represents a hydrogen atom or a substituent (for example, the substituent T). Among the above, it is preferably a hydrogen atom, a halogen atom, or a substituted or unsubstituted alkyl group (preferably having 1 to 12 carbon atoms, more preferably 1 to 6 carbon atoms, and particularly preferably 1 to 3 carbon atoms), a substituted or unsubstituted alkoxy group (preferably having 1 to 12 carbon atoms, more preferably 1 to 6 carbon atoms, and particularly preferably 1 to 3 carbon atoms), or a substituted or unsubstituted aryl group (preferably having 6 to 22 carbon atoms and more preferably 6 to 14 carbon atoms). Examples of the substituent which may be contained in the above-described alkyl group, alkoxy group, and aryl group include the substituent T, among which a hydroxy group is preferable. The above-described alkyl group may be provided through an oxygen atom, and it may be, for example, an oligooxyalkylene group. The oligoalkylene group is preferably represented by Formula (OA). Examples of the alkyl group having a halogen atom include a fluoroalkyl group.

$$*\text{-}[L^R\text{-}O]_{mR}\text{-}L^R\text{-}* \qquad \text{(OA)}$$

In Formula (OA), $L^R$ represents an alkylene group (preferably having 1 to 12 carbon atoms, more preferably having 1 to 6 carbon atoms, and particularly preferably having 1 to 3 carbon atoms). $L^R$ may have any substituent T. mR is preferably an integer of 1 to 1,000, more preferably an integer of 1 to 100, still more preferably an integer of 1 to 30, and particularly preferably an integer of 1 to 10. * is a bonding position.

In Formula (2), $R^f$ and $P^1$ have the same meanings as $R^f$ of Formula (1a) and $P^1$ of Formula (1), respectively.

n1's are each independently an integer of 0 to 10, and it is preferably 0 to 8, more preferably 0 to 6, and still more preferably 1 to 3.

$k^1$ is an integer of 0 to 3, and it is preferably 0 to 2.

$l^1$ is an integer of 0 to 4, and it is preferably 1 to 4, more preferably 2 to 4, and still more preferably 2 to 3.

$m^1$ is an integer of 0 to 3, and it is preferably 0 to 2 and more preferably 0 or 1.

$k^2$ is an integer of 0 to 3, and it is preferably 0 to 2 and more preferably 0 or 1.

$l^2$ is an integer of 0 to 3, and it is preferably 1 to 3 and more preferably 2 or 3.

$m^2$ is an integer of 0 to 3, and it is preferably 0 to 2 and more preferably 0 or 1.

However, the total sum of $k^1$, $l^1$, and $m^1$ is 4 or less and preferably 3 or less. The total sum of $k^2$, $l^2$, and $m^2$ is 3 or less. The number of groups having $P^1$ is 3 or more and more preferably 4 or more. That is, "$l^1+[l^2\times(4-k^1-l^1-m^1)]$" is 3 or more and is preferably 4 or more. The upper limit thereof is preferably 8 or less and more preferably 6 or less. It is preferable that "the sulfur atom (S)" in Formula (2) constitutes a connecting portion to the arm part $P^1$, and it is preferable that the core part and the arm part $P^1$ are connected through —S—.

In Formula (2), the groups represented by the same reference numerals may be the same as or different from each other.

Specific examples A-1 to A-9 of the compound (substrate) from which the core part is derived will be shown below; however, those that can be adopted in the present invention are not limited to these specific examples. It is noted that in a case of being substituted with the arm part $P^1$ or a group containing the arm part $P^1$, the hydrogen atom of the sulfanyl group (—SH group) in these compounds becomes the multibranched polymer represented by Formula (1) or Formula (2).

A-1

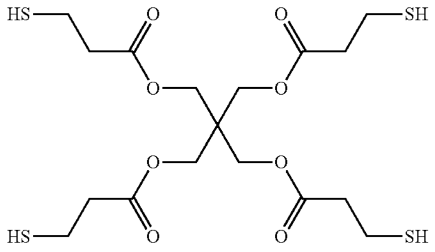

A-2

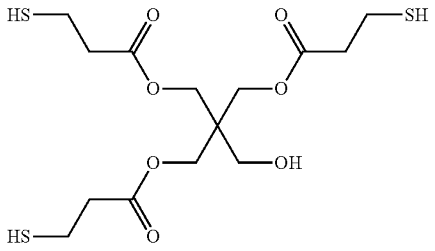

-continued
A-3
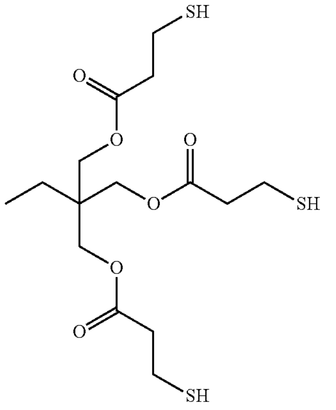
A-4
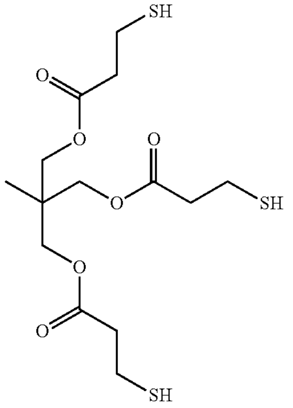
A-5
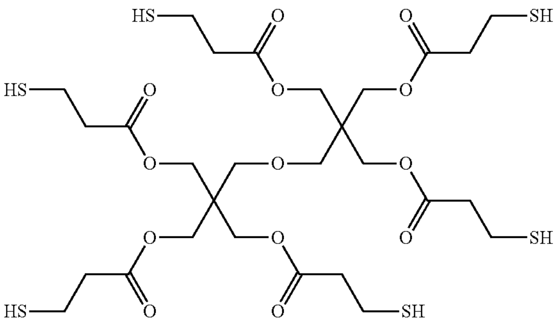
A-6
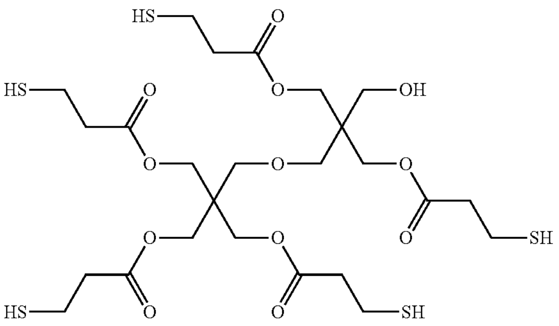
-continued
A-7
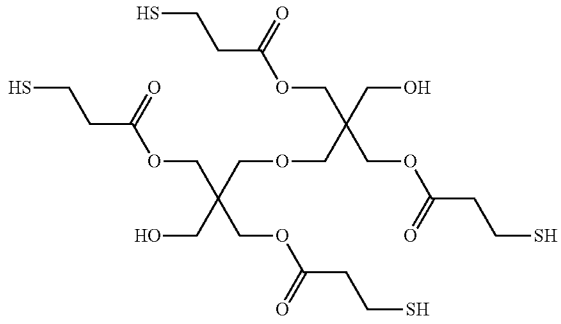
A-8
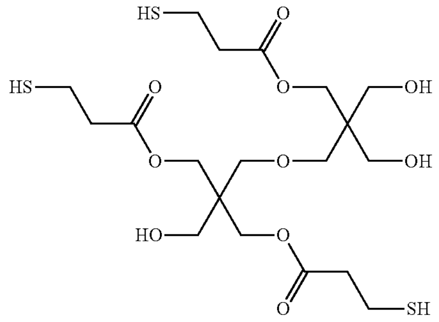
A-9
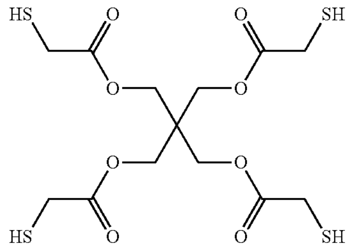
It is also preferable that the compound from which the core part of the multibranched polymer is derived is represented by any one of Formulae (3) to (8).
(3)
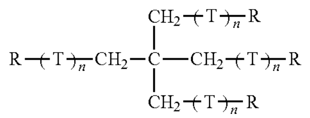
(4)
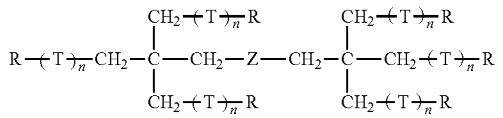
(5)
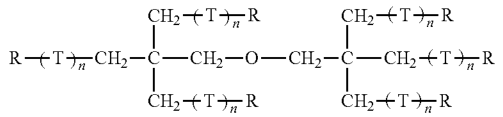

-continued (6)

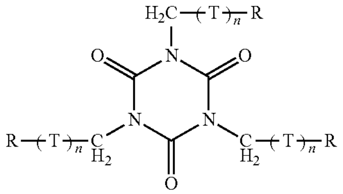

(7)

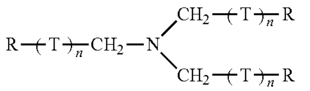

(8)

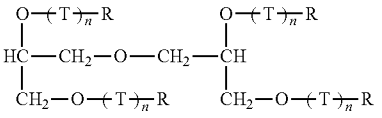

In Formulae (3) to (8), R represents SH, a hydroxy group, or an alkyl group (preferably having 1 to 3 carbon atoms). However, it has 3 or more pieces of SH's in the molecule.

T represents a linking group, and it is preferably a group represented by any one of Formulae (T1) to (T6), or a linking group obtained by combining two or more (preferably two or three) of these groups. Examples of the linking group obtained by the combination include a linking group (an —OCO-alkylene group) obtained by combining a linking group represented by Formula (T6) and a linking group represented by Formula (T1). In the group represented by Formula (T1) to Formula (T6), the bonding site bonded to R described above may be any bonding site; however, in a case where T is an oxyalkylene group (a group represented by Formula (T2) to Formula (T5)) or an —OCO-alkylene group, it is preferable that the terminal carbon atom (the bonding site) is bonded to R described above. A plurality of T's present in each of the above formulae may be the same or different from each other.

Z is preferably a group represented by Formula (Z1) or Formula (Z2), which represents a linking group.

(T1)

(T2)

$—OCH_2—$ (T3)

$—OCH_2CH_2—$ (T4)

$—OCH_2CH_2CH_2—$ (T5)

$—OCH_2CH_2CH_2CH_2—$ (T6)

—OCO—

(Z1)

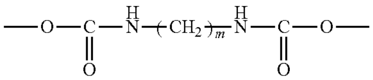

(Z2)

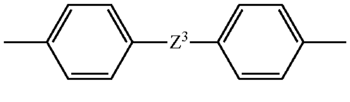

In Formulae (3) to (8), n is an integer, each of which is preferably an integer of 0 to 14, more preferably an integer of 0 to 5, and particularly preferably an integer of 1 to 3.

In Formula (T1) and Formula (Z1), m is an integer of 1 to 8, preferably an integer of 1 to 5, and more preferably an integer of 1 to 3. A plurality of R's and T's present in one molecule may be the same or different from each other. In a case where the terminal of T is an oxyalkylene group, it is preferable that the terminal on the carbon atom side is bonded to R described above.

$Z^3$ is a linking group, and it is preferably an alkylene group having 1 to 12 carbon atoms, and it is more preferably an alkylene group having 1 to 6 carbon atoms. Among the above, a 2,2-propanediyl group is particularly preferable.

—Arm Part—

At least one of the arm parts contained in the multibranched polymer preferably contains the constitutional component (X), and it more preferably contains the constitutional component (X) and the constitutional component (A) and contains the constitutional component (N) of which the content is less than 10% by mole in all constitutional components that form an arm (that is, contains a chain derived from the binder forming polymer described above). Suitable examples of the arm part include an arm part containing the constitutional component (X) having, as the polymerized chain, a polymerized chain that has a polyethylene chain as a main chain (for example, a polymerized chain consisting of the above-described chain polymerization polymer). In one preferred aspect of the present invention, preferably two or more, and more preferably all of the arm parts of the multibranched polymer contain the constitutional component (X), and they preferably contain the constitutional component (X) and the constitutional component (A) and contain the constitutional component (N), the content of which is less than 10% by mole in all the constitutional components that constitute the arm. The number average molecular weight (according to the measuring method described later) of the arm part is appropriately set according to the molecular weight of the multibranched polymer; however, it is, for example, preferably 200 or more and more preferably 500 or more. The upper limit thereof is preferably 1,000,000 or less, more preferably 500,000 or less, and still more preferably 5,000 or less.

The binder forming polymer can be synthesized with a known method by selecting a raw material compound depending on the kind of bond of the main chain and subjecting the raw material compound to polyaddition, polycondensation, chain polymerization, or the like.

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, and oleyl), an alkynyl group (preferably an alkynyl group having 2 to 20 carbon atoms, for example, ethynyl, butadienyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present invention, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably an aralkyl group having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples thereof include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); a heterocyclic oxycarbonyl group (a group in which a —O—CO-group is bonded to the above-described heterocyclic group); an amino group (preferably an amino group having 0 to 20 carbon atoms, an alkylamino group, or an arylamino group, for example, an amino (—$NH_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, or a nicotinoyloxy group); an aryloyloxy group (preferably an aryloyloxy group having 7 to 23 carbon atoms, for example, a benzoyloxy group or a naphthoyloxy group); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxysilyl group having 6 to 42 carbon atoms, for example, a triphenyloxysilyl group), a phosphoryl group (preferably a phosphate group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a phosphonate group (preferably a phosphonate group having 0 to 20 carbon atoms, for example, —PO(O$R^P$)$_2$), a sulfo group (a sulfonate group), a carboxy group, a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and/or the like may be cyclic or chained, may be linear or branched.

—Physical Properties, Characteristics, or Like of Binder Forming Polymer or Polymer Binder—

The polymer binder or the binder forming polymer, which is used in the present invention, preferably has the following physical properties or characteristics.

The glass transition temperature Tg of the binder forming polymer is not particularly limited and can be set to 120° C. or lower. It is preferably 50° C. or lower, more preferably −30° C. or lower, and still more preferably −40° C. or lower, from the viewpoint that the dispersion characteristics can be further improved and the cycle characteristics can also be improved. The lower limit value thereof is not particularly limited and can be set to, for example, −160° C. It is noted that the glass transition temperature Tg of the binder forming polymer can be appropriately adjusted depending on the composition (the kind or content of the constitutional component), molecular structure, or the like of the polymer.

The glass transition temperature Tg of the binder forming polymer is a glass transition temperature measured according to the following method. That is, the glass transition point is measured under the following conditions using a differential scanning calorimeter (manufactured by SII Crystal Technology Inc., DSC7000) using a dried sample of the binder forming polymer. The measurement is carried out twice for the same sample, and the result of the second measurement is employed.

Atmosphere in measurement room: Nitrogen (50 mL/min)

Temperature rising rate: 5° C./min

Measurement start temperature: −100° C.

Measurement end temperature: 200° C.

Sample pan: aluminum pan

Mass of measurement sample: 5 mg

Calculation of Tg: Tg is calculated according to rounding off the decimal point of the intermediate temperature between the descent start point and the descent end point of the DSC chart.

The glass transition temperature Tg can be adjusted depending on the kind or the composition (the kind and the content of the constitutional component) of the binder forming polymer.

In terms of dispersion characteristics, the binder forming polymer has, for example, an SP value of preferably 17.0 to 25.0 $MPa^{1/2}$, more preferably 17.0 to 23.0 $MPa^{1/2}$, still more preferably 17.0 to 21.0 $MPa^{1/2}$, and particularly preferably 18.0 to 20.5 $MPa^{1/2}$.

The method of calculating an SP value will be described.

First, the SP value ($MPa^{1/2}$) of each constitutional component constituting the binder forming polymer is determined according to the Hoy method unless otherwise specified (see the following formula in H. L. Hoy JOURNAL OF PAINT TECHNOLOGY, Vol. 42, No. 541, 1970, 76-118, and POLYMER HANDBOOK $4^{th}$, Chapter 59, VII, page 686, Table 5, Table 6, and the following formula in Table 6).

In a case where the binder forming polymer is a chain polymerization type polymer, the constitutional component has the same unit as the constitutional component derived from the raw material compound. On the other hand, a unit that is different from that of the constitutional component derived from the raw material compound is adopted in a case where the binder forming polymer is a sequential polymerization polymer. For example, in a case of polyurethane as an example, the constitutional components are conveniently determined as follows. A constitutional component derived from a polyisocyanate compound shall be a unit obtained by bonding an —O— group is two —NH—CO— groups with respect to the constitutional unit derived from the polyisocyanate compound. On the other hand, a constitutional component derived from a polyol compound shall be a unit obtained by removing two —O— groups from a constitutional unit derived from the polyol compound.

$$\delta_t = \frac{F_t + \frac{B}{\bar{n}}}{V} : B = 277$$

In the expression, $\delta_t$ indicates an SP value. $F_t$ is a molar attraction function $(J\times cm^3)^{1/2}/mol$ and represented by the following expression. V is a molar volume ($cm^3/mol$) and represented by the following expression. $\bar{n}$ is represented by the following expression.

$$F_t = \sum n_i F_{t,i} \qquad V = \sum n_i V_i$$

$$\bar{n} = \frac{0.5}{\Delta_T^{(P)}} \qquad \Delta_T^{(P)} = \sum n_i \Delta_{T,i}^{(P)}$$

In the above expression, $F_{t,i}$ indicates a molar attraction function of each constitutional unit, $V_i$ indicates a molar volume of each constitutional unit, $\Delta^{(P)}{}_{T,i}$ indicates a correction value of each constitutional unit, and $n_i$ indicates the number of each constitutional unit.

Using the obtained SP value ($MPa^{1/2}$) of each constitutional component, which is determined as described above, the SP value ($MPa^{1/2}$) of the binder forming polymer is calculated from the following calculation expression. It is noted that the SP value of the constitutional component obtained according to the above document is converted into an SP value ($MPa^{1/2}$) (for example, 1 $cal^{1/2}$ $cm^{-3/2}$≈2.05 $J^{1/2}$ $cm^{-3/2}$≈2.05 $MPa^{1/2}$) and used.

$$SP_p^2=(Sp_1^2\times W_1)+(SP_2^2\times W_2)+ \ldots$$

In the calculation expression, $SP_1$, $SP_2$ . . . indicates the SP values of the constitutional components, and $W_1$, $W_2$ . . . indicates the mass fractions of the constitutional components. In the present invention, the mass fraction of a constitutional component shall be a mass fraction of the constitutional component (the raw material compound from which this constitutional component is derived) in the binder forming polymer.

In a case where the polymer is a multibranched polymer, the SP value of the entire multibranched polymer is calculated as the sum of those which are obtained by calculating the SP value of each arm part and the SP value of the core part according to the above-described Hoy method, and then multiplying the calculated SP values by the mass fractions of the components, respectively, using the above-described calculation expression.

In addition, in a case where the arm part is a copolymer consisting of a plurality of kinds of monomers, the SP value of this arm part is calculated according to the above calculation expression.

The SP value of the polymer can be adjusted depending on the kind or the composition (the kind and the content of the constitutional component) of the binder forming polymer.

It is preferable that the SP value of the binder forming polymer satisfies a difference (in terms of absolute value) in SP value in a range described later with respect to the SP value of the dispersion medium from the viewpoint of realizing higher dispersion characteristics.

The mass average molecular weight of the binder forming polymer is not particularly limited. It is, for example, preferably 2,000 or more, more preferably 4,000 or more, and still more preferably 6,000 or more. The upper limit thereof is practically 5,000,000 or less, preferably 100,000 or less, more preferably 50,000 or less, and still more preferably 30,000 or less.

—Measurement of Molecular Weight—

In the present invention, unless specified otherwise, molecular weights of a polymer, a polymer chain and a macromonomer refer to a mass average molecular weight and number average molecular weight in terms of standard polystyrene conversion, which are determined according to gel permeation chromatography (GPC). The measuring method thereof includes, basically, a method under Conditions 1 or Conditions 2 (preferential) described below. However, depending on the kind of polymer or macromonomer, an appropriate eluant may be suitably selected and used.

(Condition 1)

Column: Connect two TOSOH TSKgel Super AWM-H (product name, manufactured by Tosoh Corporation)

Carrier: 10 mM LiBr/N-methylpyrrolidone

Measurement temperature: 40° C.

Carrier flow rate: 1.0 ml/min

Sample concentration: 0.1% by mass

Detector: refractive indicator (RI) detector (Condition 2)

Column: A column obtained by connecting TOSOH TSKgel Super HZM-H, TOSOH TSKgel Super HZ4000, and TOSOH TSKgel Super HZ2000 (all of which are product names, manufactured by Tosoh Corporation)

Carrier: tetrahydrofuran
Measurement temperature: 40° C.
Carrier flow rate: 1.0 ml/min
Sample concentration: 0.1% by mass
Detector: refractive indicator (RI) detector The watery moisture concentration of the binder (the binder forming polymer) is preferably 100 ppm (mass basis) or less. Further, as this binder, a polymer may be crystallized and dried, or a binder dispersion liquid may be used as it is.

It is preferable that the binder forming polymer is noncrystalline. In the present invention, the description that a polymer is "noncrystalline" typically refers to that no endothermic peak due to crystal melting is observed when the measurement is carried out at the glass transition temperature.

The binder forming polymer may be a non-crosslinked polymer or a crosslinked polymer. In addition, in a case where the crosslinking of the polymer progresses due to heating or voltage application, the molecular weight may be higher than the above-described molecular weight. Preferably, the binder forming polymer has a mass average molecular weight in the above-described range at the start of use of the all-solid state secondary battery.

Specific examples of the binder forming polymer include polymers synthesized in Examples; however, the present invention is not limited thereto.

The binder forming polymer, which is contained in the polymer binder, may be one kind or two or more kinds. In addition, the polymer binder may contain another polymer as long as the action of the binder forming polymer is not impaired. As another polymer, a polymer that is generally used as a binder for an all-solid state secondary battery can be used without particular limitation.

The inorganic solid electrolyte-containing composition may contain one kind or two or more kinds of polymer binders.

The content of the polymer binder in the inorganic solid electrolyte-containing composition is not particularly limited. However, in terms of dispersion characteristics and ion conductivity as well as binding properties, it is preferably 0.1% to 5.0% by mass, more preferably 0.2% to 4.0% by mass, and still more preferably 0.3% to 2.0% by mass. For the same reason, the content of the polymer binder in 100% by mass of the solid content of the inorganic solid electrolyte-containing composition is preferably 0.1% to 6.0% by mass, more preferably 0.3% to 5.0% by mass, and still more preferably 0.4% to 2.5% by mass.

In the present invention, the mass ratio [(the mass of the inorganic solid electrolyte+the mass of the active material)/(the total mass of the polymer binder)] of the total mass (the total amount) of the inorganic solid electrolyte and the active material to the mass of the polymer binder in the solid content of 100% by mass is preferably in a range of 1,000 to 1. Furthermore, this ratio is more preferably 500 to 2 and still more preferably 100 to 10.

<Dispersion Medium>

It suffices that the dispersion medium contained in the inorganic solid electrolyte-containing composition is an organic compound that is in a liquid state in the use environment, examples thereof include various organic solvents, and specific examples thereof include an alcohol compound, an ether compound, an amide compound, an amine compound, a ketone compound, an aromatic compound, an aliphatic compound, a nitrile compound, and an ester compound.

The dispersion medium may be a non-polar dispersion medium (a hydrophobic dispersion medium) or a polar dispersion medium (a hydrophilic dispersion medium); however, a non-polar dispersion medium is preferable from the viewpoint that excellent dispersibility can be exhibited. The non-polar dispersion medium generally refers to a dispersion medium having a property of a low affinity to water; however, in the present invention, examples thereof include an ester compound, a ketone compound, an ether compound, an aromatic compound, and an aliphatic compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (diethylene glycol, triethylene glycol, polyethylene glycol, dipropylene glycol, or the like), an alkylene glycol monoalkyl ether (ethylene glycol monomethyl ether, ethylene glycol monobutyl ether, diethylene glycol monomethyl ether, propylene glycol monomethyl ether, dipropylene glycol monomethyl ether, tripropylene glycol monomethyl ether, diethylene glycol monobutyl ether, or the like), alkylene glycol dialkyl ether (ethylene glycol dimethyl ether or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl-2-pyrrolidone, 2-pyrrolidinone, 1,3-dimethyl-2-imidazolidinone, F-caprolactam, formamide, N-methylformamide, acetamide, N-methylacetamide, N,N-dimethylacetamide, N-methylpropanamide, and hexamethylphosphoric triamide.

Examples of the amine compound include triethylamine, diisopropylethylamine, and tributylamine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, xylene, and perfluorotoluene.

Examples of the aliphatic compound include hexane, heptane, octane, nonane, decane, dodecane, cyclohexane, methylcyclohexane, ethylcyclohexane, cycloheptane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, propyl acetate, butyl acetate, ethyl butyrate, propyl butyrate, isopropyl butyrate, butyl butyrate, isobutyl butyrate, butyl pentanoate, pentyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, an aromatic compound, or an ether compound is more preferable.

The number of carbon atoms of the compound that constitutes the dispersion medium is not particularly limited, and it is preferably 2 to 30, more preferably 4 to 20, still more preferably 6 to 15, and particularly preferably 7 to 12.

In terms of the dispersion characteristics of the solid particles, the dispersion medium preferably has an SP value (unit: $MPa^{1/2}$) of 14 to 24, more preferably 15 to 22, and still more preferably 16 to 20. The difference (in terms of absolute value) in SP value between the dispersion medium and the binder forming polymer is not particularly limited; however, it is preferably 3 $MPa^{1/2}$ or less, more preferably 0 to 2 $MPa^{1/2}$, and still more preferably 0 to 1 $MPa^{1/2}$ from the viewpoint that the molecular chain of the binder forming polymer is extended in the dispersion medium to improve the dispersibility thereof, whereby the dispersion characteristics of the solid particles can be further improved.

The SP value of the dispersion medium is defined as a value obtained by converting the SP value calculated according to the Hoy method described above into the unit of $MPa^{1/2}$. In a case where the inorganic solid electrolyte-containing composition contains two or more kinds of dispersion media, the SP value of the dispersion medium means the SP value of the entire dispersion media, and it is the total sum of the products of the SP values and the mass fractions of the respective dispersion media. Specifically, the calculation is carried out in the same manner as the above-described method of calculating the SP value of the polymer, except that the SP value of each of the dispersion media is used instead of the SP value of the constitutional component.

The SP values (the units are omitted) of the main dispersion media are shown below.

MIBK (18.4), diisopropyl ether (16.8), dibutyl ether (17.9), diisopropyl ketone (17.9), DIBK (17.9), butyl butyrate (18.6), butyl acetate (18.9), toluene (18.5), ethylcyclohexane (17.1), cyclooctane (18.8), isobutyl ethyl ether (15.3), N-methylpyrrolidone (NMP, 25.4), perfluorotoluene (13.4)

The dispersion medium preferably has a boiling point of 50° C. or higher and more preferably 70° C. or higher at normal pressure (1 atm). The upper limit thereof is preferably 250° C. or lower and more preferably 220° C. or lower.

The inorganic solid electrolyte-containing composition may contain one kind or two or more kinds of dispersion media. Examples of the example thereof in which two or more kinds of dispersion media are contained include mixed xylene (a mixture of o-xylene, p-xylene, m-xylene, and ethylbenzene).

In the present invention, the content of the dispersion medium in the inorganic solid electrolyte-containing composition is not particularly limited and can be appropriately set. For example, in the inorganic solid electrolyte-containing composition, it is preferably 20% to 80% by mass, more preferably 30% to 70% by mass, and particularly preferably 40% to 60% by mass. In a case of setting the concentration of solid contents to be high, it is possible to set the content of the dispersion medium to 60% by mass or less, 50% by mass or less, and furthermore 40% by mass or less. The lower limit thereof is not particularly limited; however, it can be, for example, 20% by mass.

<Active Material>

The inorganic solid electrolyte-containing composition according to the embodiment of the present invention preferably contains an active material capable of intercalating and deintercalating an ion of a metal belonging to Group 1 or Group 2 of the periodic table. Examples of such active materials include a positive electrode active material and a negative electrode active material, which will be described later.

In the present invention, the inorganic solid electrolyte-containing composition containing an active material (a positive electrode active material or a negative electrode active material) may be referred to as an electrode composition (a positive electrode composition or a negative electrode composition).

(Positive Electrode Active Material)

The positive electrode active material is an active material capable of intercalating and deintercalating an ion of a metal belonging to Group 1 or Group 2 of the periodic table, and it is preferably one capable of reversibly intercalating and deintercalating a lithium ion. The above-described material is not particularly limited as long as the material has the above-described characteristics and may be a transition metal oxide, an organic substance, or an element, which is capable of being complexed with Li, such as sulfur or the like by disassembling the battery.

Among the above, as the positive electrode active material, transition metal oxides are preferably used, and transition metal oxides having a transition metal element Ma (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The mixing amount thereof is preferably 0% to 30% by mole of the amount (100% by mole) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$(LMO), $LiCoMnO_4$, $Li_2FeMn_3O_4$, $Li_2CuMn_3O_4$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particle shape. The particle diameter (the volume average particle diameter) of the positive electrode active material is not particularly limited. For example, it can be set to 0.1 to 50 μm. The particle diameter of the positive electrode active material particle can be measured using the same method as that of the particle diameter of the inorganic solid electrolyte. In order to allow the positive electrode active material to have a predetermined particle diameter, a general pulverizer or classifier is used. For example, a mortar, a ball mill, a sand mill, a vibration ball mill, a satellite ball mill, a planetary ball mill, a swirling airflow-type jet mill, or a sieve is suitably used. During pulverization, it is also possible to carry out wet-type pulverization in which water or a dispersion medium such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

A positive electrode active material obtained using a baking method may be used after being washed with water, an acidic aqueous solution, an alkaline aqueous solution, or an organic solvent.

The positive electrode active material may be used singly, or two or more thereof may be used in combination.

The content of the positive electrode active material in the inorganic solid electrolyte-containing composition is not particularly limited; however, it is preferably 10% to 97% by mass, more preferably 30% to 95% by mass, still more preferably 40% to 93% by mass, and particularly preferably 50% to 90% by mass, in 100% by mass of the solid content.

(Negative Electrode Active Material)

The negative electrode active material is an active material capable of intercalating and deintercalating an ion of a metal belonging to Group 1 or Group 2 of the periodic table, and it is preferably one capable of reversibly intercalating and deintercalating a lithium ion. The material is not particularly limited as long as it has the above-described characteristics, and examples thereof include a carbonaceous material, a metal oxide, a metal composite oxide, a lithium single body, a lithium alloy, and a negative electrode active material that is capable of forming an alloy (capable of being alloyed) with lithium. Among the above, a carbonaceous material, a metal composite oxide, or a lithium single body is preferably used from the viewpoint of reliability. An active material that is capable of being alloyed with lithium is preferable since the capacity of the all-solid state secondary battery can be increased.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by baking a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-22066A (JP-S62-22066A), JP1990-6856A (JP-H2-6856A), and JP1991-45473A (JP-H3-45473A). The carbonaceous material is not necessarily a single material and, for example, may be a mixture of natural graphite and artificial graphite described in JP1993-90844A (JP-H5-90844A) or graphite having a coating layer described in JP1994-4516A (JP-H6-4516A).

As the carbonaceous material, hard carbon or graphite is preferably used, and graphite is more preferably used.

The oxide of a metal or a metalloid element that is applied as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably noncrystalline oxides, and preferred examples thereof include chalcogenides which are reaction products between metal elements and elements in Group 16 of the periodic table. In the present invention, the metalloid element refers to an element having intermediate properties between properties a metal element and properties of a non-metalloid element. Typically, the metalloid elements include six elements including boron, silicon, germanium, arsenic, antimony, and tellurium, and further include three elements including selenium, polonium, and astatine. In addition, "noncrystalline" represents an oxide having a broad scattering band with an apex in a range of 20° to 40° in terms of 2θ value in case of being measured by an X-ray diffraction method using CuKα rays, and the oxide may have a crystalline diffraction line. The highest intensity in a crystalline diffraction line observed in a range of 40° to 70° in terms of 2θ value is preferably 100 times or less and more preferably 5 times or less with respect to the intensity of a diffraction line at the apex in a broad scattering band observed in a range of 20° to 40° in terms of 2θ value, and it is still more preferable that the oxide does not have a crystalline diffraction line.

In the compound group consisting of the noncrystalline oxides and the chalcogenides, noncrystalline oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Group 13 (IIIB) to Group 15 (VB) in the periodic table or chalcogenides are more preferable. Specific examples of the preferred noncrystalline oxide and chalcogenide preferably include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Suitable examples of the negative electrode active material which can be used in combination with a noncrystalline oxide containing Sn, Si, or Ge as a major component include a carbonaceous material capable of intercalating and/or deintercalating lithium ions or lithium metal, a lithium single body, a lithium alloy, and a negative electrode active material that is capable of being alloyed with lithium.

It is preferable that an oxide of a metal or a metalloid element, in particular, a metal (composite) oxide and the chalcogenide contain at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it is possible to improve the life of the lithium ion secondary battery.

The lithium alloy as the negative electrode active material is not particularly limited as long as it is typically used as a negative electrode active material for a secondary battery, and examples thereof include a lithium aluminum alloy, and specifically, a lithium aluminum alloy, using lithium as a base metal, to which 10% by mass of aluminum is added.

The negative electrode active material capable of forming an alloy with lithium is not particularly limited as long as it is typically used as a negative electrode active material for a secondary battery. Such an active material has a large expansion and contraction due to charging and discharging of the all-solid state secondary battery and accelerates the deterioration of the cycle characteristics. However, since the inorganic solid electrolyte-containing composition according to the embodiment of the present invention contains the polymer binder described above, and thus it is possible to suppress the deterioration of the cycle characteristics. Examples of such an active material include a (negative electrode) active material (an alloy or the like) having a silicon element or a tin element and a metal such as Al or In, a negative electrode active material (a silicon element-containing active material) having a silicon element capable of exhibiting higher battery capacity is preferable, and a silicon element-containing active material in which the content of the silicon element is 50% by mole or more with respect to all the constitutional elements is more preferable.

In general, a negative electrode including the negative electrode active material (for example, a Si negative electrode including a silicon element-containing active material or an Sn negative electrode containing an active material containing a tin element) can intercalate a larger amount of Li ions than a carbon negative electrode (for example, graphite or acetylene black). That is, the amount of Li ions intercalated per unit mass increases. As a result, the battery capacity (the energy density) can be increased. As a result, there is an advantage in that the battery driving duration can be extended.

Examples of the silicon element-containing active material include a silicon-containing alloy (for example, $LaSi_2$, $VSi_2$, La—Si, Gd—Si, or Ni—Si) including a silicon material such as Si or SiOx ($0<x\leq1$) and titanium, vanadium, chromium, manganese, nickel, copper, lanthanum, or the like or a structured active material thereof (for example, $LaSi_2/Si$), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of being alloyed with lithium.

Examples of the negative electrode active material including the tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is still more preferable to include a negative electrode active material containing silicon (Si) or a silicon-containing alloy.

The chemical formulae of the compounds obtained by the above baking method can be calculated using an inductively coupled plasma (ICP) emission spectroscopy as a measuring method from the mass difference of powder before and after baking as a convenient method.

The shape of the negative electrode active material is not particularly limited but is preferably a particle shape. The particle diameter of the negative electrode active material is not particularly limited; however, it is preferably 0.1 to 60 μm. The particle diameter of the negative electrode active material particle can be measured using the same method as that of the particle diameter of the inorganic solid electrolyte. In order to obtain the predetermined particle diameter, a general pulverizer or classifier is used as in the case of the positive electrode active material.

The negative electrode active material may be used singly, or two or more negative electrode active materials may be used in combination.

The content of the negative electrode active material in the inorganic solid electrolyte-containing composition is not particularly limited, and it is preferably 10% to 90% by mass, more preferably 20% to 85% by mass, still more preferably 30% to 80% by mass, and even still more preferably 40% to 75% by mass, in 100% by mass of the solid content.

In the present invention, in a case where a negative electrode active material layer is formed by charging a secondary battery, ions of a metal belonging to Group 1 or Group 2 in the periodic table, generated in the all-solid state secondary battery, can be used instead of the negative electrode active material. By bonding the ions to electrons and precipitating a metal, a negative electrode active material layer can be formed.

(Coating of Active Material)

The surfaces of the positive electrode active material and the negative electrode active material may be subjected to surface coating with another metal oxide. Examples of the surface coating agent include metal oxides and the like containing Ti, Nb, Ta, W, Zr, Al, Si, or Li.

Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, the surface of the electrode containing the positive electrode active material or negative electrode active material may be subjected to a surface treatment with sulfur or phosphorus.

Further, the particle surface of the positive electrode active material or negative electrode active material may be subjected to a surface treatment with an actinic ray or an active gas (plasma or the like) before and after the surface coating.

<Conductive Auxiliary Agent>

The inorganic solid electrolyte-containing composition according to the embodiment of the present invention preferably contains a conductive auxiliary agent, and for example, it is preferable that the silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. It may be, for example, graphite such as natural graphite and artificial graphite, carbon black such as acetylene black, Ketjen black, and furnace black, amorphous carbon such as needle cokes, carbon fibers such as a vapor-grown carbon fiber and a carbon nanotube, or a carbonaceous material such as graphene or fullerene, which are electron-conductive materials, and it may be also a metal powder or metal fiber of copper, nickel, or the like. A conductive polymer such as polyaniline, polypyrrole, polythiophene, polyacetylene, or a polyphenylene derivative may also be used.

In the present invention, in a case where the active material is used in combination with the conductive auxiliary agent, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

One kind of conductive auxiliary agent may be contained, or two or more kinds thereof may be contained.

The shape of the conductive auxiliary agent is not particularly limited but is preferably a particle shape.

In a case where the inorganic solid electrolyte-containing composition according to the embodiment of the present invention contains a conductive auxiliary agent, the content of the conductive auxiliary agent in the inorganic solid electrolyte-containing composition is preferably 0% to 10% by mass in 100% by mass of the solid content.

<Lithium Salt>

The inorganic solid electrolyte-containing composition according to the embodiment of the present invention preferably contains a lithium salt (a supporting electrolyte) as well.

Generally, the lithium salt is preferably a lithium salt that is used for this kind of product and is not particularly limited. For example, lithium salts described in paragraphs 0082 to 0085 of JP2015-088486A are preferable.

In a case where the inorganic solid electrolyte-containing composition according to the embodiment of the present invention contains a lithium salt, the content of the lithium salt is preferably 0.1 parts by mass or more and more preferably 5 parts by mass or more with respect to 100 parts by mass of the solid electrolyte. The upper limit thereof is preferably 50 parts by mass or less and more preferably 20 parts by mass or less.

<Dispersing Agent>

Since the above-described polymer binder functions as a dispersing agent as well, the inorganic solid electrolyte-containing composition according to the embodiment of the present invention may not contain a dispersing agent other than this polymer binder; however, it may contain a dispersing agent. As the dispersing agent, a dispersing agent that is generally used for an all-solid state secondary battery can be appropriately selected and used. Generally, a compound intended for particle adsorption and steric repulsion and/or electrostatic repulsion is suitably used.

<Other Additives>

As components other than the respective components described above, the inorganic solid electrolyte-containing composition according to the embodiment of the present invention may appropriately contain an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. In addition, a polymer other than the binder forming polymer described above, a typically used binding agent, or the like may be contained.

(Preparation of Inorganic Solid Electrolyte-Containing Composition)

The inorganic solid electrolyte-containing composition according to the embodiment of the present invention can be prepared by mixing an inorganic solid electrolyte, the above-described polymer binder, a dispersion medium, preferably, a conductive auxiliary agent, and further appropriately a lithium salt, and any other optional components, as a mixture and preferably as a slurry by using, for example, various mixers that are used generally. In a case of an electrode composition, an active material is further mixed.

The mixing method is not particularly limited, and it can be carried out using a known mixer such as a ball mill, a beads mill, a planetary mixer, a blade mixer, a roll mill, a kneader, a disc mill, a self-rotation type mixer, or a narrow gap type disperser. Each component may be mixed collectively or may be mixed sequentially. A mixing environment is not particularly limited; however, examples thereof include a dry air environment and an inert gas environment. In addition, the mixing conditions are not particularly limited and are appropriately set. For example, the mixing temperature can be set to 15° C. to 40° C. In addition, the rotation speed of the self-rotation type mixer or the like can be set to 200 to 3,000 rpm.

Since the inorganic solid electrolyte-containing composition according to the embodiment of the present invention has excellent redispersibility of solid particles and is less likely to undergo oxidative deterioration, it can be stored after preparation and does not need to be prepared each time when it is used. The conditions for redispersing the inorganic solid electrolyte-containing composition according to the embodiment of the present invention after preparation are not particularly limited, and the above-described preparation method and conditions can be appropriately employed.

[Sheet for all-Solid State Secondary Battery]

A sheet for an all-solid state secondary battery according to the embodiment of the present invention is a sheet-shaped molded body with which a constitutional layer of an all-solid state secondary battery can be formed, and it includes various aspects depending on use applications thereof. Examples of thereof include a sheet that is preferably used in a solid electrolyte layer (also referred to as a solid electrolyte sheet for an all-solid state secondary battery) and a sheet that is preferably used in an electrode or a laminate of an electrode and a solid electrolyte layer (an electrode sheet for an all-solid state secondary battery). In the present invention, the variety of sheets described above will be collectively referred to as a sheet for an all-solid state secondary battery.

In the present invention, each layer that constitutes a sheet for an all-solid state secondary battery may have a monolayer structure or a multilayer structure.

In the sheet for an all-solid state secondary battery, the solid electrolyte layer or the active material layer on the base material is formed of the inorganic solid electrolyte-containing composition according to the embodiment of the present invention. As a result, in a case where this sheet for an all-solid state secondary battery is used as a solid electrolyte layer of an all-solid state secondary battery by appropriately peeling the base material therefrom or used as an electrode (a laminate of a collector and an active material layer) as it is, the cycle characteristics and the conductivity (the lower resistance) of the all-solid state secondary battery can be improved.

It suffices that the solid electrolyte sheet for an all-solid state secondary battery according to the embodiment of the present invention is a sheet having a solid electrolyte layer, and it may be a sheet in which a solid electrolyte layer is formed on a base material or may be a sheet (a sheet from which the base material has been peeled off) that is formed of a solid electrolyte layer without including a base material. The solid electrolyte sheet for an all-solid state secondary battery may include another layer in addition to the solid electrolyte layer. Examples of the other layer include a protective layer (a stripping sheet), a collector, and a coating layer. Examples of the solid electrolyte sheet for an all-solid state secondary battery according to the embodiment of the present invention include a sheet including a layer formed of the inorganic solid electrolyte-containing composition according to the embodiment of the present invention, a typical solid electrolyte layer, and a protective layer on a base material in this order. The solid electrolyte layer included in the solid electrolyte sheet for an all-solid state secondary battery is preferably formed of the inorganic solid electrolyte-containing composition according to the embodiment of the present invention. The content of each component in the solid electrolyte layer is not particularly limited; however, it preferably has the same meaning as the content of each component in the solid content of the inorganic solid electrolyte-containing composition according to the embodiment of the present invention. The layer thickness of each layer that constitutes the solid electrolyte sheet for an all-solid state secondary battery is the same as the layer thickness of each layer described later in the all-solid state secondary battery.

The base material is not particularly limited as long as it can support the solid electrolyte layer, and examples thereof include a sheet body (plate-shaped body) formed of materials described later regarding the collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

It suffices that an electrode sheet for an all-solid state secondary battery according to the embodiment of the present invention (simply also referred to as an "electrode sheet") is an electrode sheet including an active material layer, and it may be a sheet in which an active material layer is formed on a base material (collector) or may be a sheet (a sheet from which the base material has been peeled off) that is formed of an active material layer without including a base material. The electrode sheet is typically a sheet including the collector and the active material layer, and examples of an aspect thereof include an aspect including the collector, the active material layer, and the solid electrolyte layer in this order and an aspect including the collector, the active material layer, the solid electrolyte layer, and the active material layer in this order. The solid electrolyte layer and the active material layer included in the electrode sheet are preferably formed of the inorganic solid electrolyte-containing composition according to the embodiment of the present invention. The content of each component in this solid electrolyte layer or active material layer is not particularly limited; however, it preferably has the same meaning as the content of each component in the solid content of the inorganic solid electrolyte-containing composition (the electrode composition) according to the embodiment of the present invention. The layer thickness of each of the layers forming the electrode sheet according to the embodiment of the present invention is the same as the layer thickness of each of the layers described below in the section of the all-solid state secondary battery. The electrode sheet may include the above-described other layer.

In the sheet for an all-solid state secondary battery according to the embodiment of the present invention, at least one layer of the solid electrolyte layer or the active material layer is formed of the inorganic solid electrolyte-containing composition according to the embodiment of the present invention. Therefore, the sheet for an all-solid state secondary battery according to the embodiment of the present invention includes a constitutional layer having low resistance, to which solid particles containing an inorganic solid electrolyte are bound, as well as a constitutional layer in which the polymer binder is less likely to undergo oxidative deterioration. In a case of using this constitutional layer as a constitutional layer of an all-solid state secondary battery, it is possible to realize excellent cycle characteristics and excellent low resistance (high conductivity) of the all-solid state secondary battery.

The sheet for an all-solid state secondary battery according to the embodiment of the present invention can also be produced by industrial manufacturing, for example, in a roll-to-roll method having high productivity, by using the inorganic solid electrolyte-containing composition according to the embodiment of the present invention, which is excellent in dispersion characteristics even in a case where the concentration of solid contents is increased.

[Manufacturing Method for Sheet for all-Solid State Secondary Battery]

The manufacturing method for a sheet for an all-solid state secondary battery according to the embodiment of the present invention is not particularly limited, and the sheet can be manufactured by forming each of the above layers using the inorganic solid electrolyte-containing composition according to the embodiment of the present invention. Examples thereof include a method in which the film formation (the coating and drying) is carried out preferably on a base material or a collector (the other layer may be interposed) to form a layer (a coated and dried layer) consisting of an inorganic solid electrolyte-containing composition. This method makes it possible to produce a sheet for an all-solid state secondary battery having a base material or a collector and having a coated and dried layer. In particular, in a case where a film of the inorganic solid electrolyte-containing composition according to the embodiment of the present invention is formed on a collector to produce a sheet for an all-solid state secondary battery, it is possible to reinforce the adhesion between the collector and the active material layer. Here, the coated and dried layer refers to a layer formed by carrying out coating with the inorganic solid electrolyte-containing composition according to the embodiment of the present invention and drying the dispersion medium (that is, a layer formed using the inorganic solid electrolyte-containing composition according to the embodiment of the present invention and consisting of a composition obtained by removing the dispersion medium from the inorganic solid electrolyte-containing composition according to the embodiment of the present invention). In the active material layer and the coated and dried layer, the dispersion medium may remain within a range where the effect of the present invention is not impaired, and the residual amount thereof, for example, in each of the layers may be 3% by mass or lower.

In the manufacturing method for a sheet for an all-solid state secondary battery according to the embodiment of the present invention, each of the steps such as coating and drying will be described in the following manufacturing method for an all-solid state secondary battery.

In the manufacturing method for a sheet for an all-solid state secondary battery according to the embodiment of the present invention, the coated and dried layer obtained as described above can be pressurized. The pressurizing condition and the like will be described later in the section of the manufacturing method for an all-solid state secondary battery.

In addition, in the manufacturing method for a sheet for an all-solid state secondary battery according to the embodiment of the present invention, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The all-solid state secondary battery according to the embodiment of the present invention is not particularly limited in the configuration as long as it has a solid electrolyte layer between the positive electrode active material layer and the negative electrode active material layer, and for example, a known configuration for an all-solid state secondary battery can be employed.

The positive electrode active material layer is preferably formed on a positive electrode collector to configure a positive electrode. The negative electrode active material layer is preferably formed on a negative electrode collector to configure a negative electrode.

At least one layer of the negative electrode active material layer, the positive electrode active material layer, or the solid electrolyte layer is formed of the inorganic solid electrolyte-containing composition according to the embodiment of the present invention, and at least one of the negative electrode active material layer or the positive electrode active material layer is preferably formed of the inorganic solid electrolyte-containing composition according to the embodiment of the present invention. The all-solid state secondary battery according to the embodiment of the present invention, in which at least one of the constitutional layers is formed of the inorganic solid electrolyte-containing composition according to the embodiment of the present invention exhibits excellent cycle characteristics and low resistance (high conductivity) even in a case of being manufactured by a roll-to-roll method which is advantageous industrially. In addition, since the all-solid state secondary battery according to the embodiment of the present invention exhibits low resistance and a high ion conductivity, a large current can be taken out.

In the present invention, an aspect in which all of the layers are formed of the inorganic solid electrolyte-containing composition according to the embodiment of the present invention is also one of the preferred aspects. In the present invention, forming the constitutional layer of the all-solid state secondary battery by using the inorganic solid electrolyte-containing composition according to the embodiment of the present invention includes an aspect in which the constitutional layer is formed by using the sheet for an all-solid state secondary battery according to the embodiment of the present invention (however, in a case where a layer other than the layer formed of the inorganic solid electrolyte-containing composition according to the embodiment of the present invention is provided, a sheet from which this layer is removed).

In a case where the active material layer or the solid electrolyte layer is not formed of the inorganic solid electrolyte-containing composition according to the embodiment of the present invention, a known material in the related art can be used.

In the present invention, each constitutional layer (including a collector and the like) that constitutes an all-solid state secondary battery may have a monolayer structure or a multilayer structure.

<Positive Electrode Active Material Layer, Solid Electrolyte Layer, and Negative Electrode Active Material Layer>

In the active material layer or the solid electrolyte layer formed of the inorganic solid electrolyte-containing composition according to the embodiment of the present invention, the kinds of components to be contained and the contents thereof are preferably the same as the solid content of the inorganic solid electrolyte-containing composition according to the embodiment of the present invention.

The thickness of each of the negative electrode active material layer, the solid electrolyte layer, and the positive electrode active material layer is not particularly limited. In case of taking a dimension of a general all-solid state secondary battery into account, the thickness of each of the layers is preferably 10 to 1,000 μm and more preferably 20 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

Each of the positive electrode active material layer and the negative electrode active material layer may include a collector on the side opposite to the solid electrolyte layer.

<Collector>

The positive electrode collector and the negative electrode collector are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film has been formed) obtained by treating the surface of aluminum or stainless steel with carbon, nickel, titanium, or silver is preferable. Among these, aluminum or an aluminum alloy is more preferable.

As a material that forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of a fiber group.

The thickness of the collector is not particularly limited; however, it is preferably 1 to 500 μm. In addition, protrusions and recesses are preferably provided on the surface of the collector by carrying out a surface treatment.

<Other Configurations>

In the present invention, a functional layer, a functional member, or the like may be appropriately interposed or disposed between or on the outside of the respective layers of the negative electrode collector, the negative electrode active material layer, the solid electrolyte layer, the positive electrode active material layer, and the positive electrode collector.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing.

In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery according to the preferred embodiment of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In a case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated in the negative electrode return to the positive electrode side, and electrons are supplied to an operation portion 6. In an example illustrated in the drawing, an electric bulb is employed as a model at the operation portion 6 and is lit by discharging.

Figure 2:
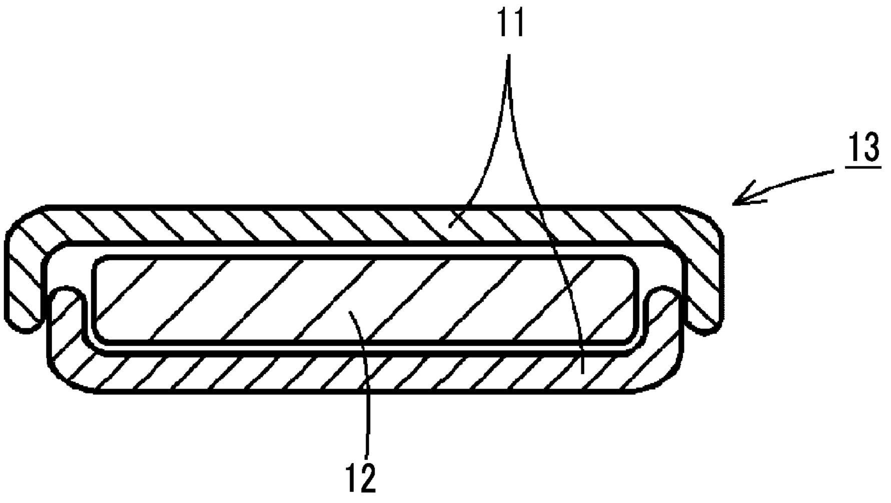
FIG. 2 is a vertical cross-sectional view schematically illustrating a coin-type all-solid state secondary battery produced in Examples.

In a case where the all-solid state secondary battery having a layer configuration illustrated in FIG. 1 is placed in a 2032-type coin case, the all-solid state secondary battery will be referred to as a laminate 12 for an all-solid state secondary battery, and a battery produced by placing this laminate 12 for an all-solid state secondary battery into a 2032-type coin case 11 (for example, a coin-type all-solid state secondary battery illustrated in FIG. 2) will be referred to as an all-solid state secondary battery 13, whereby both batteries may be distinctively referred to in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed of the inorganic solid electrolyte-containing composition of the embodiment of the present invention. This all-solid state secondary battery 10 exhibits excellent battery performance. The kinds of the inorganic solid electrolyte and the polymer binder which are contained in the positive electrode active material layer 4, the solid electrolyte layer 3, and the negative electrode active material layer 2 may be identical to or different from each other.

In the present invention, any one of the positive electrode active material layer and the negative electrode active material layer, or collectively both of them may be simply referred to as an active material layer or an electrode active material layer. In addition, any one of the positive electrode active material and the negative electrode active material, or collectively both of them may be simply referred to as an active material or an electrode active material.

The solid electrolyte layer contains an inorganic solid electrolyte having an ion conductivity of a metal belonging to Group 1 or Group 2 in the periodic table, a polymer binder, any component described above, and the like within a range where the effect of the present invention is not impaired, and it generally does not contain a positive electrode active material and/or a negative electrode active material.

The positive electrode active material layer contains an inorganic solid electrolyte having an ion conductivity of a metal belonging to Group 1 or Group 2 in the periodic table, a positive electrode active material, a polymer binder, any component described above, and the like within a range where the effect of the present invention is not impaired.

The negative electrode active material layer contains an inorganic solid electrolyte having an ion conductivity of a metal belonging to Group 1 or Group 2 in the periodic table, a negative electrode active material, a polymer binder, any component described above, and the like within a range where the effect of the present invention is not impaired.

In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 μm regardless of the above thickness of the above negative electrode active material layer.

In the present invention, in a case where a constitutional layer is formed of the inorganic solid electrolyte-containing composition according to the embodiment of the present invention, it is possible to realize an all-solid state secondary battery having excellent cycle characteristics and having low resistance even in a case of being manufactured by a roll-to-roll method which is advantageous industrially.

(Collector)

The positive electrode collector 5 and the negative electrode collector 1 are as described above.

[Manufacture of all-Solid State Secondary Battery]

The all-solid state secondary battery can be manufactured by a conventional method. Specifically, the all-solid state secondary battery can be manufactured by forming each of the layers described above using the inorganic solid electrolyte-containing composition of the embodiment of the present invention or the like. Hereinafter, the manufacturing method therefor will be described in detail.

The all-solid state secondary battery according to the embodiment of the present invention can be manufactured by carrying out a method (a manufacturing method for a sheet for an all-solid state secondary battery according to the embodiment of the present invention) which includes (is carried out through) a step of coating an appropriate base material (for example, a metal foil which serves as a collector) with the inorganic solid electrolyte-containing composition according to the embodiment of the present invention and forming a coating film (forming a film).

For example, an inorganic solid electrolyte-containing composition containing a positive electrode active material is applied as a material for a positive electrode (a positive electrode composition) onto a metal foil which is a positive electrode collector, to form a positive electrode active material layer, thereby producing a positive electrode sheet for an all-solid state secondary battery. Next, the inorganic solid electrolyte-containing composition for forming a solid electrolyte layer is applied onto the positive electrode active material layer to form the solid electrolyte layer. Furthermore, an inorganic solid electrolyte-containing composition containing a negative electrode active material is applied as a material for a negative electrode (a negative electrode composition) onto the solid electrolyte layer, to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector as a base material and overlaying a positive electrode collector thereon.

As another method, the following method can be exemplified. That is, the positive electrode sheet for an all-solid state secondary battery is produced as described above. In addition, an inorganic solid electrolyte-containing composition containing a negative electrode active material is applied as a material for a negative electrode (a negative electrode composition) onto a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. In this manner, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the positive electrode sheet for an all-solid state secondary battery and the negative electrode sheet for an all-solid state secondary battery, an inorganic solid electrolyte-containing composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated such that the solid electrolyte layer peeled from the base material is sandwiched therebetween. In this manner, an all-solid state secondary battery can be manufactured.

Further, a positive electrode sheet for an all-solid state secondary battery, a negative electrode sheet for an all-solid state secondary battery, and a solid electrolyte sheet for an all-solid state secondary battery are produced as described above. Next, the positive electrode sheet for an all-solid state secondary battery or negative electrode sheet for an all-solid state secondary battery, and the solid electrolyte sheet for an all-solid state secondary battery are overlaid and pressurized into a state where the positive electrode active material layer or the negative electrode active material layer is brought into contact with the solid electrolyte layer. In this way, the solid electrolyte layer is transferred to the positive electrode sheet for an all-solid state secondary battery or the negative electrode sheet for an all-solid state secondary battery. Then, the solid electrolyte layer from which the base material of the solid electrolyte sheet for an all-solid state secondary battery has been peeled off and the negative electrode sheet for an all-solid state secondary battery or positive electrode sheet for an all-solid state secondary battery are overlaid and pressurized (into a state where the negative electrode active material layer or positive electrode active material layer is brought into contact with the solid electrolyte layer). In this way, an all-solid state secondary battery can be manufactured. The pressurizing method and the pressurizing conditions in this method are not particularly limited, and a method and pressurizing conditions described in the pressurization step, which will be described later, can be applied.

The solid electrolyte layer or the like can also be formed on the substrate or the active material layer, for example, by pressure-molding the inorganic solid electrolyte-containing composition or the like under a pressurizing condition described later, or the solid electrolyte or a sheet molded body of the active material.

In the above manufacturing method, it suffices that the inorganic solid electrolyte-containing composition according to the embodiment of the present invention is used in any one of the positive electrode composition, the inorganic solid electrolyte-containing composition, or the negative electrode composition. The inorganic solid electrolyte-containing composition according to the embodiment of the present invention is preferably used in the inorganic solid electrolyte-containing composition or at least one of the positive electrode composition or the negative electrode composition, or the inorganic solid electrolyte-containing composition according to the embodiment of the present invention can be used in any of the compositions.

In a case where the solid electrolyte layer or the active material layer is formed of a composition other than the inorganic solid electrolyte-containing composition according to the embodiment of the present invention, examples of the material thereof include a typically used composition. In addition, the negative electrode active material layer can also be formed by bonding ions of a metal belonging to Group 1 or Group 2 in the periodic table, which are accumulated on a negative electrode collector during initialization described later or during charging for use, without forming the negative electrode active material layer during the manufacturing of the all-solid state secondary battery to electrons and precipitating the ions on a negative electrode collector the like as a metal.

<Formation of Individual Layer (Film Formation)>

The method of applying the inorganic solid electrolyte-containing composition is not particularly limited and can be appropriately selected. Examples thereof include coating (preferably wet-type coating), spray coating, spin coating, dip coating, slit coating, stripe coating, and bar coating.

In this case, the inorganic solid electrolyte-containing composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit thereof is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain a good binding property and a good ion conductivity.

After applying the inorganic solid electrolyte-containing composition, it is preferable to pressurize each layer or the all-solid state secondary battery after overlaying the constitutional layers or producing the all-solid state secondary battery. Examples of the pressurizing methods include a method using a hydraulic cylinder press machine. The pressurizing force is not particularly limited; however, it is generally preferably in a range of 5 to 1,500 MPa.

In addition, the applied inorganic solid electrolyte-containing composition may be heated at the same time with the pressurization. The heating temperature is not particularly limited but is generally in a range of 30° C. to 300° C. The press can also be applied at a temperature higher than the glass transition temperature of the inorganic solid electrolyte. It is also possible to carry out the press at a temperature higher than the glass transition temperature of the polymer contained in the polymer binder. However, in general, the temperature does not exceed the melting point of this polymer.

The pressurization may be carried out in a state where the coating solvent or dispersion medium has been dried in advance or in a state where the solvent or the dispersion medium remains.

The respective compositions may be applied at the same time, and the application, the drying, and the pressing may be carried out simultaneously and/or sequentially. Each of the compositions may be applied onto each of the separate base materials and then laminated by carrying out the transfer.

The atmosphere in the film forming method (coating, drying, and pressurization (under heating)) is not particularly limited and may be any one of the atmospheres such as atmospheric air, an atmosphere of dry air (the dew point: −20° C. or lower) and an atmosphere of inert gas (for example, an argon gas, a helium gas, or a nitrogen gas).

The pressing time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be variable depending on the area or the film thickness of the portion under pressure. In addition, the pressure can also be variable stepwise for the same portion.

A pressing surface may be flat or roughened.

The inorganic solid electrolyte-containing composition according to the embodiment of the present invention can maintain excellent dispersion characteristics even in a case where the concentration of solid contents is increased. Therefore, it is also possible to apply the inorganic solid electrolyte-containing composition by setting the concentration of solid contents to be high. In addition, in the present invention, the formation (the formation of a film) of each layer described above, particularly the application and drying of the inorganic solid electrolyte-containing composition according to the embodiment of the present invention can be carried out using a sheet-like base material in a so-called batch system; however, a roll-to-roll method, which has high productivity among the industrial manufacturing methods, can also be used.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state where the pressing pressure is increased and then releasing the pressure up to a pressure at which the all-solid state secondary battery is ordinarily used.

[Use Application of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of consumer usages include automobiles (electric vehicles and the like), electric motor vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto be interpreted. "Parts" and "%" that represent compositions in the following Examples are based on the mass unless particularly otherwise described. In the present invention, "room temperature" means 25° C.

1. Polymer Synthesis and Preparation of Binder Solution or Dispersion Liquid

Each of binder forming polymers having the chemical formulae below and shown in Table 1 was synthesized as follows.

Synthesis Example S-1: Synthesis of Polymer S-1 and Preparation of Binder Solution S-1

To a 100 mL graduated cylinder, 17.3 g of dodecyl acrylate (manufactured by Tokyo Chemical Industry Co., Ltd.), 18.0 g of polyethylene glycol monomethyl ether methacrylate (molecular weight: 300, manufactured by Sigma-Aldrich Co., LLC), 0.72 g of acrylic acid, and 4.30 g of a polymerization initiator V-601 (product name, manufactured by FUJIFILM Wako Pure Chemical Corporation) were added and dissolved in 72.0 g of butyl butyrate to prepare a monomer solution.

To a 300 mL three-necked flask, 72.0 g of butyl butyrate was added and stirred at 80° C., and then the above monomer solution was added dropwise thereto over 2 hours. After the completion of the dropwise addition, the solution was heated to 90° C. and stirred for 2 hours. The obtained polymerization solution was poured into 480 g of methanol, stirred for 10 minutes, and allowed to stand for 10 minutes. The precipitate obtained after removing the supernatant was dissolved in 80 g of butyl butyrate and heated at 30 hPa and 60° C. for 1 hour to distill off methanol.

In this way, a polymer S-1 (a (meth)acrylic polymer as a random copolymer) was synthesized, and then a binder solution S-1 (concentration: 37% by mass) consisting of this polymer was obtained.

Synthesis Example S-2: Synthesis of Polymer S-2 and Preparation of Binder Solution S-2

A polymer S-2 (a (meth)acrylic polymer) was synthesized in the same manner as in Synthesis Example S-1 to obtain a binder solution S-2 consisting of this polymer, except that in Synthesis Example S-1, a compound from which each constitutional component is derived was used so that the polymer S-2 had the composition (the kind and the content of the constitutional component) shown in Table 1 and the following chemical formula.

Synthesis Example S-3: Synthesis of Polymer S-3 and Preparation of Binder Solution S-3

First, a macromonomer M-1 was synthesized as the constitutional component (X) as follows.

To a 1 L graduated cylinder, 460 g of styrene (manufactured by Tokyo Chemical Industry Co., Ltd.), 16.5 g of 3-mercaptopropionic acid, and 7.8 g of a polymerization initiator V-601 (manufactured by FUJIFILM Wako Pure Chemical Corporation) were added and stirred to be uniformly dissolved, whereby a monomer solution was prepared. To a 2 L three-necked flask, 465.5 g of toluene (manufactured by FUJIFILM Wako Pure Chemical Corporation) was added and stirred at 80° C., and then the above monomer solution was added dropwise thereto over 2 hours. After completion of the dropwise addition, stirring was carried out at 80° C. for 2 hours, and then the temperature was raised to 90° C., and stirring was carried out for 2 hours. Next, 275 mg of 2,2,6,6-tetramethylpiperidine 1-oxyl (manufactured by FUJIFILM Wako Pure Chemical Corporation), 27.5 g of glycidyl methacrylate (manufactured by Tokyo Chemical Industry Co., Ltd.), and 5.5 g of tetrabutylammonium bromide (manufactured by FUJIFILM Wako Pure Chemical Corporation) were added thereto, and the mixture was stirred at 120° C. for 3 hours. After allowing the solution to stand at room temperature, it was poured into 1,800 g of methanol to remove the supernatant. Butyl butyrate was added thereto, and methanol was distilled off under reduced pressure to obtain a butyl butyrate solution of a macromonomer M-1. The concentration of solid contents thereof was 49% by mass.

Next, a polymer S-3 was synthesized using the macromonomer M-1 as follows.

To a 100 mL graduated cylinder, 10.8 g of dodecyl acrylate (manufactured by Tokyo Chemical Industry Co., Ltd.), 47.8 g of the macromonomer M-1 solution, 1.80 g of glycidyl methacrylate (manufactured by Tokyo Chemical Industry Co., Ltd.), and 2.10 g of a polymerization initiator V-601 (product name, manufactured by FUJIFILM Wako Pure Chemical Corporation) were added and dissolved in 72.0 g of butyl butyrate to prepare a monomer solution.

To a 300 mL three-necked flask, 72.0 g of butyl butyrate was added and stirred at 80° C., and then the above monomer solution was added dropwise thereto over 2 hours. After the completion of the dropwise addition, the solution was heated to 90° C. and stirred for 2 hours. The obtained polymerization solution was poured into 480 g of methanol, stirred for 10 minutes, and allowed to stand for 10 minutes. The precipitate obtained after removing the supernatant was dissolved in 80 g of butyl butyrate and heated at 30 hPa and 60° C. for 1 hour to distill off methanol.

In this way, a polymer S-3 (a (meth)acrylic polymer as a random copolymer) was synthesized, and then a binder solution S-3 (concentration: 32% by mass) consisting of this polymer was obtained.

Synthesis Example S-4: Synthesis of Polymer S-4 and Preparation of Binder Solution S-4

First, a macromonomer M-2 was synthesized as the constitutional component (X) as follows.

156 g of F-caprolactone and 44 g of 2-ethyl-1-hexanol were introduced into a 500 mL three-necked flask, and the resultant mixture was stirred and dissolved while blowing nitrogen. 0.1 g of monobutyltin oxide was added thereto, followed by heating to 100° C. After 8 hours, after confirming that the raw material had disappeared by gas chromatography, cooling was carried out to 5° C. 233 g of butyl butyrate, 0.1 g of 2,6-di-t-butyl-4-methylphenol, and 38 g of triethylamine were added thereto, and then 32 g of chloride acrylate was added thereto. After 1 hour, after confirming that the raw material had disappeared by $^1$H-NMR, 30 g of 1M hydrochloric acid and 300 g of ethyl acetate were added thereto, followed by extraction with water and then washing. The obtained organic layer was dried with sodium sulfate and concentrated at 30 hPa and 70° C. to obtain a macromonomer M-2.

Next, a polymer S-4 was synthesized using the macromonomer M-2 as follows.

To a 100 mL graduated cylinder, 34.6 g of the macromonomer M-2, 1.08 g of 2-hydroxyethyl acrylate (manufactured by Fujifilm Wako Pure Chemical Corporation), 0.36 g of maleic acid anhydride (manufactured by Fujifilm Wako Pure Chemical Corporation), and 4.20 g of a polymerization initiator V-601 (product name, manufactured by FUJIFILM Wako Pure Chemical Corporation) were added and dissolved in 72.0 g of butyl butyrate to prepare a monomer solution.

To a 300 mL three-necked flask, 72.0 g of butyl butyrate was added and stirred at 80° C., and then the above monomer solution was added dropwise thereto over 2 hours. After the completion of the dropwise addition, the solution was heated to 90° C. and stirred for 2 hours. The obtained polymerization solution was poured into 480 g of methanol, stirred for 10 minutes, and allowed to stand for 10 minutes. The precipitate obtained after removing the supernatant was dissolved in 70 g of butyl butyrate and heated at 30 hPa and 60° C. for 1 hour to distill off methanol.

In this way, a polymer S-4 (a (meth)acrylic polymer as a random copolymer) was synthesized, and then a binder solution S-4 (concentration: 36% by mass) consisting of this polymer was obtained.

Synthesis Example S-5: Synthesis of Polymer S-5 and Preparation of Binder Solution S-5

First, a macromonomer M-3 was synthesized as the constitutional component (X) as follows.

A butyl butyrate solution (concentration: 46% by mass) of the macromonomer M-3 was obtained in the same manner, except that in the synthesis of the macromonomer M-1 of Synthesis Example S-3, dodecyl acrylate was used instead of the styrene and the using amount of 3-mercaptopropionic acid was 25.4 g.

Next, a polymer S-5 (a (meth)acrylic polymer) was synthesized in the same manner as in Synthesis Example S-4 to obtain a binder solution S-5 consisting of this polymer, except that in Synthesis Example S-4, a compound from which each constitutional component is derived was used so that the polymer S-5 had the composition (the kind and the content of the constitutional component) shown in Table 1 and the following chemical formula.

Synthesis Example S-6: Synthesis of Polymer S-6 and Preparation of Binder Solution S-6

First, a macromonomer M-4 was synthesized as the constitutional component (X) as follows.

A butyl butyrate solution (concentration of solid contents: 46% by mass) of the macromonomer M-4 was synthesized in the same manner as in Synthesis Example S-4, except that in Synthesis Example S-5, n-butyl acrylate was used instead of dodecyl acrylate.

Next, a polymer S-6 (a (meth)acrylic polymer) was synthesized in the same manner as in Synthesis Example S-4 to obtain a binder solution S-6 consisting of this polymer, except that in Synthesis Example S-4, a compound from which each constitutional component is derived was used so that the polymer S-6 had the composition (the kind and the content of the constitutional component) shown in Table 1 and the following chemical formula.

Synthesis Example S-7: Synthesis of Polymer S-7 and Preparation of Binder Solution S-7

A polymer S-7 (a (meth)acrylic polymer) was synthesized in the same manner as in Synthesis Example S-4 to obtain a binder solution S-7 consisting of this polymer, except that in Synthesis Example S-4, a compound from which each constitutional component is derived was used so that the polymer S-7 had the composition (the kind and the content of the constitutional component) shown in Table 1 and the following chemical formula.

Synthesis Example S-8: Synthesis of Polymer S-8 and Preparation of Binder Solution S-8

Using macromonomer M-7, which had been synthesized by changing lauryl acrylate to dimethyl acrylamide at the time of the synthesis of the macromonomer M-3 in Synthesis Example S-5, a polymer S-8 (a (meth)acrylic polymer) was synthesized so that the polymer S-8 had the composition (the kind and the content of the constitutional component) shown in Table 1 and the following chemical formula, thereby obtaining a binder solution S-8 consisting of this polymer. The content of the constitutional component (X) containing the polymerized chain consisting of polydimethyl acrylamide, in the polymer S-8, is 32.6% by mole with respect to the total number of moles.

Synthesis Example S-9: Synthesis of Polymer S-9 and Preparation of Binder Solution S-9

Using macromonomer M-8, which had been synthesized by changing lauryl acrylate to trifluoroethyl methacrylate at the time of the synthesis of the macromonomer M-3 in Synthesis Example S-5, a polymer S-9 (a (meth)acrylic polymer) was synthesized so that the polymer S-9 had the composition (the kind and the content of the constitutional component) shown in Table 1 and the following chemical formula, thereby obtaining a binder solution S-9 consisting of this polymer.

Synthesis Example S-10: Synthesis of Polymer S-10 and Preparation of Binder Solution S-10

Lauryl acrylate in Synthesis Example S-1 was changed to isobutyl methacrylate and dimethylaminoethyl methacrylate to synthesize a polymer S-10 (a (meth)acrylic polymer) so that the polymer S-10 had the composition (the kind and the content of the constitutional component) shown in Table 1 and the following chemical formula, thereby obtaining a binder solution S-10 consisting of this polymer.

The content of the constitutional component (N) derived from dimethylaminoethyl methacrylate, in the polymer S-10, is 6% by mole with respect to the total number of moles.

Synthesis Example S-11: Synthesis of Polymer S-11 and Preparation of Binder Solution S-11

Lauryl acrylate in Synthesis Example S-1 was changed to methyl methacrylate to synthesize a polymer S-11 (a (meth) acrylic polymer) so that the polymer S-11 had the composition (the kind and the content of the constitutional component) shown in Table 1 and the following chemical formula, thereby obtaining a binder solution S-11 consisting of this polymer.

Synthesis Example S-12: Synthesis of Polymer S-12 and Preparation of Binder Solution S-12

Polyethylene glycol monomethyl ether methacrylate (degree of polymerization: 5, molecular weight: 300) in Synthesis Example S-11 was changed to polyethylene glycol monomethyl ether methacrylate (degree of polymerization: 19, molecular weight: 950) to synthesize a polymer S-12 (a (meth)acrylic polymer) so that the polymer S-12 had the composition (the kind and the content of the constitutional component) shown in Table 1 and the following chemical formula, thereby obtaining a binder solution S-12 consisting of this polymer.

Synthesis Example S-13: Synthesis of Polymer S-13 and Preparation of Binder Solution S-13

Lauryl acrylate in Synthesis Example S-1 was changed to benzyl methacrylate to synthesize a polymer S-13 (a (meth) acrylic polymer) so that the polymer S-13 had the composition (the kind and the content of the constitutional component) shown in Table 1 and the following chemical formula, thereby obtaining a binder solution S-13 consisting of this polymer.

Synthesis Example S-14: Synthesis of Polymer S-14 and Preparation of Binder Solution S-14

25.0 g of diphenylmethane diisocyanate (manufactured by Tokyo Chemical Industry Co., Ltd.), 10.8 g of α-thioglycerol (manufactured by Tokyo Chemical Industry Co., Ltd.), and 200 g of butyl butyrate were charged, and the temperature was raised to 60° C. under a nitrogen stream. Next, 0.05 g of Neostan U-600 (manufactured by Nitto Kasei Co., Ltd.) was added thereto, followed by stirring at 60° C. for 5 hours. Then, methanol was added thereto, stirring was carried out at 60° C. for 30 minutes, and then 27.6 g of polyethylene glycol monomethyl ether methacrylate (molecular weight: 300, manufactured by Sigma-Aldrich Co., LLC), 0.58 g of acrylic acid (Tokyo Chemical Industry Co., Ltd.), and 0.5 g of V-601 (product name, manufactured by FUJIFILM Wako Pure Chemical Corporation) were added, followed by stirring at 80° C. for 2 hours to cool the reaction solution, thereby obtaining a polymer S-14 solution (concentration of solid contents: 24% by mass).

Synthesis Example S-15: Synthesis of Polymer S-15 and Preparation of Binder Solution S-15

6.0 g of dipentaerythritolhexakis (3-mercaptopropionate) (manufactured by Tokyo Chemical Industry Co., Ltd.), 18.0 g of polyethylene glycol monomethyl ether methacrylate (molecular weight: 300, manufactured by Sigma-Aldrich Co., LLC), 72.0 g of butyl butyrate, and 1.0 g of a polymerization initiator V-601 (product name, manufactured by Fujifilm Wako Pure Chemical Corporation) were added, and stirring was carried out at 80° C. for 2 hours.

Then, to the obtained solution, 17.3 g of methyl methacrylate (manufactured by Tokyo Chemical Industry Co., Ltd.), 0.72 g of acrylic acid (manufactured by Tokyo Chemical Industry Co., Ltd.), and 1.0 g of a polymerization initiator V-601 (product name, FUJIFILM Wako Pure Chemical Corporation) were added, and stirring was further carried out at 80° C. for 2 hours to obtain a binder solution S-15 (concentration of solid contents: 38% by mass).

The polymer S-15 is a (meth)acrylic polymer having a star structure in which six polymerized chains consisting of a (meth)acrylic polymer having the composition shown in Table 1 are bonded as arm parts to one core part derived from the compound A-5, where the mass average molecular weight of each arm part is 890.

Synthesis Example T-1: Synthesis of Polymer T-1 and Preparation of Binder Solution T-1

A polymer T-1 (a (meth)acrylic polymer) was synthesized in the same manner as in Synthesis Example S-4 to obtain a binder solution T-1 consisting of this polymer, except that in Synthesis Example S-4, a compound from which each constitutional component is derived was used so that the polymer T-1 had the composition (the kind and the content of the constitutional component) shown in Table 1 and the following chemical formula.

Synthesis Example T-2: Synthesis of Polymer T-2 and Preparation of Binder Solution T-2

20 g of polyethyleneimine (SP-200, number average molecular weight 10,000, manufactured by Nippon Catalyst Co., Ltd.), 0.19 g of p-methoxyphenol, 18.0 g of Blemmer PME-400 (manufactured by Nikko Co., Ltd.), and 15.4 g of dodecyl acid (manufactured by Tokyo Chemical Industry Co., Ltd.) was added to a 300 mL three-necked flask, and the resultant mixture was heated at 80° C. for 3 hours.

Next, a solution prepared by mixing 5.0 g of succinic acid anhydride (manufactured by Tokyo Chemical Industry Co., Ltd.) with 100 g of propylene glycol 1-monomethyl ether 2-acetate was added dropwise over 20 minutes, followed by stirring for 3 hours. The obtained polymer solution was poured into 800 g of hexane/isopropanol (mass ratio: 8/2), the supernatant was removed, followed by being dissolved in 70 g of butyl butyrate and then heating at 30 hPa and 60° C. for 1 hour to distill off methanol.

In this way, a polymer T-2 was synthesized, and then a binder solution T-2 (concentration: 30% by mass) consisting of this polymer was obtained.

Synthesis Example T-3: Synthesis of Polymer T-3 and Preparation of Binder Dispersion Liquid T-3

To a 100 mL graduated cylinder, 28.8 g of methoxyethyl acrylic acid (manufactured by Tokyo Chemical Industry Co., Ltd.) and 1.40 g of a polymerization initiator V-601 (product name, manufactured by FUJIFILM Wako Pure Chemical Corporation) were added and dissolved in 28.8 g of butyl butyrate to prepare a monomer solution.

To a 300 mL three-necked flask, 15.7 g of a macromonomer M-4 solution and 36.0 g of butyl butyrate were added and stirred at 80° C., and then the above monomer solution was added dropwise thereto over 2 hours. After the completion of the dropwise addition, the solution was heated to 90° C. and stirred for 2 hours.

In this way, a binder dispersion liquid T-3 (concentration: 40% by mass) in which the polymer T-3 was dispersed in butyl butyrate was obtained. The average particle diameter of the binder in this dispersion liquid was 150 nm.

Synthesis Example T-4: Synthesis of Polymer T-4 and Preparation of Binder Dispersion Liquid T-4

Lauryl acrylate in Synthesis Example S-1 was changed to isobutyl methacrylate and dimethylaminoethyl methacrylate to synthesize a polymer T-4 (a (meth)acrylic polymer) so that the polymer T-4 had the composition (the kind and the content of the constitutional component) shown in Table 1 and the following chemical formula, thereby obtaining a binder solution T-4 consisting of this polymer.

The content of the constitutional component (N) derived from dimethylaminoethyl methacrylate, in the polymer T-4, is 18% by mole with respect to the total number of moles.

Synthesis Example T-5: Synthesis of Polymer T-5 and Preparation of Binder Solution T-5

Using dodecyl acrylate and acrylic acid without using polyethylene glycol monomethyl ether methacrylate (degree of polymerization: 5, molecular weight: 300) in Synthesis Example S-1, a polymer T-5 (a (meth)acrylic polymer) was synthesized so that the polymer T-5 had the composition (the kind and the content of the constitutional component) shown in Table 1 and the following chemical formula, thereby obtaining a binder solution T-5 consisting of this polymer.

Synthesis Example T-6: Synthesis of Polymer T-6 and Preparation of Binder Solution T-6

Without using acrylic acid in Synthesis Example T-5, a polymer T-6 (a (meth)acrylic polymer) was synthesized so that the polymer T-6 had the composition (the kind and the content of the constitutional component) shown in Table 1 and the following chemical formula, thereby obtaining a binder solution T-6 consisting of this polymer.

Table 1 shows the composition, the glass transition temperature Tg (° C.), the SP value ($MPa^{1/2}$), and the mass average molecular weight of each synthesized polymer, as well as the degree of polymerization, the number average molecular weight, the SP value ($MPa^{1/2}$) of the constitutional component (X). The glass transition temperature Tg, the SP value, the mass average molecular weight, and the number average molecular weight were respectively measured according to the above-described methods. In addition, the column of "State" of Table 1 indicates the state (dissolved or dispersed in a particle shape) of the binder in each composition described later.

It is noted that in Table 1, in a case where the polymer has two kinds of constitutional components corresponding to the respective constitutional components, they are described together using "/".

Each of the polymers synthesized is shown below. The numerical value at the bottom right of each constitutional component indicates the content (% by mass). $R^Y$ and $R^Z$ represent a linking group or a substituent. Regarding the polymer S-15, the core part and the arm part are shown separately, and a wavy line portion of the core part indicates a bonding position to the arm part.

S-1

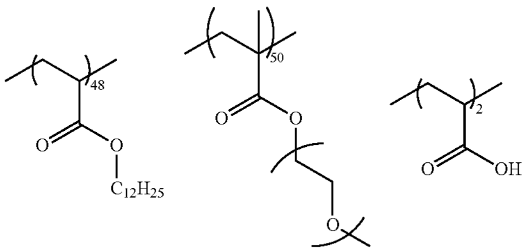

-continued

S-2

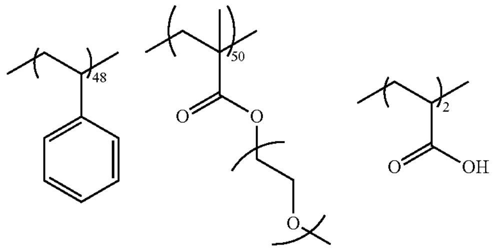

S-3

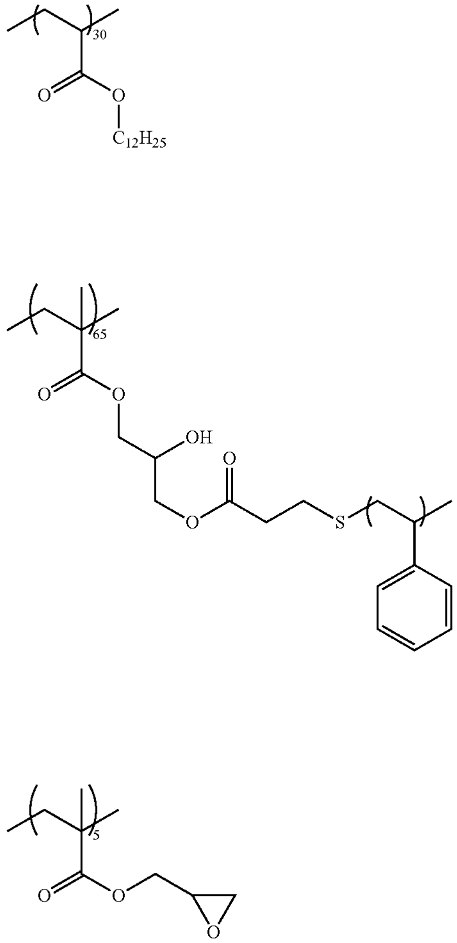

S-4

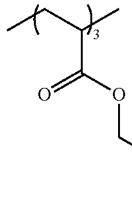

-continued
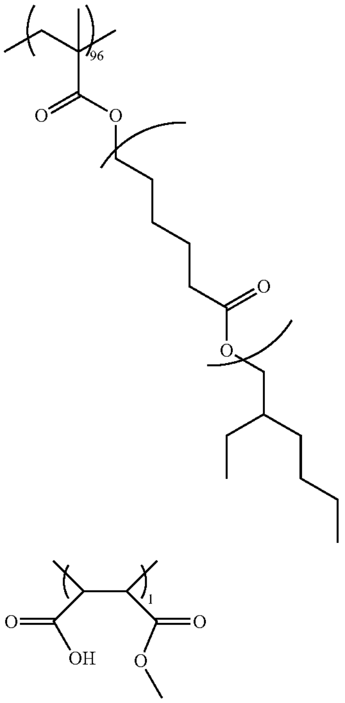
S-5
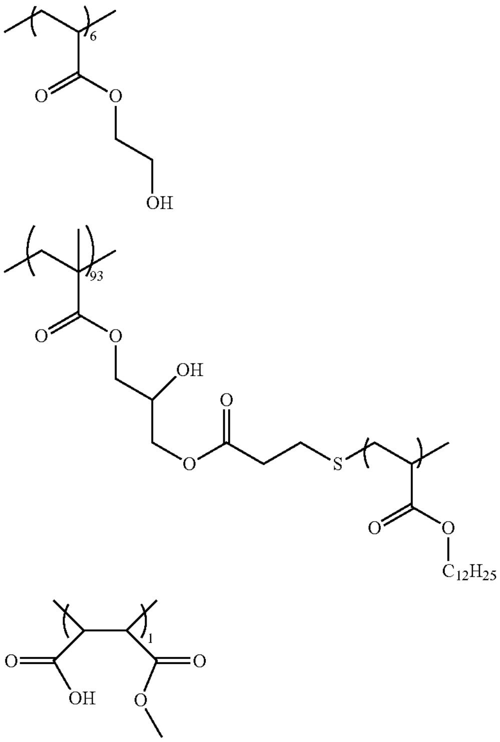
S-6
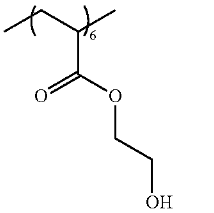
-continued
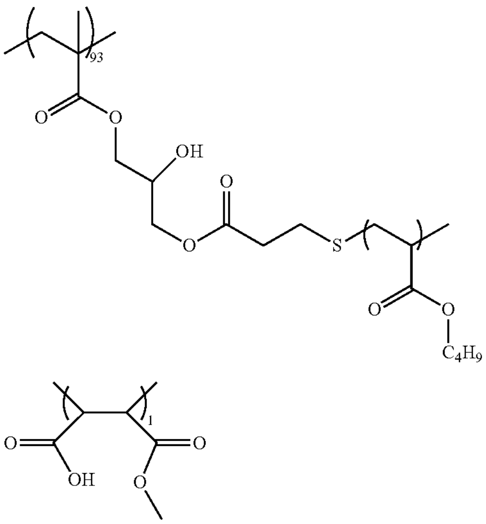
S-7
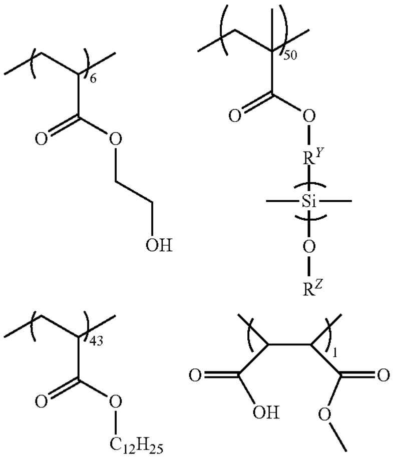
S-8
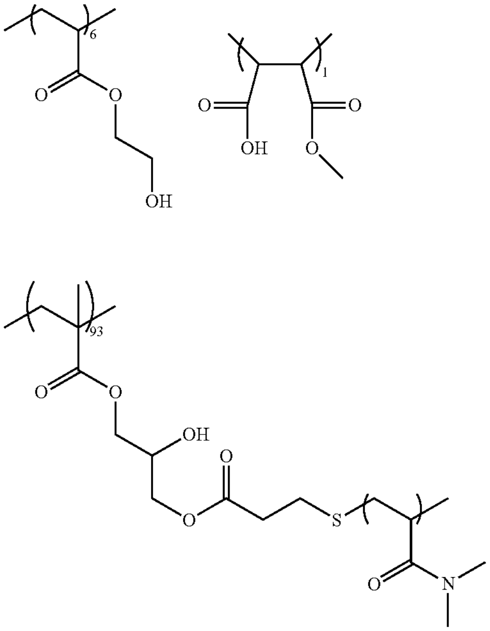

-continued
S-9
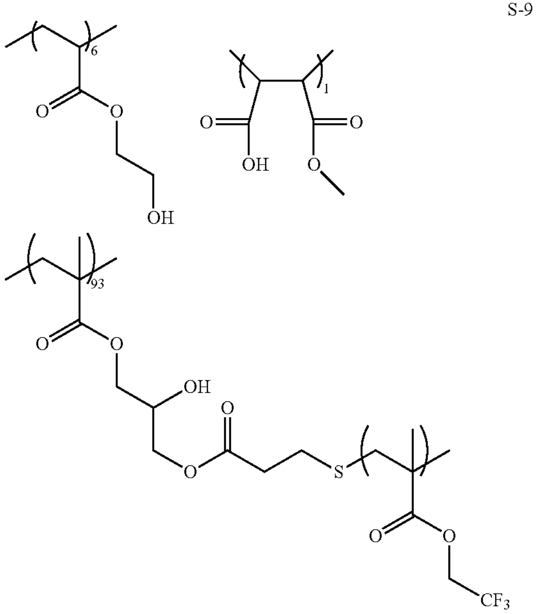
S-10
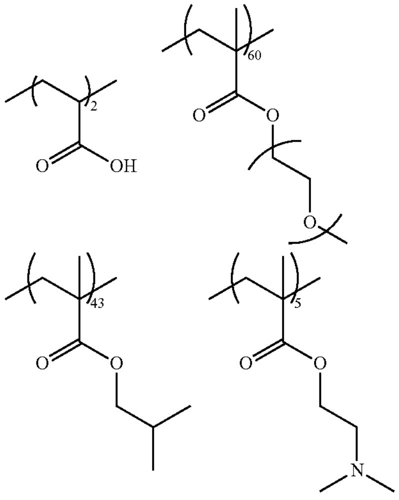
S-11
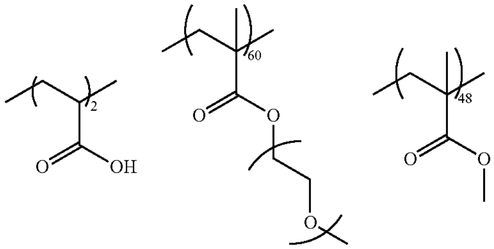
S-12
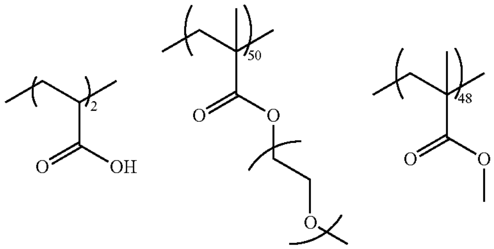
-continued
S-13
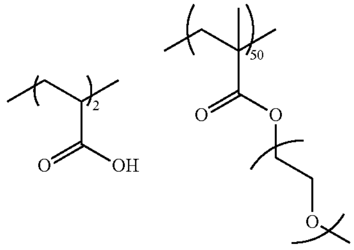
S-14
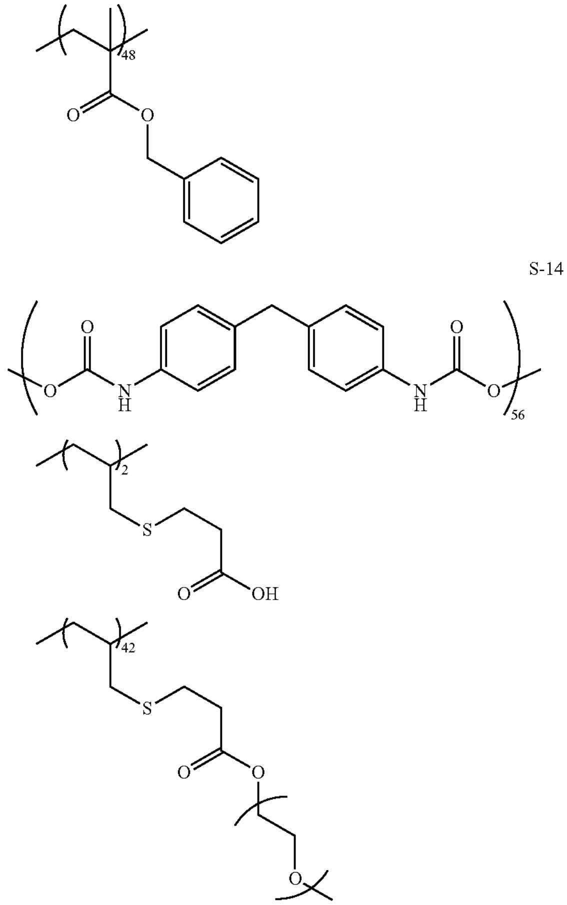
S-15
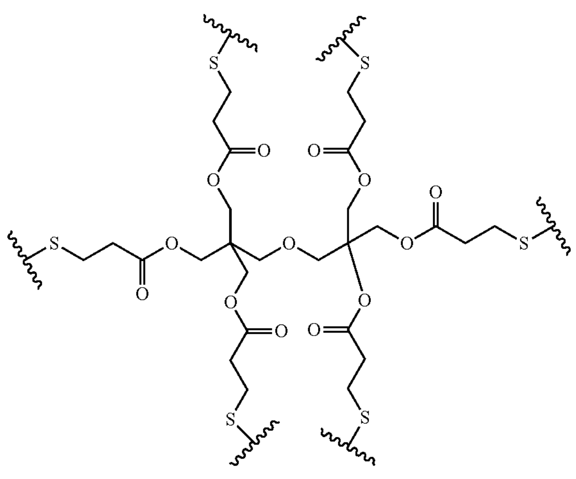
Core part -continued
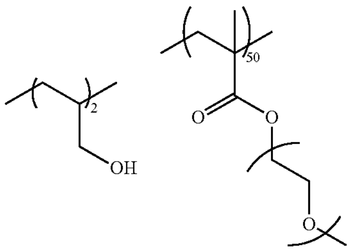
Arm part
T-1
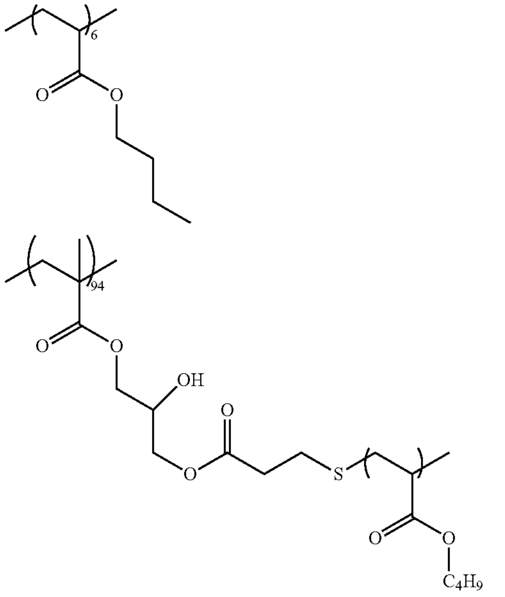
T-2
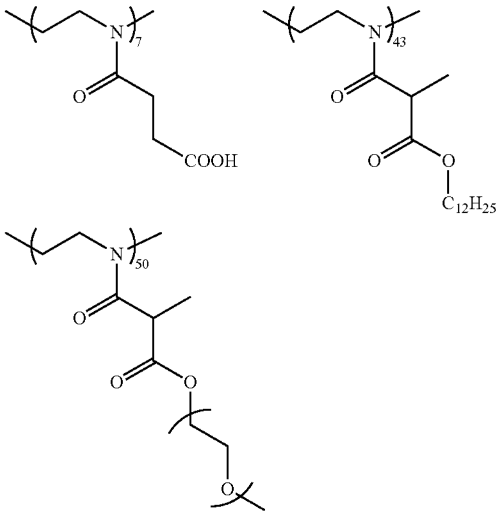
T-3
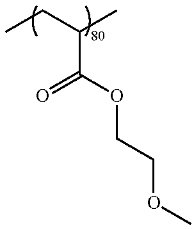
-continued
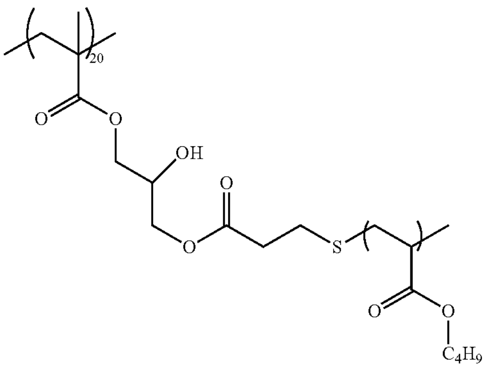
T-4
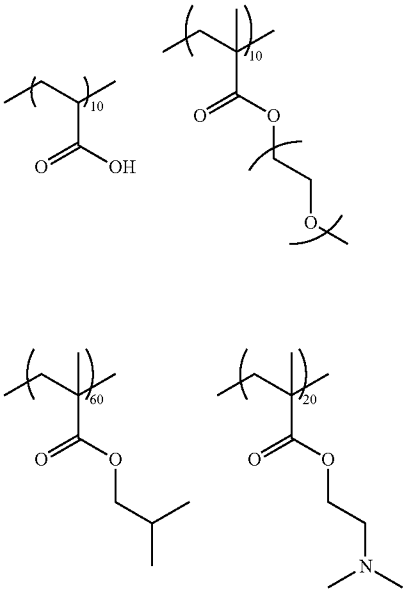
T-5
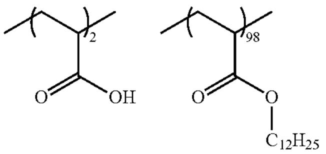
T-6
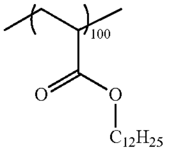

TABLE 1

| No. | Constitutional component (X) | Degree of poly-merization | Number average molecular weight | SP value | Con-tent (% by mass) | Constitutional component (A) | Func-tional group | Content (% by mass) | Another constitutional component | Content (% by mass) | Tg | SP value of poly-mer | Mass average molec-ular weight | State |
|---|---|---|---|---|---|---|---|---|---|---|---|---|---|---|
| S-1 | PEGMEM | 5 | 300 | 20.7 | 50 | AA | Carboxy group | 2 | LA | 48 | −50 | 19.7 | 9000 | Dissolved |
| S-2 | PEGMEM | 5 | 300 | 20.7 | 50 | AA | Carboxy group | 2 | St | 48 | −50 | 20.0 | 15000 | Dissolved |
| S-3 | M-1 | 21 | 4900 | 19.5 | 65 | GMA | Epoxy group | 5 | LA | 30 | 100 | 19.4 | 39000 | Dissolved |
| S-4 | M-2 | 4 | 640 | 19.9 | 96 | MA/HEA | Carboxy group/ hydroxy group | 1/3 | — | — | −60 | 20.1 | 7000 | Dissolved |
| S-5 | M-3 | 15 | 3500 | 18.9 | 93 | MA/HEA | Carboxy group/ hydroxy group | 1/6 | — | — | −31 | 19.5 | 10000 | Dissolved |
| S-6 | M-4 | 16 | 3600 | 19.7 | 93 | MA/HEA | Carboxy group/ hydroxy group | 1/6 | — | — | −59 | 20.2 | 11000 | Dissolved |
| S-7 | M-5 | — | 2300 | — | 50 | MA/HEA | Carboxy group/ hydroxy group | 1/6 | LA | 43 | −59 | — | 8000 | Dissolved |
| S-8 | M-7 | 30 | 3200 | 24.2 | 93 | MA/HEA | Carboxy group/ hydroxy group | 1/6 | — | — | 115 | 24.4 | 9500 | Dissolved |
| S-9 | M-8 | 18 | 3200 | 17.0 | 93 | MA/HEA | Carboxy group/ hydroxy group | 1/6 | — | — | 70 | 17.7 | 10100 | Dissolved |
| S-10 | PEGMEM | 5 | 300 | 20.7 | 50 | AA | Carboxy group | 2 | i-BuMA/ DMAEMA | 43/5 | 35 | 19.6 | 9700 | Dissolved |
| S-11 | PEGMEM | 5 | 300 | 20.7 | 50 | AA | Carboxy group | 2 | MMA | 48 | 25 | 20.1 | 9000 | Dissolved |
| S-12 | PEGMEM | 19 | 950 | 20.7 | 50 | AA | Carboxy group | 2 | MMA | 48 | 20 | 20.1 | 9000 | Dissolved |
| S-13 | PEGMEM | 5 | 300 | 20.7 | 50 | AA | Carboxy group | 2 | BnMA | 48 | 10 | 20.4 | 9000 | Dissolved |
| S-14 | PEGMEM | 5 | 300 | 20.7 | 42 | AA | Carboxy group | 2 | MDI | 56 | 42 | 23.0 | 11000 | Dissolved |
| S-15 | PEGMEM | 5 | 300 | 20.7 | 50 | AA | Carboxy group | 2 | MMA | 48 | 22 | 20.1 | 8900 | Dissolved |
| T-1 | M-4 | 16 | 3600 | 19.7 | 94 | — | — | — | BA | 6 | −60 | 19.4 | 15000 | Dissolved |
| T-2 | M-6 | 9 | 400 | 20.4 | 50 | B-2 | Carboxy group | 7 | B-1 | 43 | −14 | 19.8 | 22000 | Dissolved |
| T-3 | M-4 | 16 | 3600 | 19.7 | 20 | MEA | Ether group | 80 | — | — | −14 | 20.6 | 76000 | Particulate |
| T-4 | PEGMEM | 5 | 300 | 20.7 | 10 | AA | Carboxy group | 10 | i-BuMA/ DMAEMA | 60/20 | 30 | 18.7 | 9700 | Dissolved |
| T-5 | — | — | — | — | — | AA | Carboxy group | 2 | LA | 98 | −20 | 18.8 | 9500 | Dissolved |
| T-6 | — | — | — | — | — | — | — | — | LA | 100 | −23 | 18.8 | 9000 | Dissolved |

Abbreviations in Table

In the table, "-" in the column of the constitutional component indicates that the constitutional component does not have a corresponding constitutional component. Although all the constitutional components constituting the polymer T-2 correspond to the constitutional component (N), they are shown in the respective constitutional component columns.

—Constitutional Component (X)—

PEGMEM: Polyethylene methacrylate glycol methyl ether (degree of polymerization: 5, manufactured by Sigma-Aldrich Co., LLC)

M-1 to M-4: Macromonomers respectively synthesized Synthesis Examples described above M-5: X-22-174ASX (product number, manufactured by Shin-Etsu Silicone Co., Ltd.)

M-6: A constitutional component obtained by adding Blemmer PME-400 to ethyleneimine M-7: A Macromonomer synthesized in Synthesis Example S-8 described above M-8: A Macromonomer synthesized in Synthesis Example S-9 described above —Constitutional Component (A)—

AA: Acrylic acid

GMA: Glycidyl methacrylate

MA: Maleic acid monomethyl ester

HEA: 2-hydroxyethyl acrylate

B-2: A constitutional component obtained by adding succinic acid anhydride to ethyleneimine MEA: Methoxyethyl acrylate It is noted that although each of the constitutional components (X) and (A) in the polymer S-14 is a constitutional component obtained by adding PEGMEM or AA to α-thioglycerol, it is simply denoted as PEGMEM or AA in Table 1.

—Another Constitutional Component—

Another constitutional component indicates a constitutional component that does not correspond to any one of the constitutional component (X) and the constitutional component (A).

LA: Dodecyl acrylate

St: Styrene

BA: n-butyl acrylate i-BuMA: Isobutyl methacrylate

DMAEMA: Dimethylaminoethyl methacrylate

MMA: Methyl methacrylate

BnMA: Benzyl methacrylate

MDI: Diphenylmethane diisocyanate

B-1: A constitutional component obtained by adding dodecyl methacrylate to ethyleneimine 2. Synthesis of Sulfide-Based Inorganic Solid Electrolyte Synthesis Example A A sulfide-based inorganic solid electrolyte was synthesized with reference to a non-patent document of T. Ohtomo, A. Hayashi, M. Tatsumisago, Y Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box in an argon atmosphere (dew point: −70° C.), lithium sulfide ($Li_2S$, manufactured by Sigma-Aldrich Co., LLC, purity: >99.98%) (2.42 g) and diphosphorus pentasulfide ($P_2S_5$, manufactured by Sigma-Aldrich Co., LLC, purity: >99%) (3.90 g) each were weighed, put into an agate mortar, and mixed using an agate pestle for five minutes. The mixing ratio between $Li_2S$ and $P_2S_5$($Li_2S$:$P_2S_5$) was set to 75:25 in terms of molar ratio.

Next, 66 g of zirconia beads having a diameter of 5 mm were put into a 45 mL container made of zirconia (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (product name, manufactured by FRITSCH), mechanical milling was carried out at a temperature of 25° C. and a rotation speed of 510 rpm for 20 hours, thereby obtaining a yellow powder (6.20 g) of a sulfide-based inorganic solid electrolyte (Li—P—S-based glass, hereinafter, may be denoted as LPS). The particle diameter of the Li—P—S-based glass was 15 μm.

Example 1

Each of the compositions shown in Table 2-1 to Table 2-4 (collectively referred to as Table 2) was prepared as follows.

<Preparation of Inorganic Solid Electrolyte-Containing Composition>

60 g of zirconia beads having a diameter of 5 mm was put into a 45 mL container made of zirconia (manufactured by FRITSCH), and 9.6 g of the LPS synthesized in the above Synthesis Example A, 0.20 g (in terms of solid content mass) of the binder solution or the dispersion liquid shown in Table 2-1, and 10.2 g of butyl butyrate as the dispersion medium were put thereinto. Then, this container was set in a planetary ball mill P-7 (product name). Each of the inorganic solid electrolyte-containing compositions (slurries) K-1 to K-15 was prepared by mixing at a temperature of 25° C. and a rotation speed of 150 rpm for 10 minutes.

In addition, each of inorganic solid electrolyte-containing compositions (slurries) Kc11 to Kc16 was prepared in the same manner, except that in the preparation of the inorganic solid electrolyte-containing composition K-1, the binder solution and the content of each component were respectively changed to the binder solution or dispersion liquid shown in Table 2-4 and changed to be set to the content shown in the same table (the using amount of butyl butyrate was changed).

<Preparation of Positive Electrode Composition>

60 g of zirconia beads having a diameter of 5 mm were put into a 45 mL container made of zirconia (manufactured by FRITSCH), and then 3.8 g of the LPS synthesized in Synthesis Example A, and 14.0 g (total amount) of butyl butyrate as a dispersion medium were put into the above container. The container was set in a planetary ball mill P-7 (product name) and the components were stirred for 30 minutes at 25° C. and a rotation speed of 200 rpm. Then, into this container, 9.8 g of NMC (manufactured by Sigma-Aldrich Co., LLC) as the positive electrode active material, 0.3 g of acetylene black (AB) as the conductive auxiliary agent, and 0.14 g (in terms of solid content mass) of the binder solution or the dispersion liquid shown in Table 2-2 were put. The container was set in a planetary ball mill P-7 (product name), and mixing was continued for 30 minutes at a temperature of 25° C. and a rotation speed of 200 rpm to prepare each of positive electrode compositions (slurries) PK-1 to PK-15.

In addition, each of positive electrode compositions (slurries) PKc21 to PKc26 was prepared in the same manner, except that in the preparation of the positive electrode composition PK-1, the binder solution or dispersion liquid and the content of each component were respectively changed to the binder solution shown in Table 2-4 and changed to be set to the content shown in the same table (the using amount of butyl butyrate was changed).

<Preparation of Negative Electrode Composition>

60 g of zirconia beads having a diameter of 5 mm was put into a 45 mL container made of zirconia (manufactured by FRITSCH), and 4.7 g of the LPS synthesized in Synthesis Example A, 0.10 g (in terms of solid content mass) of the binder solution or dispersion liquid shown in Table 2-3, and 9.6 g (total amount) of butyl butyrate were put thereinto. The container was set in a planetary ball mill P-7 (product name) and the components were mixed for 60 minutes at a temperature of 25° C. and a rotation speed of 300 rpm. Then, 5.2 g of silicon (Si) as the negative electrode active material and 0.4 g of VGCF (manufactured by Showa Denko K.K.) as the conductive auxiliary agent were put into the container. Similarly, the container was subsequently set in a planetary ball mill P-7 (product name), and mixing was carried out at a temperature of 25° C. for 10 minutes at a rotation speed of 100 rpm to prepare each of negative electrode compositions (slurries) NK-1 to NK-15.

In addition, each of negative electrode compositions (slurries) NKc21 to NKc26 was prepared in the same manner, except that in the preparation of the negative electrode composition NK-1, the binder solution or dispersion liquid and the content of each component were respectively changed to the binder solution shown in Table 2-4 and changed to be set to the content shown in the same table (the using amount of butyl butyrate was changed).

Regarding each of the prepared compositions, the differences (in terms of absolute value) between the SP values of the polymers S-1 to S-15 and T-1 to T-6 each of which form a binder and the SP value of the dispersion medium, as well as the difference (in terms of absolute value) between the SP value of the constitutional component (X) contained in the polymer and the SP value of the dispersion medium were respectively calculated, and they are shown in the column of "Polymer" and the column of "Constitutional component (X)" of the column of "Difference in SP value from dispersion medium" of Table 2. The unit of the difference in SP value is $MPa^{1/2}$; however, the description thereof is omitted in Table 2.

In Table 2, the composition content is the content (% by mass) with respect to the total mass of the composition, and the solid content is the content (% by mass) with respect to 100% by mass of the solid content of the composition. The unit is omitted in the table.

TABLE 2-1

| | No. | Inorganic solid electrolyte | | | Binder solution or dispersion liquid | | | Dispersion medium | | Difference in SP value from dispersion medium | | Note |
|---|---|---|---|---|---|---|---|---|---|---|---|---|
| | | | Composition content | Solid content | | Composition content | Solid content | | Composition content | Polymer | Constitutional component (X) | |
| Inorganic solid electrolyte-containing composition | K-1 | LPS | 48.0 | 98.0 | S-1 | 1.0 | 2.0 | Butyl butyrate | 51.0 | 1.1 | 2.1 | Present invention |
| | K-2 | LPS | 48.0 | 98.0 | S-2 | 1.0 | 2.0 | Butyl butyrate | 51.0 | 1.4 | 2.1 | Present invention |
| | K-3 | LPS | 48.0 | 98.0 | S-3 | 1.0 | 2.0 | Butyl butyrate | 51.0 | 0.8 | 0.9 | Present invention |
| | K-4 | LPS | 48.0 | 98.0 | S-4 | 1.0 | 2.0 | Butyl butyrate | 51.0 | 1.5 | 1.3 | Present invention |
| | K-5 | LPS | 48.0 | 98.0 | S-5 | 1.0 | 2.0 | Butyl butyrate | 51.0 | 0.9 | 0.3 | Present invention |
| | K-6 | LPS | 48.0 | 98.0 | S-6 | 1.0 | 2.0 | Butyl butyrate | 51.0 | 1.6 | 1.1 | Present invention |
| | K-7 | LPS | 48.0 | 98.0 | S-7 | 1.0 | 2.0 | Butyl butyrate | 51.0 | — | — | Present invention |
| | K-8 | LPS | 48.0 | 98.0 | S-8 | 1.0 | 2.0 | Butyl butyrate | 51.0 | 5.8 | 5.6 | Present invention |
| | K-9 | LPS | 48.0 | 98.0 | S-9 | 1.0 | 2.0 | Butyl butyrate | 51.0 | 0.9 | 1.6 | Present invention |
| | K-10 | LPS | 48.0 | 98.0 | S-10 | 1.0 | 2.0 | Butyl butyrate | 51.0 | 1.0 | 2.1 | Present invention |
| | K-11 | LPS | 48.0 | 98.0 | S-11 | 1.0 | 2.0 | Butyl butyrate | 51.0 | 1.5 | 2.1 | Present invention |
| | K-12 | LPS | 48.0 | 98.0 | S-12 | 1.0 | 2.0 | Butyl butyrate | 51.0 | 1.5 | 2.1 | Present invention |
| | K-13 | LPS | 48.0 | 98.0 | S-13 | 1.0 | 2.0 | Butyl butyrate | 51.0 | 1.8 | 2.1 | Present invention |
| | K-14 | LPS | 48.0 | 98.0 | S-14 | 1.0 | 2.0 | Butyl butyrate | 51.0 | 4.4 | 2.1 | Present invention |
| | K-15 | LPS | 48.0 | 98.0 | S-15 | 1.0 | 2.0 | Butyl butyrate | 51.0 | 1.5 | 2.1 | Present invention |

TABLE 2-2

| | No. | Inorganic solid electrolyte | | | Binder solution or dispersion liquid | | | Dispersion medium | | Active material | | | Conductive auxiliary agent | | | Difference in SP value from dispersion medium | | Note |
|---|---|---|---|---|---|---|---|---|---|---|---|---|---|---|---|---|---|---|
| | | | Composition content | Solid content | | Composition content | Solid content | | Composition content | | Composition content | Solid content | | Composition content | Solid content | Polymer | Constitutional component (X) | |
| Positive electrode composition | PK-1 | LPS | 13.6 | 27.2 | S-1 | 0.5 | 1.0 | Butyl butyrate | 50.0 | NMC | 35.0 | 70.0 | AB | 0.9 | 1.8 | 1.1 | 2.1 | Present invention |
| | PK-2 | LPS | 13.6 | 27.2 | S-2 | 0.5 | 1.0 | Butyl butyrate | 50.0 | NMC | 35.0 | 70.0 | AB | 0.9 | 1.8 | 1.4 | 2.1 | Present invention |
| | PK-3 | LPS | 13.6 | 27.2 | S-3 | 0.5 | 1.0 | Butyl butyrate | 50.0 | NMC | 35.0 | 70.0 | AB | 0.9 | 1.8 | 0.8 | 0.9 | Present invention |
| | PK-4 | LPS | 13.6 | 27.2 | S-4 | 0.5 | 1.0 | Butyl butyrate | 50.0 | NMC | 35.0 | 70.0 | AB | 0.9 | 1.8 | 1.5 | 1.3 | Preseat invention |

TABLE 2-2-continued

| | Inorganic solid electrolyte | | | Binder solution or dispersion liquid | | | Dispersion medium | | Active material | | | Conductive auxiliary agent | | | Difference in SP value from dispersion medium | | |
|---|---|---|---|---|---|---|---|---|---|---|---|---|---|---|---|---|---|
| No. | | Composition content | Solid content | | Composition content | Solid content | | Composition content | | Composition content | Solid content | | Composition content | Solid content | Polymer | Constitutional component (X) | Note |
| PK-5 | LPS | 13.6 | 27.2 | S-5 | 0.5 | 1.0 | Butyl butyrate | 50.0 | NMC | 35.0 | 70.0 | AB | 0.9 | 1.8 | 0.9 | 0.3 | Present invention |
| PK-6 | LPS | 13.6 | 27.2 | S-6 | 0.5 | 1.0 | Butyl butyrate | 50.0 | NMC | 35.0 | 70.0 | AB | 0.9 | 1.8 | 1.6 | 1.1 | Present invention |
| PK-7 | LPS | 13.6 | 27.2 | S-7 | 0.5 | 1.0 | Butyl butyrate | 50.0 | NMC | 35.0 | 70.0 | AB | 0.9 | 1.8 | — | — | Present invention |
| PK-8 | LPS | 13.6 | 27.2 | S-8 | 0.5 | 1.0 | Butyl butyrate | 50.0 | NMC | 35.0 | 70.0 | AB | 0.9 | 1.8 | 5.8 | 5.6 | Present invention |
| PK-9 | LPS | 13.6 | 27.2 | S-9 | 0.5 | 1.0 | Butyl butyrate | 50.0 | NMC | 35.0 | 70.0 | AB | 0.9 | 1.8 | 0.9 | 1.6 | Present invention |
| PK-10 | LPS | 13.6 | 27.2 | S-10 | 0.5 | 1.0 | Butyl butyrate | 50.0 | NMC | 35.0 | 70.0 | AB | 0.9 | 1.8 | 1.0 | 2.1 | Present invention |
| PK-11 | LPS | 13.6 | 27.2 | S-11 | 0.5 | 1.0 | Butyl butyrate | 50.0 | NMC | 35.0 | 70.0 | AB | 0.9 | 1.8 | 1.5 | 2.1 | Present invention |
| PK-12 | LPS | 13.6 | 27.2 | S-12 | 0.5 | 1.0 | Butyl butyrate | 50.0 | NMC | 35.0 | 70.0 | AB | 0.9 | 1.8 | 1.5 | 2.1 | Present invention |
| PK-13 | LPS | 13.6 | 27.2 | S-13 | 0.5 | 1.0 | Butyl butyrate | 50.0 | NMC | 35.0 | 70.0 | AB | 0.9 | 1.8 | 1.8 | 2.1 | Present invention |
| PK-14 | LPS | 13.6 | 27.2 | S-14 | 0.5 | 1.0 | Butyl butyrate | 50.0 | NMC | 3.5.0 | 70.0 | A.B | 0.9 | 1.8 | 4.4 | 2.1 | Present invention |
| PK-15 | LPS | 13.6 | 27.2 | S-15 | 0.5 | 1.0 | Butyl butyrate | 50.0 | NMC | 35.0 | 70.0 | AB | 0.9 | 1.8 | 1.5 | 2.1 | Present invention |

TABLE 2-3

| | | Inorganic solid electrolyte | | | Binder solution or dispersion liquid | | | Dispersion medium | | Active material | | | Conductive auxiliary agent | | | Difference in SP value from dispersion medium | | |
|---|---|---|---|---|---|---|---|---|---|---|---|---|---|---|---|---|---|---|
| | No. | | Composition content | Solid content | | Composition content | Solid content | | Composition content | | Composition content | Solid content | | Composition content | Solid content | Polymer | Constitutional Component (X) | Note |
| Negative electrode composition | NK-1 | LPS | 23.4 | 45.0 | S-1 | 0.5 | 1.0 | Butyl butyrate | 48.0 | Si | 26.0 | 50.0 | VGCF | 2.1 | 4.0 | 1.1 | 2.1 | Present invention |
| | NK-2 | LPS | 23.4 | 45.0 | S-2 | 0.5 | 1.0 | Butyl butyrate | 48.0 | Si | 26.0 | 50.0 | VGCF | 2.1 | 4.0 | 1.4 | 2.1 | Present invention |
| | NK-3 | LPS | 23.4 | 45.0 | S-3 | 0.5 | 1.0 | Butyl butyrate | 48.0 | Si | 26.0 | 50.0 | VGCF | 2.1 | 4.0 | 0.8 | 0.9 | Present invention |
| | NK-4 | LPS | 23.4 | 45.0 | S-4 | 0.5 | 1.0 | Butyl butyrate | 48.0 | Si | 26.0 | 50.0 | VGCF | 2.1 | 4.0 | 1.5 | 1.3 | Present invention |
| | NK-5 | LPS | 23.4 | 45.0 | S-5 | 0.5 | 1.0 | Butyl butyrate | 48.0 | Si | 26.0 | 50.0 | VGCF | 2.1 | 4.0 | 0.9 | 0.3 | Present invention |
| | NK-6 | LPS | 23.4 | 45.0 | S-6 | 0.5 | 1.0 | Butyl butyrate | 48.0 | Si | 26.0 | 50.0 | VGCF | 2.1 | 4.0 | 1.6 | 1.1 | Present invention |

TABLE 2-3-continued

| No. | Inorganic solid electrolyte | Composition content | Solid content | Binder solution or dispersion liquid | Composition content | Solid content | Dispersion medium | Composition content | Active material | Composition content | Solid content | Conductive auxiliary agent | Composition content | Solid content | Difference in SP value from dispersion medium: Polymer | Difference in SP value from dispersion medium: Constitutional Component (X) | Note |
|---|---|---|---|---|---|---|---|---|---|---|---|---|---|---|---|---|---|
| NK-7 | LPS | 23.4 | 45.0 | S-7 | 0.5 | 1.0 | Butyl butyrate | 48.0 | Si | 26.0 | 50.0 | VGCF | 2.1 | 4.0 | — | — | Present invention |
| NK-8 | LPS | 23.4 | 45.0 | S-8 | 0.3 | 1.0 | Butyl butyrate | 48.0 | Si | 26.0 | 50.0 | VGCF | 2.1 | 4.0 | 5.8 | 5.6 | Present invention |
| NK-9 | LPS | 23.4 | 45.0 | S-9 | 0.5 | 1.0 | Butyl butyrate | 48.0 | Si | 26.0 | 50.0 | VGCF | 2.1 | 4.0 | 0.9 | 1.6 | Present invention |
| NK-10 | LPS | 23.4 | 45.0 | S-10 | 0.5 | 1.0 | Butyl butyrate | 48.0 | Si | 26.0 | 50.0 | VGCF | 2.1 | 4.0 | 1.0 | 2.1 | Present invention |
| NK-11 | LPS | 23.4 | 45.0 | S-11 | 0.5 | 1.0 | Butyl butyrate | 48.0 | Si | 26.0 | 50.0 | VGCF | 2.1 | 4.0 | 1.5 | 2.1 | Present invention |
| NK-12 | LPS | 23.4 | 45.0 | S-12 | 0.5 | 1.0 | Butyl butyrate | 48.0 | Si | 26.0 | 50.0 | VGCF | 2.1 | 4.0 | 1.5 | 2.1 | Present invention |
| NK-13 | LPS | 23.4 | 45.0 | S-13 | 0.5 | 1.0 | Butyl butyrate | 48.0 | Si | 26.0 | 50.0 | VGCF | 2.1 | 4.0 | 1.8 | 2.1 | Present invention |
| NK-14 | LPS | 23.4 | 45.0 | S-14 | 0.5 | 1.0 | Butyl butyrate | 48.0 | Si | 26.0 | 50.0 | VGCF | 2.1 | 4.0 | 4.4 | 2.1 | Present invention |
| NK-15 | LPS | 23.4 | 45.0 | S-15 | 0.5 | 1.0 | Butyl butyrate | 48.0 | Si | 26.0 | 50.0 | VGCF | 2.1 | 4.0 | 1.5 | 2.1 | Present invention |

TABLE 2-4

| | No. | Inorganic solid electrolyte | Composition content | Solid content | Binder solution or dispersion liquid | Composition content | Solid content | Dispersion medium | Composition content | Active material | Composition content | Solid content | Conductive auxiliary agent | Composition content | Solid content | Difference in SP value from dispersion medium: Polymer | Difference in SP value from dispersion medium: Constitutional component (X) | Note |
|---|---|---|---|---|---|---|---|---|---|---|---|---|---|---|---|---|---|---|
| Inorganic solid electrolyte-containing composition | Kc11 | LPS | 43.1 | 98.0 | T-1 | 0.9 | 2.0 | Butyl butyrate | 56.0 | — | — | — | — | — | — | 0.8 | 1.1 | Comparative Example |
| | Kc12 | LPS | 48.0 | 98.0 | T-2 | 1.0 | 2.0 | Butyl butyrate | 51.0 | — | — | — | — | — | — | 1.2 | 1.8 | Comparative Example |
| | Kc13 | LPS | 43.1 | 98.0 | T-3 | 0.9 | 2.0 | Butyl butyrate | 56.0 | — | — | — | — | — | — | 2.0 | 1.1 | Comparative Example |
| | Kc14 | LPS | 43.1 | 98.0 | T-4 | 0.9 | 2.0 | Butyl butyrate | 56.0 | — | — | — | — | — | — | 0.1 | 2.1 | Comparative Example |
| | Kc15 | LPS | 43.1 | 98.0 | T-5 | 0.9 | 2.0 | Butyl butyrate | 56.0 | — | — | — | — | — | — | 0.2 | — | Comparative Example |
| | Kc16 | LPS | 43.1 | 98.0 | T-6 | 0.9 | 2.0 | Butyl butyrate | 56.0 | — | — | — | — | — | — | 0.2 | — | Comparative Example |
| Positive elec- | PKc21 | LPS | 12.5 | 27.2 | T-1 | 0.5 | 1.0 | Butyl butyrate | 54.0 | NMC | 32.2 | 70.0 | AB | 0.8 | 1.8 | 0.8 | 1.1 | Comparative Example |

TABLE 2-4-continued

| | No. | Inorganic solid electrolyte | Composition content | Solid content | Binder solution or dispersion liquid | Composition content | Solid content | Dispersion medium | Composition content | Active material | Composition content | Solid content | Conductive auxiliary agent | Composition content | Solid content | Difference in SP value from dispersion medium: Polymer | Difference in SP value from dispersion medium: Constitutional component (X) | Note |
|---|---|---|---|---|---|---|---|---|---|---|---|---|---|---|---|---|---|---|
| trode composition | PKc22 | LPS | 13.6 | 27.2 | T-2 | 0.5 | 1.0 | Butyl butyrate | 50.0 | NMC | 35.0 | 70.0 | AB | 0.9 | 1.8 | 1.2 | 1.8 | Comparative Example |
| | PKc23 | LPS | 12.5 | 27.2 | T-3 | 0.5 | 1.0 | Butyl butyrate | 54.0 | NMC | 32.2 | 70.0 | AB | 0.8 | 1.8 | 2.0 | 1.1 | Comparative Example |
| | PKc24 | LPS | 12.5 | 27.2 | T-4 | 0.5 | 1.0 | Butyl butyrate | 54.0 | NMC | 32.2 | 70.0 | AB | 0.8 | 1.8 | 0.1 | 2.1 | Comparative Example |
| | PKc25 | LPS | 12.5 | 27.2 | T-5 | 0.5 | 1.0 | Butyl butyrate | 54.0 | NMC | 32.2 | 70.0 | AB | 0.8 | 1.8 | 0.2 | — | Comparative Example |
| | PKc26 | LPS | 12.5 | 27.2 | T-6 | 0.5 | 1.0 | Butyl butyrate | 54.0 | NMC | 32.2 | 70.0 | AB | 0.8 | 1.8 | 0.2 | — | Comparative Example |
| Negative electrode composition | NKc21 | LPS | 17.6 | 45.0 | T-1 | 0.4 | 1.0 | Butyl butyrate | 61.0 | Si | 19.5 | 50.0 | VGCF | 1.55 | 4.0 | 0.8 | 1.1 | Comparative Example |
| | NKc22 | LPS | 23.4 | 45.0 | T-2 | 0.4 | 1.0 | Butyl butyrate | 48.0 | Si | 26.0 | 50.0 | VGCF | 2.1 | 4.0 | 1.2 | 1.8 | Comparative Example |
| | NKc23 | LPS | 17.6 | 45.0 | T-3 | 0.4 | 1.0 | Butyl butyrate | 61.0 | Si | 19.5 | 50.0 | VGCF | 1.55 | 4.0 | 2.0 | 1.1 | Comparative Example |
| | NKc24 | LPS | 17.6 | 45.0 | 7-4 | 0.4 | 1.0 | Butyl butyrate | 61.0 | Si | 19.5 | 50.0 | VGCF | 1.55 | 4.0 | 0.1 | 2.1 | Comparative Example |
| | NKc25 | LPS | 17.6 | 45.0 | T-5 | 0.4 | 1.0 | Butyl butyrate | 61.0 | Si | 19.5 | 50.0 | VGCF | 1.55 | 4.0 | 0.2 | — | Comparative Example |
| | NKc26 | LPS | 17.6 | 45.0 | T-6 | 0.4 | 1.0 | Butyl butyrate | 61.0 | Si | 19.5 | 50.0 | VGCF | 1.55 | 4.0 | 0.2 | — | Comparative Example |

Abbreviations in Table

LPS: LPS synthesized in Synthesis Example A

NMC: $LiNi_{1/3}Co_{1/3}Mn_{1/3}O_2$

Si: Silicon (APS: 1 to 5 μm, manufactured by Alfa Aesar)

AB: Acetylene black

VGCF: Carbon nanotube

<Production of Solid Electrolyte Sheet for all-Solid State Secondary Battery>

Each of the inorganic solid electrolyte-containing compositions shown in the column of "Solid electrolyte composition No." of Table 3-1 or Table 3-4 obtained as described above was applied onto an aluminum foil having a thickness of 20 μm using a baker type applicator (product name: SA-201, manufactured by Tester Sangyo Co., Ltd.) and heated at 80° C. for 2 hours to dry (to remove the dispersion medium) the inorganic solid electrolyte-containing composition. Then, using a heat press machine, the dried inorganic solid electrolyte-containing composition was heated and pressurized at a temperature of 120° C. and a pressure of 40 MPa for 10 seconds to produce each of solid electrolyte sheets 101 to 107, 123 to 130, and c11 to c16 for an all-solid state secondary battery (in Table 3-1 and Table 3-4, it is described as "Solid electrolyte sheet"). The film thickness of the solid electrolyte layer was 40 μm.

It is noted that the sheet No. 122 shall be skipped.

<Production of Positive Electrode Sheet for all-Solid State Secondary Battery>

Each of the positive electrode compositions obtained as described above, which is shown in the column of "Electrode composition No." in Table 3-2 or Table 3-4, was applied onto an aluminum foil having a thickness of 20 μm by using a baker type applicator (product name: SA-201), heating was carried out at 80° C. for 1 hour, and then heating was further carried out at 110° C. for 1 hour to dry (to remove the dispersion medium) the positive electrode composition. Then, using a heat press machine, the dried positive electrode composition was pressurized (10 MPa, 1 minute) at 25° C. to produce each of positive electrode sheets 108 to 114, 131 to 138, and c21 to c26 for an all-solid state secondary battery, having a positive electrode active material layer having a film thickness of 70 μm (in Table 3-2 and Table 3-4, it is described as "Positive electrode sheet").

<Production of Negative Electrode Sheet for all-Solid State Secondary Battery>

Each of the negative electrode compositions obtained as described above, which is shown in the column of "Electrode composition No." of Table 3-3 or Table 3-4, was applied onto a copper foil having a thickness of 20 μm by using a baker type applicator (product name: SA-201), heating was carried out at 80° C. for 1 hour, and then heating was further carried out at 110° C. for 1 hour to dry (to remove the dispersion medium) the negative electrode composition. Then, using a heat press machine, the dried negative electrode composition was pressurized (10 MPa, 1 minute) at 25° C. to produce each of negative electrode sheets 115 to 121, 139 to 146, and c31 to c36 for an all-solid state secondary battery, having a negative electrode active material layer having a film thickness of 60 μm (in Table 3-3 and Table 3-4, it is described as "Negative electrode sheet").

<Evaluation 1: Storage Stability Test (Redispersibility)>

Regarding each of the compositions prepared as described above, the LPS, the polymer binder, the dispersion medium, the active material, and the conductive auxiliary agent were mixed in the same conditions as the preparation conditions of each composition at the same proportion as the proportion of the composition content and the solid content shown in Table 2, thereby preparing a composition (a slurry) for dispersibility evaluation. Regarding each of the prepared compositions, the generation (the presence or absence) of aggregates of solid particles was checked using a grind meter (manufactured by ASAHISOUKEN CORPORATION). The size of the aggregate at this time was denoted as X (μm) and used as an indicator of the initial dispersibility.

On the other hand, each of the prepared compositions was allowed to stand at 25° C. for 24 hours and then mixed again at a temperature of 25° C. using a planetary ball mill P-7 (product name). The rotation speed and the time at the time of remixing were set to the same as the preparation conditions for each of the inorganic solid electrolyte composition, the positive electrode composition, and the negative electrode composition. Regarding the remixed composition, the generation (the presence or absence) of aggregates of solid particles was checked using the above-described grind meter. The size of the aggregate at this time was denoted as Y (μm) and used as an indicator of the redispersibility after storage.

It is noted that the size of the aggregate was set to a point at which remarkable spots appear on the coating material applied to the grind meter (see JIS K-5600-2-5 6.6).

Ease of generation of aggregates (aggregating properties or sedimentary properties) was evaluated as the storage stability (the redispersibility of the solid particles) of the solid electrolyte composition by determining whether the sizes X and Y of the aggregates are included in any of the following evaluation standards. In this test, it is indicated that the smaller the size X of the aggregate is, the more excellent the initial dispersibility is, and the smaller the size Y is, the more excellent the storage stability is. In this test, an evaluation standard of "D" or higher is the pass level for the size Y of the aggregate, and in a case where the size Y is 8 μm or less (the evaluation standard is "C" or higher), the size X of the aggregate is also included in the evaluation. The results are shown in Tables 3-1 to Table 3-4 (collectively referred to as Table 3).

—Evaluation Standards—

A: $Y \leq 5$ μm and $X \leq 5$ μm
B: 5 μm$<Y\leq$8 μm, and 5 μm$<X\leq$8 μm
C: 5 μm$<Y\leq$8 μm, and 8 μm$<X\leq$12 μm
D: 8 μm$<Y\leq$10 μm
E: 10 μm$<Y\leq$20 μm
F: 20 μm$<Y$ <Evaluation 2: Slurry Enrichment Test (Test of Concentration of Solid Contents)>

Regarding each of the compositions prepared as described above, the LPS, the polymer binder, the dispersion medium, the active material, and the conductive auxiliary agent were mixed in the same conditions as the preparation conditions of each composition at the same proportion as the proportion of the composition content and the solid content shown in Table 2, thereby preparing a composition (a slurry) for dispersibility evaluation. Regarding each of the prepared compositions, a grind meter (manufactured by ASAHISOUKEN CORPORATION) was used to check whether or not aggregates of solid particles were generated. In this test, the particle size at which linear marks and granular marks were generated was observed with a grind meter, and a case where the particle size was 5 μm or less was defined as no aggregate. In addition, the evaluation was carried out on whether the composition can be uniformly (without being out of liquid and at a constant coating thickness) applied at 25° C. using a baker type applicator (product name: SA-201).

This evaluation (the presence or absence of aggregates and the coating possibility) was repeatedly carried out until aggregates were generated or uniform application was impossible while the concentration of solid contents in the composition was gradually increased, and the dispersibility at the time when the concentration of solid contents was set to be high was evaluated by determining whether the maximum concentration of solid contents, at which aggregates are not generated and uniform application is possible, is included in any of the following evaluation standards. The results are shown in Table 3.

In this test, it is indicated that the higher the maximum concentration of solid contents is, the better the excellent dispersibility of the solid particles can be maintained even in a case where the concentration of solid contents of the composition is increased, and an evaluation standard "D" or higher is the pass level.

—Evaluation Standards—

A: 70% by mass or more
B: Less than 70% by mass and 65% by mass or more
C: Less than 65% by mass and 60% by mass or more
D: Less than 60% by mass and 55% by mass or more
E: Less than 55% by mass and 50% by mass or more
F: Less than 50% by mass <Evaluation 3: Oxidation Resistance (Oxidative Deterioration Resistance)>

Each of the prepared inorganic solid electrolyte-containing compositions (slurries) K-1 to K-15 and Kc11 to Kc16 was placed in an aluminum cup and dried at 100° C. for 2 hours. 30 mg of the obtained dried substance and 9 mg of acetylene black were placed in a mortar and ground for 5 minutes to prepare a test composition.

Next, 100 mg of the LPS synthesized in Synthesis Example A was placed in a PET cylindrical container having an inner diameter of 10 mm, a stainless steel (SUS) rod of 10 mm was inserted from both end openings of the cylindrical container, the pressure was applied at 10 MPa, and then 30 mg of each test composition prepared above was added thereto and pressurized at 30 MPa. Then, an In foil and a Li foil were laminated in this order and pressurized at 30 MPa.

After the pressure was released once, a cyclic voltammetry measurement was carried out under the following conditions while pressurizing at 8 MPa.

—Cyclic Voltammetry Measurement Conditions—

Oxidation potential range: +1.8 V to +5.0 V (vs InLi)
Sweep speed: 0.1 mV/s

The electrochemical oxidation resistance of the inorganic solid electrolyte-containing composition (the polymer binder) was evaluated by determining whether the minimum value of the current value in the cyclic voltammetry of 4.2 to 4.5 V is included in any of the following evaluation standards. In this test, it is indicated that the smaller the current value is, the excellent the oxidation resistance is, which indicates that the effect of suppressing the deterioration of the cycle characteristics of the all-solid state secondary battery. This test is a test for evaluating a cycle characteristic test of an all-solid state secondary battery from the viewpoint of oxidative deterioration resistance of a polymer binder, and it shall be used as a reference test in the present invention. In this test, the pass level is not limited as long as the cycle characteristic test is passed; however, an evaluation standard "D" or higher is a preferred level. The results are shown in Table 3-1 and Table 3-4.

—Evaluation Standards—

A: Less than 0.030 mA

B: 0.030 mA or more and less than 0.040 mA

C: 0.040 mA or more and less than 0.050 mA

D: 0.050 mA or more and less than 0.060 mA

E: 0.060 mA or more and less than 0.070 mA

TABLE 3-1

| Sheet No. | Solid electrolyte composition No. | Binder polymer No. | Electrode composition No. | Binder polymer No. | Storage stability | Slurry enrichment | Oxidation resistance | Note 1 | Note 2 |
|---|---|---|---|---|---|---|---|---|---|
| 101 | K-1 | S-1 | — | — | B | B | A | Solid electrolyte sheet | Present invention |
| 102 | K-2 | S-2 | — | — | C | C | C | | Present invention |
| 103 | K-3 | S-3 | — | — | D | D | C | | Present invention |
| 104 | K-4 | S-4 | — | — | B | B | A | | Present invention |
| 105 | K-5 | S-5 | — | — | B | B | A | | Present invention |
| 106 | K-6 | S-6 | — | — | D | D | A | | Present invention |
| 107 | K-7 | S-7 | — | — | B | B | A | | Present invention |
| 123 | K-8 | S-8 | — | — | D | D | B | | Present invention |
| 124 | K-9 | S-9 | — | — | D | D | B | | Present invention |
| 125 | K-10 | S-10 | — | — | D | D | C | | Present invention |
| 126 | K-11 | S-11 | — | — | D | D | A | | Present invention |
| 127 | K-12 | S-12 | — | — | C | C | A | | Present invention |
| 128 | K-13 | S-13 | — | — | C | C | A | | Present invention |
| 129 | K-14 | S-14 | — | — | C | C | B | | Present invention |
| 130 | K-15 | S-15 | — | — | B | B | A | | Present invention |

TABLE 3-2

| Sheet No. | Solid electrolyte composition No. | Binder polymer No. | Electrode composition No. | Binder polymer No. | Storage stability | Slurry enrichment | Note 1 | Note 2 |
|---|---|---|---|---|---|---|---|---|
| 108 | — | — | PK-1 | S-1 | A | A | Positive electrode sheet | Present invention |
| 109 | — | — | PK-2 | S-2 | B | B | | Present invention |
| 110 | — | — | PK-3 | S-3 | C | C | | Present invention |
| 111 | — | — | PK-4 | S-4 | A | A | | Present invention |
| 112 | — | — | PK-5 | S-5 | A | A | | Present invention |
| 113 | — | — | PK-6 | S-6 | C | C | | Present invention |
| 114 | — | — | PK-7 | S-7 | A | A | | Present invention |
| 131 | — | — | PK-8 | S-8 | D | D | | Present invention |
| 132 | — | — | PK-9 | S-9 | D | D | | Present invention |

TABLE 3-2-continued

| Sheet No. | Solid electrolyte composition No. | Binder polymer No. | Electrode composition No. | Binder polymer No. | Storage stability | Slurry enrichment | Note 1 | Note 2 |
|---|---|---|---|---|---|---|---|---|
| 133 | — | — | PK-10 | S-10 | D | D | | Present invention |
| 134 | — | — | PK-11 | S-11 | C | C | | Present invention |
| 135 | — | — | PK-12 | S-12 | B | B | | Present invention |
| 136 | — | — | PK-13 | S-13 | B | B | | Present invention |
| 137 | — | — | PK-14 | S-14 | B | B | | Present invention |
| 138 | — | — | PK-15 | S-15 | A | A | | Present invention |

TABLE 3-3

| Sheet No. | Solid electrolyte composition No. | Binder polymer No. | Electrode composition No. | Binder polymer No. | Storage stability | Slurry enrichment | Note 1 | Note 2 |
|---|---|---|---|---|---|---|---|---|
| 115 | — | — | NK-1 | S-1 | A | A | Negative electrode sheet | Present invention |
| 116 | — | — | NK-2 | S-2 | B | B | | Present invention |
| 117 | — | — | NK-3 | S-3 | C | C | | Present invention |
| 118 | — | — | NK-4 | S-4 | A | A | | Present invention |
| 119 | — | — | NK-5 | S-5 | A | A | | Present invention |
| 120 | — | — | NK-6 | S-6 | C | C | | Present invention |
| 121 | — | — | NK-7 | S-7 | A | A | | Present invention |
| 139 | — | — | NK-8 | S-8 | D | D | | Present invention |
| 140 | — | — | NK-9 | S-9 | D | D | | Present invention |
| 141 | — | — | NK-10 | S-10 | D | D | | Present invention |
| 142 | — | — | NK-11 | S-11 | C | C | | Present invention |
| 143 | — | — | NK-12 | S-12 | B | B | | Present invention |
| 144 | — | — | NK-13 | S-13 | B | B | | Present invention |
| 145 | — | — | NK-14 | S-14 | B | B | | Present invention |
| 146 | — | — | NK-15 | S-15 | A | A | | Present invention |

TABLE 3-4

| Sheet No. | Solid electrolyte composition No. | Binder polymer No. | Electrode composition No. | Binder polymer No. | Storage stability | Slurry enrichment | Oxidation resistance | Note 1 | Note 2 |
|---|---|---|---|---|---|---|---|---|---|
| c11 | Kc11 | T-1 | — | — | F | F | C | Solid electrolyte sheet | Comparative Example |
| c12 | Kc12 | T-2 | — | — | C | C | F | | Comparative Example |
| c13 | Kc13 | T-3 | — | — | F | F | B | | Comparative Example |
| c14 | Kc14 | T-4 | — | — | F | F | F | | Comparative Example |

TABLE 3-4-continued

| Sheet No. | Solid electrolyte composition No. | Binder polymer No. | Electrode composition No. | Binder polymer No. | Storage stability | Slurry enrichment | Oxidation resistance | Note 1 | Note 2 |
|---|---|---|---|---|---|---|---|---|---|
| c15 | Kc15 | T-5 | — | — | F | F | B | | Comparative Example |
| c16 | Kc16 | T-6 | — | — | F | F | B | | Comparative Example |
| c21 | — | — | PKc21 | T-1 | F | F | — | Positive electrode sheet | Comparative Example |
| c22 | — | — | PKc22 | T-2 | C | C | — | | Comparative Example |
| c23 | — | — | PKc23 | T-3 | F | F | — | | Comparative Example |
| c24 | — | — | PKc24 | T-4 | F | F | — | | Comparative Example |
| c25 | — | — | PKc25 | T-5 | F | F | — | | Comparative Example |
| c26 | — | — | PKc26 | T-6 | F | F | — | | Comparative Example |
| c31 | — | — | NKc21 | T-1 | F | F | — | Negative electrode sheet | Comparative Example |
| c32 | — | — | NKc22 | T-2 | C | C | — | | Comparative Example |
| c33 | — | — | NKc23 | T-3 | F | F | — | | Comparative Example |
| c34 | — | — | NKc24 | T-4 | F | F | — | | Comparative Example |
| c35 | — | — | NKc25 | T-5 | F | F | — | | Comparative Example |
| c36 | — | — | NKc26 | T-6 | F | F | — | | Comparative Example |

<Manufacture of all-Solid State Secondary Battery>

First, a positive electrode sheet for an all-solid state secondary battery, including a solid electrolyte layer, and a negative electrode sheet for an all-solid state secondary battery, including a solid electrolyte layer, which would be used for manufacturing an all-solid state secondary battery, were produced.

—Production of Positive Electrode Sheet for all-Solid State Secondary Battery, which has Solid Electrolyte Layer—

The solid electrolyte sheet shown in the column of "Solid electrolyte layer (sheet No.)" of Table 4, produced as described above, was overlaid on the positive electrode active material layer of each of the positive electrode sheets for an all-solid state secondary battery shown in the column of "Electrode active material layer (sheet No.)" of Table 4 so that the solid electrolyte layer came into contact with the positive electrode active material layer, transferred (laminated) by being pressurized at 50 MPa and 25° C. using a press machine, and then pressurized at 600 MPa and at 25° C., whereby each of positive electrode sheet Nos. 108 to 114, 131 to 138, and c21 to c26 for an all-solid state secondary battery including a solid electrolyte layer having a thickness of 25 μm (thickness of positive electrode active material layer: 50 μm) was produced.

It is noted that regarding the positive electrode sheet No. 111 for an all-solid state secondary battery, two kinds of sheets of a sheet on which the solid electrolyte layer 104 was laminated, which was used in the all-solid state secondary battery No. 104, and a sheet on which the solid electrolyte layer c11 was laminated, which was used in the all-solid state secondary battery No. 108 were produced.

—Production of Negative Electrode Sheet for all-Solid State Secondary Battery, which has Solid Electrolyte Layer—

Next, the solid electrolyte sheet shown in the column of "Solid electrolyte layer (sheet No.)" of Table 4, produced as described above, was overlaid on the negative electrode active material layer of each of the negative electrode sheets for an all-solid state secondary battery shown in the column of "Electrode active material layer (sheet No.)" of Table 4 so that the solid electrolyte layer came into contact with the negative electrode active material layer, transferred (laminated) by being pressurized at 50 MPa and 25° C. using a press machine, and then pressurized at 600 MPa and at 25° C., whereby each of negative electrode sheets 115 to 121, 139 to 146, and c31 to c36 for an all-solid state secondary battery including a solid electrolyte layer having a thickness of 25 μm (thickness of negative electrode active material layer: 40 μm) was produced.

It is noted that regarding the negative electrode sheet No. 118 for an all-solid state secondary battery, two kinds of sheets of a sheet on which the solid electrolyte layer 104 was laminated, which was used in the all-solid state secondary battery No. 112, and a sheet on which the solid electrolyte layer c11 was laminated, which was used in the all-solid state secondary battery No. 116 were produced.

An all-solid state secondary battery No. 101 having a layer configuration illustrated in FIG. 1 was manufactured as follows.

The positive electrode sheet No. 108 for an all-solid state secondary battery (the aluminum foil of the solid electrolyte-containing sheet had been peeled off), which included the solid electrolyte layer obtained as described above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a lithium foil cut out in a disk shape having a diameter of 15 mm was overlaid on the solid electrolyte layer. After further overlaying a stainless steel foil thereon, the 2032-type coin case 11 was crimped to manufacture an all-solid state secondary battery 13 (No. 101), illustrated in FIG. 2.

The all-solid state secondary battery manufactured in this manner has a layer configuration illustrated in FIG. 1 (however, the lithium foil corresponds to a negative electrode active material layer 2 and a negative electrode collector 1).

Each of all-solid state secondary battery Nos. 102 to 108, 117 to 124, c101 to c103, and c107 to c109 was manufactured in the same manner as in the manufacturing of the all-solid state secondary battery No. 101 except that in the manufacturing of the all-solid state secondary battery No. 101, a positive electrode sheet for an all-solid state secondary battery, which has a solid electrolyte layer and is indicated by No. shown in the column of "Electrode active material layer (sheet No.)" of Table 4 was used instead of the positive electrode sheet No. 108 for an all-solid state secondary battery, which has a solid electrolyte layer.

An all-solid state secondary battery No. 109 having a layer configuration illustrated in FIG. 1 was manufactured as follows.

The negative electrode sheet No. 115 for an all-solid state secondary battery (the aluminum foil of the solid electrolyte-containing sheet had been peeled off), which included the solid electrolyte obtained as described above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a positive electrode sheet (a positive electrode active material layer) punched out from the positive electrode sheet for an all-solid state secondary battery produced below into a disk shape having a diameter of 14.0 mm was overlaid on the solid electrolyte layer. A stainless steel foil (a positive electrode collector) was further overlaid thereon to form a laminate 12 for an all-solid state secondary battery (a laminate consisting of stainless steel foil—aluminum foil—positive electrode active material layer—solid electrolyte layer—negative electrode active material layer—copper foil).

Then, the 2032-type coin case 11 was crimped to manufacture an all-solid state secondary battery No. 109 illustrated in FIG. 2.

A positive electrode sheet for an all-solid state secondary battery to be used in the manufacturing of the all-solid state secondary battery No. 109 was prepared as follows.

—Preparation of Positive Electrode Composition—

180 beads of zirconia beads having a diameter of 5 mm were put into a 45 mL container made of zirconia (manufactured by FRITSCH), 2.7 g of the LPS synthesized in the above Synthesis Example A, and 0.3 g of KYNAR FLEX 2500-20 (product name, PVdF-HFP: polyvinylidene fluoride-hexafluoropropylene copolymer, manufactured by Arkema S.A.) in terms of solid content mass and 22 g of butyl butyrate were put into the above container. The container was set in a planetary ball mill P-7 (product name, manufactured by FRITSCH) and the components were stirred for 60 minutes at 25° C. and a rotation speed of 300 rpm. Then, 7.0 g of $LiNi_{1/3}Co_{1/3}Mn_{1/3}O_2$ (NMC) was put into the container as the positive electrode active material, and similarly, the container was set in a planetary ball mill P-7, mixing was continued at 25° C. and a rotation speed of 100 rpm for 5 minutes to prepare a positive electrode composition.

—Production of Positive Electrode Sheet for all-Solid State Secondary Battery—

The positive electrode composition obtained as described above was applied onto an aluminum foil (a positive electrode collector) having a thickness of 20 μm with a baker type applicator (product name: SA-201, manufactured by Tester Sangyo Co., Ltd.), heating was carried out at 100° C. for 2 hours to dry (to remove the dispersion medium) the positive electrode composition. Then, using a heat press machine, the dried positive electrode composition was pressurized (10 MPa, 1 minute) at 25° C. to produce each of positive electrode sheets for an all-solid state secondary battery, having a positive electrode active material layer having a film thickness of 80 μm.

Each of all-solid state secondary batteries Nos. 110 to 116, 125 to 132, c104 to c106, and c110 to c112 was manufactured in the same manner as in the manufacturing of the all-solid state secondary battery No. 109, except that in the manufacturing of the all-solid state secondary battery No. 109, a negative electrode sheet for an all-solid state secondary battery, which has a solid electrolyte layer and is indicated by No. shown in the column of "Electrode active material layer (sheet No.)" of Table 4 was used instead of the negative electrode sheet No. 115 for an all-solid state secondary battery, which has a solid electrolyte layer.

<Evaluation 4: Measurement of Ion Conductivity>

The ion conductivity of each of the manufactured all-solid state secondary batteries was measured. Specifically, the alternating-current impedance of each of the all-solid state secondary batteries was measured in a constant-temperature tank (25° C.) using a 1255B FREQUENCY RESPONSE ANALYZER (product name, manufactured by SOLARTRON Analytical) at a voltage magnitude of 5 mV and a frequency of 1 MHz to 1 Hz. From the measurement result, the resistance of the sample for measuring ion conductivity in the layer thickness direction was determined, and the ion conductivity was determined by the calculation according to Expression (C1). The results are shown in Table 4.

$$\text{Ion conductivity } \sigma \text{ (mS/cm)} = 1{,}000 \times \text{sample layer thickness (cm)}/[\text{resistance } (\Omega) \times \text{sample area (cm}^2)] \quad \text{Expression (C1):}$$

In Expression (C1), the sample layer thickness is a value obtained by measuring the thickness before placing the laminate 12 in the 2032-type coin case 11 and subtracting the thickness of the collector (the total layer thickness of the solid electrolyte layer and the electrode active material layer). The sample area is the area of the disk-shaped sheet having a diameter of 14.5 mm.

It was determined whether the obtained ion conductivity a was included in any of the following evaluation standards.

In this test, in a case where the evaluation standard is "D" or higher, the ion conductivity a is the pass level.

—Evaluation Standards—

A: $0.30 \le \sigma$
B: $0.25 \le \sigma < 0.30$
C: $0.20 \le \sigma < 0.25$
D: $0.15 \le \sigma < 0.20$
E: $0.10 \le \sigma < 0.15$
F: $\sigma < 0.10$ <Evaluation 5: Cycle Characteristics>

The discharge capacity retention rate of each of the manufactured all-solid state secondary batteries was measured using a charging and discharging evaluation device TOSCAT-3000 (product name, manufactured by Toyo System Corporation).

Specifically, each of the all-solid state secondary batteries was charged in an environment of 25° C. at a current density of 0.1 $mA/cm^2$ until the battery voltage reached 4.3 V. Then, the battery was discharged at a current density of 0.1 $mA/cm^2$ until the battery voltage reached 2.5 V. One charging operation and one discharging operation were set as one cycle of charging and discharging, and 3 cycles of charging and discharging were repeated under the same conditions to carry out initialization. Then, the above charging and discharging cycle was repeated, and the discharge capacity of each of the all-solid state secondary batteries was measured at each time after the charging and discharging cycle was carried out with a charging and discharging evaluation device: TOSCAT-3000 (product name).

In a case where the discharge capacity (the initial discharge capacity) of the first charging and discharging cycle after initialization is set to 100%, the battery performance (the cycle characteristics) was evaluated by determining whether the number of charging and discharging cycles in a case where the discharge capacity retention rate (the discharge capacity with respect to the initial discharge capacity) reaches 80% is included in any of the following evaluation standards. In this test, the higher the evaluation standard is, the better the battery performance (the cycle characteristics) is, and the initial battery performance can be maintained even in a case where a plurality of times of charging and discharging are repeated (even in a case of the long-term use). Regarding the cycle characteristics in this test, the evaluation standard "D" or higher is the pass level. The results are shown in Table 4.

All of the all-solid state secondary batteries Nos. 101 to 132 exhibited initial discharge capacity values sufficient for functioning as an all-solid state secondary battery.

—Evaluation Standards—

A: 600 cycles or more

B: 450 cycles or more and less than 600 cycles

C: 300 cycles or more and less than 450 cycles

D: 150 cycles or more and less than 300 cycles

E: 80 cycles or more and less than 150 cycles

F: 40 cycles or more and less than 80 cycles

TABLE 4

| No. | Layer configuration<br>Electrode active material layer (sheet No.) | Solid electrolyte layer (sheet No.) | Ion conductivity | Cycle characteristics | Note |
|---|---|---|---|---|---|
| 101 | 108 | 101 | A | B | Present invention |
| 102 | 109 | 102 | B | C | Present invention |
| 103 | 110 | 103 | B | C | Present invention |
| 104 | 111 | 104 | A | A | Present invention |
| 105 | 112 | 105 | A | A | Present invention |
| 106 | 113 | 106 | A | C | Present invention |
| 107 | 114 | 107 | A | A | Present invention |
| 117 | 131 | 123 | C | C | Present invention |
| 118 | 132 | 124 | C | C | Present invention |
| 119 | 133 | 125 | C | B | Present invention |
| 120 | 134 | 126 | B | B | Present invention |
| 121 | 135 | 127 | B | B | Present invention |
| 122 | 136 | 128 | B | B | Present invention |
| 123 | 137 | 129 | B | B | Present invention |
| 124 | 138 | 130 | A | A | Present invention |
| 108 | 111 | c11 | B | B | Present invention |
| 109 | 115 | 101 | A | B | Present invention |
| 110 | 116 | 102 | B | C | Present invention |
| 111 | 117 | 103 | B | C | Present invention |
| 112 | 118 | 104 | A | A | Present invention |
| 113 | 119 | 105 | A | A | Present invention |
| 114 | 120 | 106 | A | C | Present invention |
| 115 | 121 | 107 | A | A | Present invention |
| 125 | 139 | 123 | C | C | Present invention |
| 126 | 140 | 124 | C | C | Present invention |
| 127 | 141 | 125 | C | B | Present invention |
| 128 | 142 | 126 | B | B | Present invention |
| 129 | 143 | 127 | B | B | Present invention |
| 130 | 144 | 128 | B | B | Present invention |
| 131 | 145 | 129 | B | B | Present invention |
| 132 | 146 | 130 | A | A | Present invention |
| 116 | 118 | c11 | B | B | Present invention |
| c101 | c21 | c11 | E | E | Comparative Example |
| c102 | c22 | c12 | E | F | Comparative Example |
| c103 | c23 | c13 | D | E | Comparative Example |
| c107 | c24 | c14 | F | F | Comparative Example |
| c108 | c25 | c15 | F | F | Comparative Example |
| c109 | c26 | c16 | F | F | Comparative Example |
| c104 | c31 | c11 | E | E | Comparative Example |
| c105 | c32 | c12 | E | F | Comparative Example |
| c106 | c33 | c13 | D | E | Comparative Example |
| c110 | c34 | c14 | F | F | Comparative Example |
| c111 | c35 | c15 | F | F | Comparative Example |
| c112 | c36 | c16 | F | F | Comparative Example |

The following findings can be seen from the results of Table 3 and Table 4.

The inorganic solid electrolyte-containing compositions of Comparative Examples which do not contain the polymer binder defined in the present invention, which are shown in Nos. Kc11 and Kc13 to Kc16, are inferior in dispersion characteristics (storage stability and slurry enrichment), and the cycle characteristics of the all-solid state secondary battery cannot be improved, and ion conductivity cannot be improved in Nos. Kc11 and Kc14 to Kc16. In addition, although the inorganic solid electrolyte-containing composition of Comparative Example which does not contain the polymer binder defined in the present invention, which is shown in No. Kc12, passes the dispersion characteristics, the ion conductivity and the cycle characteristics cannot be improved. The polymer binders used for Kc12 and Kc14 also have insufficient oxidative deterioration resistance. It can be seen that the electrode compositions shown in PKc21 to PKc26 and NKc21 to NKc26 also show the same tendency as the inorganic solid electrolyte-containing compositions of Comparative Examples.

On the other hand, the inorganic solid electrolyte-containing compositions containing the polymer binder defined in the present invention, which are shown in Nos. K-1 to K-15, have excellent dispersion characteristics and moreover, excellent oxidation resistance as well. In addition, the electrode compositions shown in Nos. PK-1 to PK-15 and NK-1 to NK-15 are also excellent in dispersion characteristics. Further, it can be seen that since the inorganic solid electrolyte-containing composition according to the embodiment of the present invention is excellent in oxidation resistance, an electrode composition using the same polymer binder as the inorganic solid electrolyte-containing composition also exhibits excellent oxidation resistance.

It can be seen that by using these inorganic solid electrolyte-containing compositions in the formation of the constitutional layer of the all-solid state secondary battery, it is possible to realize high ion conductivity (low resistance) and the excellent cycle characteristics in the obtained all-solid state secondary battery.

It is noted that the oxidation resistance test was evaluated using a sheet for an all-solid state secondary battery, which was most concerned about contact with oxygen in an actual manufacturing process. A similar effect can be expected even in an inorganic solid electrolyte-containing composition as well as in a constitutional layer incorporated into the all-solid state secondary battery, as long as they exhibit the effect of suppressing the oxidation in the sheet for an all-solid state secondary battery.

The present invention has been described together with the embodiments of the present invention. However, the inventors of the present invention do not intend to limit the present invention in any part of the details of the description unless otherwise designated, and it is conceived that the present invention should be broadly construed without departing from the spirit and scope of the invention shown in the attached "WHAT IS CLAIMED IS".

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: laminate for all-solid state secondary battery
13: coin-type all-solid state secondary battery

What is claimed is:

1. An inorganic solid electrolyte-containing composition comprising:

an inorganic solid electrolyte having an ion conductivity of a metal belonging to Group 1 or Group 2 in the periodic table;

a polymer binder; and a dispersion medium, wherein the polymer binder has a constitutional component (X) having a polymerized chain and a constitutional component (A) having at least one functional group of the following group (a) of functional groups, contains a polymer having a constitutional component (N) containing a nitrogen atom, the polymer having a content of less than 10% by mole in all constitutional components, and is dissolved in the dispersion medium, <Group (a) of functional groups> a sulfonate group, a phosphate group, a phosphonate group, a carboxy group, a hydroxy group, an oxetane group, an epoxy group, a dicarboxylic acid anhydride group, a thiol group, an ether group, a thioether group, a thioester group, a fluoroalkyl group, and salts of these groups, wherein the constitutional component (X) is represented by Formula (X1) or (X2), Formula (X1)

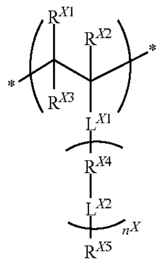

(Formula X2)

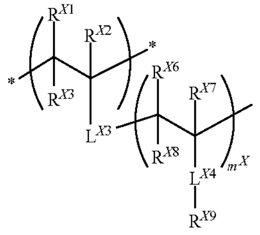

in Formula (X1) and Formula (X2), $R^{X1}$ to $R^{X3}$ and $R^{X6}$ to $R^{X8}$ represent a hydrogen atom or a substituent, $R^{X4}$ represents a hydrocarbon group or an alkylsilyl group, $R^{X5}$ represents a substituent, $R^{X9}$ represents a hydrogen atom or a substituent, $L^{X1}$ to $L^{X3}$ represent a linking group, $L^{X4}$ represents a single bond or a linking group, and $n^X$ and $m^X$ indicate an average degree of polymerization and are a number of 2 or more.

2. The inorganic solid electrolyte-containing composition according to claim 1, wherein the constitutional component (N) is a constitutional component containing a nitrogen atom that forms an amino group in a partial structure that is incorporated into a main chain of the polymer or in a partial structure that serves as a side chain other than a polymerized chain.

3. The inorganic solid electrolyte-containing composition according to claim 1, wherein the polymer is a multibranched polymer having a core part and three or more arm parts that are bonded to the core part, where the arm part contains the constitutional component (X).

4. The inorganic solid electrolyte-containing composition according to claim 1, wherein a glass transition temperature of the polymer is −30° C. or lower.

5. The inorganic solid electrolyte-containing composition according to claim 1, further comprising an active material.

6. The inorganic solid electrolyte-containing composition according to claim 1, further comprising a conductive auxiliary agent.

7. A sheet for an all-solid state secondary battery, comprising a layer formed of the inorganic solid electrolyte-containing composition according to claim 1.

8. An all-solid state secondary battery comprising, in the following order:

a positive electrode active material layer;

a solid electrolyte layer; and a negative electrode active material layer, wherein at least one layer of the positive electrode active material layer, the solid electrolyte layer, or the negative electrode active material layer is a layer formed of the inorganic solid electrolyte-containing composition according to claim 1.

9. A manufacturing method for a sheet for an all-solid state secondary battery, the manufacturing method comprising forming a film of the inorganic solid electrolyte-containing composition according to claim 1.

10. A manufacturing method for an all-solid state secondary battery, the manufacturing method comprising manufacturing an all-solid state secondary battery through the manufacturing method according to claim 9.

* * * * *